United States Patent
Yoneda et al.

(10) Patent No.: US 6,212,208 B1
(45) Date of Patent: Apr. 3, 2001

(54) METHOD FOR CODING AND MULTIPLEXING MULTIMEDIA DATA, APPARATUS FOR CODING AND MULTIPLEXING MULTIMEDIA DATA, RECORD MEDIA CONTAINING PROGRAM FOR CODING AND MULTIPLEXING MULTIMEDIA DATA

(75) Inventors: Aki Yoneda, Neyagawashi; Takao Matsumoto, Izumishi, both of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 08/966,361

(22) Filed: Nov. 7, 1997

(30) Foreign Application Priority Data

Nov. 11, 1996 (JP) .................................. 8-298970
Nov. 14, 1996 (JP) .................................. 8-302582
Jun. 19, 1997 (JP) .................................. 9-162255

(51) Int. Cl.$^7$ .............................. H04J 3/02; H04N 5/783; H04N 7/12
(52) U.S. Cl. .................. 370/538; 348/423.1; 375/240.28
(58) Field of Search ........................ 370/532, 537, 370/538, 508, 468, 516, 513, 510, 412, 413, 419; 348/387, 419, 423, 500, 15, 423.1, 425.1, 425.4, 497, 845.3; 375/240.28

(56) References Cited

U.S. PATENT DOCUMENTS

| | | | |
|---|---|---|---|
| 5,506,844 | * 4/1996 | Rao | 370/468 |
| 5,708,664 | * 1/1998 | Budge et al. | 370/538 |
| 5,751,694 | * 5/1998 | Toft | 348/15 |
| 5,751,887 | * 5/1998 | Nitta et al. | 386/68 |
| 5,793,425 | * 8/1998 | Balakrishnan | 348/387 |
| 5,877,814 | * 3/1999 | Reininger et al. | 348/500 |
| 5,966,182 | * 10/1999 | Yonemitsu et al. | 348/423 |

* cited by examiner

Primary Examiner—Chau Nguyen
Assistant Examiner—Chiho Andrew Lee
(74) Attorney, Agent, or Firm—Parkhurst & Wendel, L.L.P.

(57) ABSTRACT

In a video/audio coding and multiplexing method, coding of multimedia data including video data and audio data is implemented as a software program operating on a multitask operating system, and video/audio coded and multiplexed information in which video/audio synchronization is realized in specified time units is obtained. In this method, coded video information and coded audio information are temporarily stored in a video buffer and an audio buffer, respectively. A video/audio synchronization means creates time and information using video block rate information which is created on the basis of the coded video information and stored with the coded video information. According to the time information, a coded video read-out means and a coded audio read-out means read the coded video information and the coded audio information from the respective buffers, and the video/audio synchronization means performs video/audio multiplexing. Thereby, the coding process and the multiplexing process are performed at independent timings.

14 Claims, 28 Drawing Sheets

METHOD FOR CODING AND MULTIPLEXING MULTIMEDIA DATA, APPARATUS FOR CODING AND MULTIPLEXING MULTIMEDIA DATA, RECORD MEDIA CONTAINING PROGRAM FOR CODING AND MULTIPLEXING MULTIMEDIA DATA

FIELD OF THE INVENTION

The present invention relates to methods and apparatuses for coding and multiplexing multimedia data, and record media containing programs for coding and multiplexing multimedia data. More specifically, the invention relates to those for generating multimedia data coded and multiplexed information in which multimedia data including video and audio data have been subjected to digitization, coding, and time division multiplexing by a computer system having an operating system.

BACKGROUND OF THE INVENTION

With the development of digital technology in recent years, multimedia data which have conventionally been processed only in analog form, for example, information including video and audio data, can be converted to digital information by digitization, compressive coding, and multiplexing, and the digital information can be used for recording and transmission. Multimedia data coded and multiplexed information so generated, for example, video/audio coded and multiplexed information, is called "system stream". Usually, a system stream is a one-dimensional array in which digitized, coded, and compressed video information and digitized, coded, and compressed audio information are alternately placed in prescribed units.

FIG. 27 shows an example of video/audio coded and multiplexed information. In the figure, reference numeral 2101 denotes a video sequence header showing that coded video information 2101 follows the header. When the coded (compressed) video information 2102 is subjected to inverse coding (expansion), an image having a reproduction time is generated. Reference numeral 2103 denotes an audio sequence header showing that coded audio information 2104 follows the header. When the coded (compressed) audio information 2104 is subjected to inverse coding (expansion), a voice having a reproduction time is generated. This audio/video coded and multiplexed information is also called "time-division-multiplexed information", and processes for generating this information are a coding process and a multiplexing process.

In an apparatus for reproducing the audio/video coded and multiplexed information, for video/audio synchronization at reproduction, video information and audio information to be reproduced synchronously are accumulated in a buffer and, when the video information and the audio information are completely stored in the buffer, they are decoded and reproduced. Since the capacity (size) of an internal buffer in a reproduction apparatus is limited, the coded video information 2102 and the coded audio information 2104 shown in FIG. 27 must be alternately arranged by quantities within a range allowed by the size of the internal buffer. More specifically, when the size of internal buffer is equivalent to 0.1 sec, the coded video information 2102 and the coded audio information 2104 must be alternately arranged in units that make the reproduction time not longer than 0.1 sec. Depending on the structure of the reproduction apparatus, there is a case where audio information and video information must be arranged alternately by quantities that make the video reproduction time and the audio reproduction time equal to each other.

A description is now given of a conventional apparatus for coding video/audio information and outputting video/audio coded and multiplexed information as mentioned above.

FIG. 26 is a block diagram illustrating a video/audio coding and multiplexing apparatus according to the prior art. With reference to FIG. 26, this apparatus is provided with an image/voice input means 2001, an audio capture means 2002, an audio coding means 2003, a coded audio storage means 2004, a video capture means 2005, a video coding means 2006, a coded video storage means 2007, and a file management means 2008.

The image/voice input means 2001 is implemented by a video camera or the like. This means 2001 receives image and voice, and outputs analog video information and analog audio information, separately. The audio capture means 2002 receives the analog audio information output from the input means 2001, and outputs digital audio information comprising discrete digital data. The audio coding means 2003 receives the digital audio information output from the audio capture means 2002, compresses the information by coding it excluding redundant information, and outputs coded audio information per unit time. In this case, the unit time is 0.1 sec. The coded audio storage means 2004 adds an audio sequence header to the coded audio information output from the audio coding means 2003, and outputs it to the file management means 2008. The video capture means 2005 receives the analog video information output from the image/voice input means 2001, and outputs digital video information comprising discrete digital data. The digital video information is composed of plural pieces of still picture information, each showing a still picture per unit time. The video coding means 2006 receives the digital video information output from the video capture means 2005, compresses the information by coding it excluding redundant information, and outputs coded video information. In this example, coded video information is output in units of individual still pictures. Since a still picture exists every 1/30 sec, the unit time for outputting the coded video data is 1/30 sec. The coded video storage means 2007 adds a video sequence header to the coded video information output from the video coding means 2006, and outputs it to the file management means. The file management means 2008 writes the input audio and video information in a file in a storage unit.

FIG. 27 shows video/audio coded and multiplexed information obtained by the conventional video/audio coding and multiplexing apparatus shown in FIG. 26. As shown in FIG. 27, for the reproduction process performed later, video information and audio information are arranged alternately by quantities that make the video reproduction time and the audio reproduction time equal to each other, and the reproduction time is not longer than 0.1 sec.

FIG. 28 is a diagram for explaining the operation of the video/audio cording and multiplexing apparatus shown in FIG. 26, with respect to the flow of data.

In FIG. 28, the same reference numerals as those shown in FIG. 26 designate the same or corresponding parts, and a video camera is employed as the image/voice input means 2001 shown in FIG. 26.

First of all, the video camera 2001 captures image and voice, and outputs analog audio information and analog video information, separately.

The audio capture means 2002 receives the analog audio information output from the video camera 2001 and outputs digital audio information. On the other hand, the video capture means 2005 receives the analog video information output from the video camera 2001 and outputs digital video information.

The video coding means 2006 receives the digital video information output from the video capture means 2005, compresses the video information by coding, and outputs coded video information corresponding to a single still picture. The coded video storage means 2007 adds a video sequence header to the head of the coded video information. The file management means 2008 stores the coded video information with the sequence header in a file in a storage unit.

The conventional video/audio coding and multiplexing apparatus repeats, three times, the process steps from coding by the video coding means 2006 to storage in the file by the file management means 2008. Since the coded video information is output every $\frac{1}{30}$ sec, when the process steps have been repeated three times, the elapsed time is 0.1 sec ($\frac{1}{10}$).

The audio coding means 2003 receives the digital audio information output from the audio capture means 2002, compresses the audio information by coding, and outputs coded audio information by a quantity equivalent to 0.1 sec. The coded audio storage means 2004 adds an audio sequence header to the head of the coded audio information. The file management means 2008 stores the coded audio information with the sequence header in the file in the storage unit.

As long as the image/voice input through the video camera 2001 continues, the above-mentioned process steps are repeated appropriately, whereby coded video information and coded audio information as shown in FIG. 27, each being equivalent to 0.1 sec, are output as video/audio coded and multiplexed information, and stored in the storage unit.

As described above, in the conventional video/audio coding and multiplexing apparatus, when video information and audio information are coded, the video coding means 2006 and the audio coding means 2003 operate independently, and output coded video information and coded audio information at constant timings, respectively. More specifically, the video coding means 2006 outputs coded video information every $\frac{1}{30}$ sec, and the audio coding means 2003 outputs coded audio information every $\frac{1}{10}$ sec.

Therefore, video/audio coded and multiplexed information in which video information and audio information are alternately arranged in the same units of reproduction time ($\frac{1}{10}$sec) is obtained by successively storing output coded information in the file, without using special means for video/audio synchronization. To realize this, the conventional apparatus requires independently operating hardware dedicated to each of the audio coding means and the video coding means.

Hence, it is considerably difficult for the conventional apparatus to implement the video and audio coding means as software programs operating on a multitask operating system using a general purpose CPU, without using hardware.

The reason is as follows. On a multitask operating system, when plural programs (tasks) are operating in parallel, the timing for executing each program is decided by scheduling performed by the operating system or interruption generated by a device driver, so that equal assignment according to the request from the coding means is not guaranteed. Therefore, the above-mentioned constant operation is not always expected.

For example, for a device driver constituting the audio capture means and the video capture means, when an interruption generated by the audio capture means has priority over an interruption generated by the video capture means, there is a possibility that audio coding might be executed prior to video coding in a period of time.

FIG. 29 is a diagram for explaining this problem, and shows an example of video/audio coded and multiplexed information obtained as a result of video/audio processing when the conventional apparatus is implemented by the above-mentioned system. In FIG. 29, the ratio of the video reproduction time to the audio reproduction time is shown on the assumption that the video bit rate (quantity per unit time) is always equal to the audio bit rate. In section A, audio coding is carried out prior to video coding, so that the reproduction time of audio information is longer than the reproduction time of video information. In section B, since video coding is carried out so as to make up for the process in section A, the reproduction time of video information is longer than the reproduction time of audio information. In the multiplexed information shown in FIG. 29, since the video/audio multiplexing is unbalanced as a whole, a reproduction apparatus having a sufficiently large buffer for both of video and audio information must be used, otherwise the processing will be complicated, resulting in unwanted phenomena such as video or audio interruption.

Further, in the multitask operating system, since various kinds of programs reside besides the video and audio coding means, even though assignment to the video and audio coding means is performed equally, a problem still remains. For example, it is assumed that, when the audio coding means is expected to output $\frac{1}{10}$ sec coded audio information constantly, a program other than the coding means consumes the CPU time over a long period, and 1 sec has elapsed from the previous audio coding when the CPU time is given to the audio coding means. In this case, even though 1 sec of digital audio information is buffered to prevent audio interruption, this audio information is output as a block of coded audio information for 1 sec. When this is processed by the conventional apparatus, in obtained video/audio coded and multiplexed information, 1 sec of audio information is inserted whereas video information and audio information must be alternately arranged in time units of 0.1 sec. When the capacity of the internal buffer in the reproduction apparatus is only 0.1 sec, the 1 sec of audio information results in a fatal event that image and voice are interrupted due to overflow of information from the buffer.

FIG. 30 is a diagram for explaining the problem in more detail, and shows an example of video/audio coded and multiplexed information obtained as a result of video/audio processing when the conventional apparatus is implemented by the above-mentioned system. In section A, coded audio information and coded video information are processed at sufficiently short time intervals. However, in section B, since another program, i.e., a process other than video/audio coding, has been executed at the beginning of this section, both the video information and the audio information are increased in time, leading to the above-mentioned problem.

Even when the video and audio coding means are only programs in the multitask operating system, a problem might occur. Generally, when the CPU operation switches to another program (task), a work for task switching is required. The ratio of this work time to the whole increases with an increase in frequency of task switching, resulting in degradation of performance in total. Therefore, in the conventional structure, to obtain video/audio coded and multiplexed information in which video information and audio information are alternately arranged in short time units, frequent task switching between the audio coding means and the video coding means is indispensable, resulting in degradation of performance as mentioned above. When the performance is degraded, there is a possibility that the coding process may not be completed by the next task switching time, and image and voice may be interrupted.

SUMMARY OF THE INVENTION

It is an object of the present invention to provide a method for coding and multiplexing video and audio information, which method realized video and audio coding as a software program on a multitask operating system, and provides video/audio coded and multiplexed information in which coded video information and coded audio information are alternately arranged in arbitrary units.

It is another object of the present invention to provide an apparatus for coding and multiplexing video and audio information, which apparatus realizes video and audio coding means as a software program on a multitask operating system, and provides video/audio coded and multiplexed information in which coded video information and coded audio information are alternately arranged in arbitrary units.

It is still another object of the present invention to provide a recording medium having a program for coding and multiplexing video and audio information, which program performs video and audio coding as a software program on a multitask operating system, and provides video/audio coded and multiplexed information in which coded video information and coded audio information are alternately arranged in arbitrary units.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided a multimedia data coding and multiplexing method for generating multimedia data coded and multiplexed information in which digital multimedia data comprising digitized video data and digitized audio data is coded and subjected to time division multiplexing, and the method comprises multimedia data coding step in which coded multimedia information having a reproduction time T and a quantity V is generated by coding the digital multimedia data, and block rate information is generated on the basis of the reproduction time T and the quantity V; coded multimedia information buffering step in which the coded multimedia information and the block rate information are temporarily stored in a memory unit for temporary storage; coded multimedia information read-out step in which the coded multimedia information stored in the memory unit is read out by a quantity equivalent to synchronous interval time information which is obtained by using the block rate information and shows a time interval in the time division multiplexing; and coded multimedia information synchronization step in which multimedia data coded and multiplexed information is generated by performing multiplexing to the read-out coded multimedia information. In this method, the digital multimedia data is coded, temporarily stored with the block rate information, and read by a prescribed quantity using the block rate information, for multiplexing. Thereby, the coding process and the multiplexing process are executed at independent timings.

According to a second aspect of the invention, in the method according to the first aspect, in the coded multimedia information buffering step, the temporary storage is carried out with the memory unit for temporary storage being a ring buffer; and in the coded multimedia information read-out step, the read-out is carried out with the memory unit for temporary storage being a ring buffer, and the read-out coded multimedia information is deleted. In this method, the temporary storage of coded information is carried out using the ring buffer method.

According to a third aspect of the invention, in the method according to the first aspect, in the coded multimedia information synchronization step, the reproduction time T included in the block rate information is used as the synchronous interval time information, and this is output to the coded multimedia information read-out step.

According to a fourth aspect of the invention, in the method according to the first aspect, in the multimedia data coding step, coded multimedia information unit time quantity showing a quantity of the coded multimedia information per unit time is generated as the block rate information; and in the coded multimedia data read-out step, the quantity to be read-out is decided on the basis of the coded multimedia information unit time quantity.

According to a fifth aspect of the invention, there is provided a multimedia data coding and multiplexing method for generating multimedia data coded and multiplexed information in which digital multimedia data comprising digitized video data and digitized audio data is coded and subjected to time division multiplexing, and this method comprises multimedia data coding step in which coded multimedia information having a reproduction time T and a quantity V is generated by coding the digital multimedia data; coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time; and coded multimedia information synchronization step in which the coded multimedia information stored in the memory unit is read out, and multimedia data coded and multiplexed information is generated. In this method, the coded multimedia information, which is temporary stored in such a form that unit quantities thereof are placed side by side, is read out to obtain multimedia coded and multiplexed information.

According to a sixth aspect of the invention, in the method according to the fifth aspect, the multimedia data coding step comprises: video coding step in which pro-video information comprising plural pieces of digitized still picture information is coded to generate coded video information having a reproduction time Tv and a quantity Vv; and audio coding step in which digitized pro-audio information is coded to generate coded audio information having a reproduction time Ta and a quantity Va. The multimedia buffering step comprises: video buffering step in which reproduction time information defined on the basis of the reproduction time Tv, and the coded video information equivalent to the coded multimedia unit quantity are temporarily stored in the memory unit for temporary storage in the following manner: when there is a space between two blocks of coded audio information which have already been stored, the reproduction time information and the coded video information are stored in this space and, when there is no such a space, they are stored in a place subsequent to a block of coded audio information which has previously been stored, leaving a space equivalent to the unit quantity Va of coded audio information; and audio buffering step in which reproduction time information defined on the basis of the reproduction time Ta, and the coded audio information equivalent to the coded multimedia unit quantity are temporarily stored in the memory unit for temporary storage in the following manner: when there is a space between two blocks of coded video information which have already been stored, the reproduction time information and the coded audio information are stored in this space and, when there is no such a space, they are stored in a place subsequent to a block of coded video information which has previously been stored, leaving a space equivalent to the unit quantity Vv of coded video information. In the coded multimedia information synchronization step, from the memory unit, a portion where the coded video information and the coded audio information are stored leaving no space between them is read out. In this method, the coded multimedia information, which is temporary stored in such a form that the coded video information and the coded audio information are alternately arranged in unit quantities, is read out to obtain multimedia coded and multiplexed information.

According to a seventh aspect of the invention, in the method according to the fifth aspect, in the coded multimedia information buffering step, the temporary storage is carried out with the memory unit for temporary storage being a ring buffer; and in the coded multimedia information synchronization step, the read-out is carried out with the memory unit for temporary storage being a ring buffer, and the rad-out coded multimedia information is deleted. In this method, the temporary storage of coded information is carried out using the ring buffer method.

According to an eighth aspect of the invention, the method according to the fifth aspect further comprises storage position error correction step of performing a storage position error detection process and a storage position error correction process, at prescribed time intervals. The storage position error detection process is to detect a difference between an audio storage position where coded audio information to be reproduced at a reproduction time is stored and a video storage position where coded video information to be reproduced at the reproduction time is stored, as a storage position error, in the memory unit for temporary storage, and the storage position error correction process is to correct the storage position error detected in the error detection process. In this method, an error generated by repeated use of the memory unit as a ring buffer is corrected.

According to a ninth aspect of the invention, in the method according to the eighth aspect, the storage position error correction process is performed by storing prescribed coded multimedia information in the memory unit for temporary storage. In this method, the error is corrected by inserting data.

According to a tenth aspect of the invention, in the method according to the eighth aspect, the storage position error correction process is performed by setting an additional storage position that temporarily extends the memory unit for temporary storage. In this method, the error is corrected using the temporarily extended storage area.

According to an eleventh aspect of the invention, the method according to the first aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step. In the coded multimedia information buffering step, when the dummy information insertion period is input, the coded multimedia information generated in the multimedia data coding step is abandoned by a quantity equivalent to the dummy information insertion period, without being stored in the memory unit for temporary storage. In this method, when the quantity of coded information temporarily stored increases, coded information is not stored but abandoned, and synchronization is secured by inserting dummy information.

According to a twelfth aspect of the invention, the method according to the fifth aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step. In the coded multimedia information buffering step, when the dummy information insertion period is input, the coded multimedia information generated in the multimedia data coding step is abandoned by a quantity equivalent to the dummy information insertion period, without being stored in the memory unit for temporary storage. In this method, when the quantity of coded information temporarily stored increases, coded information is not stored but abandoned, and synchronization is secured by inserting dummy information.

According to a thirteenth aspect of the invention, the method according to the first aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step. In the multimedia data coding step, when the dummy information insertion period is input, digital multimedia data is abandoned, without being coded, by a quantity equivalent to the dummy information insertion period. In this method, when the quantity of coded information temporarily stored increases, digital information is not coded but abandoned, and synchronization is secured by inserting dummy information.

According to a fourteenth aspect of the invention, the method according to the fifth aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step. In the multimedia data coding step, when the dummy information insertion period is input, digital multimedia data is abandoned, without being coded, by a quantity equivalent to the dummy information insertion period. In this method, when the quantity of coded information temporarily stored increases, digital information is not coded but abandoned, and synchronization is secured by inserting dummy information.

According to a fifteenth aspect of the invention, the method according to the first aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step. In the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information. In the coded multimedia information buffering step, when the dummy information insertion period is input, the coded multimedia information generated in the multimedia data coding step is abandoned by a quantity equivalent to the dummy information insertion period, without being stored in the memory unit for temporary storage, and thereafter, subsequent different coded information is converted to independently coded information and stored temporarily. In this method, the difference coded information which cannot be decoded is converted to decodable information using the dummy information.

According to a sixteenth aspect of the invention, the method according to the fifth aspect further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step. In the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information. In the coded multimedia information buffering step, when the dummy information insertion period is input, the coded multimedia information generated in the multimedia data coding step is abandoned by a quantity equivalent to the dummy information insertion period, without being stored in the memory unit for temporary storage, and thereafter, subsequent different coded information is converted to independently coded information and stored temporarily. In this method, the difference coded information which cannot be decoded is converted to decodable information using the dummy information.

According to a seventeenth aspect of the invention, in the method according to the first aspect, in the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information. The method further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored and, thereafter, an insertion correcting period is calculated, which period is equivalent to a process for coding digital multimedia data which follows digital multimedia data uncoded and abandoned in the multimedia data coding step and is to be difference coded information and, thereafter, the dummy information insertion period is corrected by adding the insertion correcting period, and the corrected dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step. In the multimedia data coding step, when the dummy information insertion period is input, digital multimedia data is abandoned, without being coded, by a quantity equivalent to the dummy information insertion time. In this method, the digital multimedia data which will be difference coded information that cannot be decoded is replaced with the dummy information.

According to an eighteenth aspect of the invention, in the method according to the fifth aspect, in the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information. The method further comprises: interruption prevention step in which, when the quantity of the coded multimedia information temporarily stored in the coded multimedia information buffering step exceeds a prescribed value, a dummy information insertion period is calculated on the basis of the quantity of the coded multimedia information stored and, thereafter, an insertion correcting period is calculated, which period is equivalent to a process for coding digital multimedia data which follows digital multimedia data uncoded and abandoned in the multimedia data coding step and is to be difference coded information and, thereafter, the dummy information insertion period is corrected by adding the insertion correcting period, and the corrected dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step. In the multimedia data coding step, when the dummy information insertion period is input, digital multimedia data is abandoned, without being coded, by a quantity equivalent to the dummy information insertion time. In this method, the digital multimedia data which will be difference coded information that cannot be decoded is replaced with the dummy information.

According to a nineteenth aspect of the invention, the method according to the first aspect further comprises buffer quantity decision step in which the performance of an apparatus executing the coding and multiplexing process is evaluated and, according to the result of this evaluation, the quantity of the memory unit for temporary storage used by the coded multimedia information buffering means is decided. In this method, a buffer quantity according to the performance of the apparatus is decided.

According to a twentieth aspect of the invention, the method according to the fifth aspect further comprises buffer quantity decision step in which the performance of an apparatus executing the coding and multiplexing process is evaluated and, according to the result of this evaluation, the quantity of the memory unit for temporary storage used by the coded multimedia information buffering means is decided. In this method, a buffer quantity according to the performance of the apparatus is decided.

According to a twenty-first aspect of the invention, there is provided a multimedia data coding and multiplexing apparatus for generating multimedia data coded and multiplexed information in which digital multimedia data comprising digitized video data and digitized audio data is coded and subjected to time division multiplexing, and the apparatus comprises; memory unit used for temporary storage of information; multimedia data coding means for generating coded multimedia information having a reproduction time T and a quantity V by coding the digital multimedia data, and generating block rate information on the basis of the reproduction time T and the quantity V; coded multimedia information buffering means for temporarily storing the coded multimedia information and the block rate information in the memory unit for temporary storage; coded multimedia information read-out means for reading the coded multimedia information stored in the memory unit by a quantity equivalent to synchronous interval time information which is obtained by using the block rate information and shows a time interval in the time division multiplexing; and coded multimedia information synchronization means for adding reproduction time information obtained on the basis of the block rate information to the read-out coded multimedia information, and performing multiplexing to generate multimedia data coded and multiplexed information. In this apparatus, the digital multimedia data is coded, temporarily stored with the block rate information, and read by a prescribed quantity using the block rate information, for multiplexing. Thereby, the coding process and the multiplexing process are executed at independent timings.

According to a twenty-second aspect of the invention, there is provided a multimedia data coding and multiplexing apparatus for generating multimedia data coded and multiplexed information in which digital multimedia data comprising digitized video data and digitized audio data is coded and subjected to time division multiplexing, and the apparatus comprises: memory unit used for temporary storage of information; multimedia data coding means for generating coded multimedia information having a reproduction time T and a quantity V by coding the digital multimedia data; coded multimedia information buffering means for temporarily storing the coded multimedia information in the memory unit for temporary storage so that it is divided in unit quantities using a coded multimedia information unit quantity that shows a quantity of coded multimedia data equivalent to a set reproduction time; and coded multimedia information synchronization means for reading the coded multimedia information stored in the memory unit, and generating multimedia data coded and multiplexed information. In this method, the coded multimedia information, which is temporary stored in such a form that unit quantities thereof are placed side by side, is read out to obtain multimedia coded and multiplexed information.

According to a twenty-third aspect of the invention, there is provided a recording medium containing a multimedia data coding and multiplexing program for generating multimedia data coded and multiplexed information in which digital multimedia data comprising digitized video data and digitized audio data is coded and subjected to time division multiplexing, and the program comprises: multimedia data coding step in which coded multimedia information having a reproduction time T and a quantity V is generated by coding the digital multimedia data, and block rate information is generated on the basis of the reproduction time T and the quantity V; coded multimedia information buffering step in which the coded multimedia information and the block rate information are temporarily stored in a memory unit for temporary storage; coded multimedia information read-out step in which the coded multimedia information stored in the memory unit is read out by a quantity equivalent to synchronous interval time information which is obtained by using the block rate information and shows a time interval in the time division multiplexing; and coded multimedia information synchronization step in which reproduction time information obtained on the basis of the block rate information is added to the read-out multimedia information, and multimedia data coded and multiplexed information is generated by performing multiplexing to the read-out coded multimedia information. In this program, the digital multimedia data is coded, temporarily stored with the block rate information, and read by a prescribed quantity using the block rate information, for multiplexing. Thereby, the coding process and the multiplexing process are executed at independent timings.

According to a twenty-fourth aspect of the invention, there is provided a recording medium containing a multimedia data coding and multiplexing program for generating multimedia data coded and multiplexed information in which digital multimedia data comprising digitized video data and digitized audio data is coded and subjected to time division multiplexing, and the program comprises: multimedia data coding step in which coded multimedia information having a reproduction time T and a quantity V is generated by coding the digital multimedia data; coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time; and coded multimedia information synchronization step in which the coded multimedia information stored in the memory unit is read out, and multimedia data coded and multiplexed information is generated. In this method, the coded multimedia information, which is temporary stored in such a form that unit quantities thereof are placed side by side, is read out to obtain multimedia coded and multiplexed information.

DETAILED DESCRIPTION OF THE PREFERRED EMBODIMENTS

Embodiment 1

In a video/audio coding and multiplexing apparatus according to a first embodiment of the invention, coded video information and coded audio information are accumulated in buffers and, when the quantities reach prescribed values, the video information and the audio information are taken out to make video/audio multiplexed information.

Figure 1:
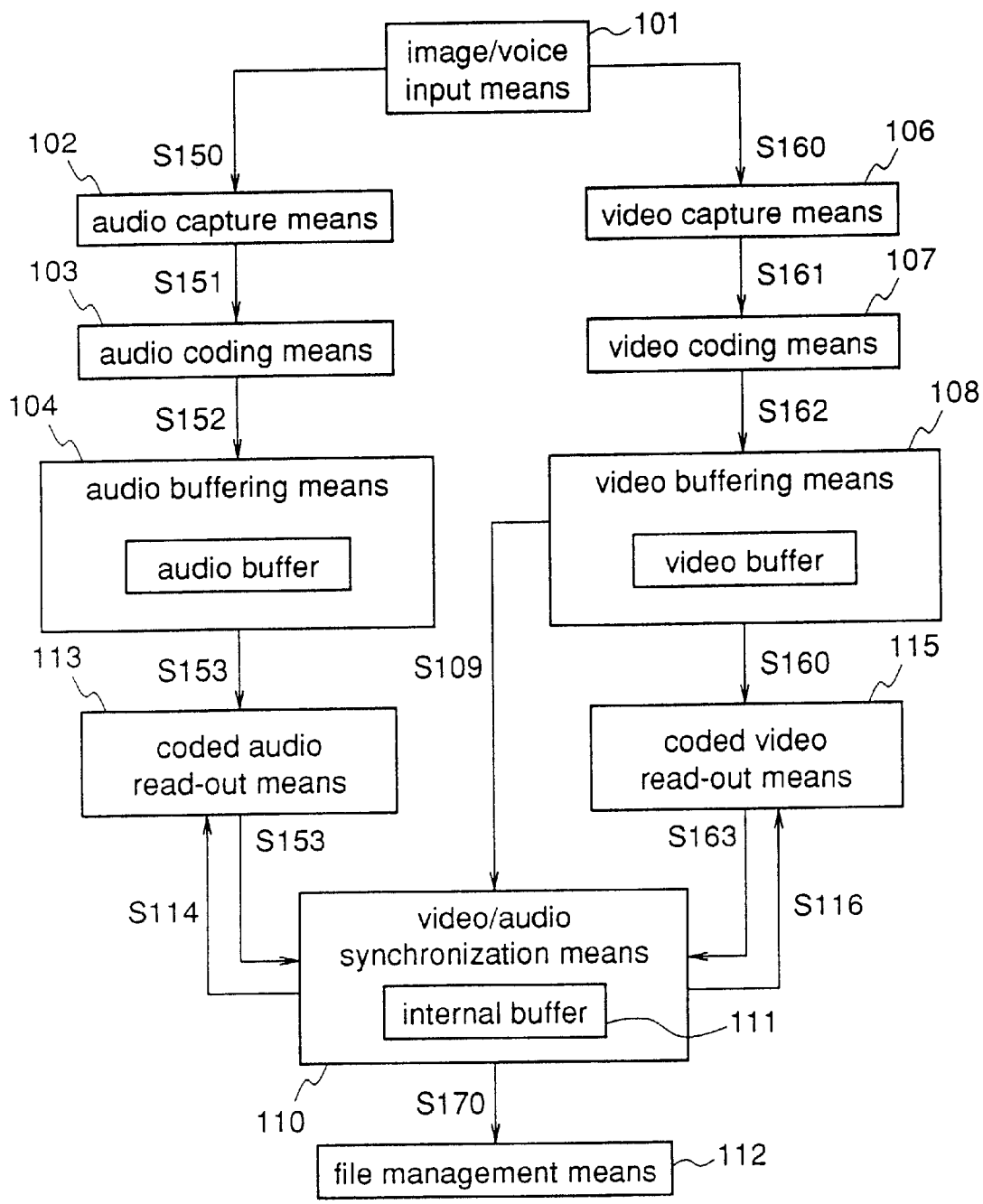
FIG. 1 is a block diagram illustrating a video/audio coding and multiplexing apparatus according to a first embodiment of the invention.

FIG. 1 is a block diagram illustrating a video/audio coding and multiplexing apparatus according to the first embodiment of the invention. As shown in the figure, the apparatus comprises an image/voice input means 101, an audio capture means 102, an audio coding means 103, an audio buffering means 104, a video capture means 106, a video coding means 107, a video buffering means 108, a video/audio synchronization means 110, a file management means 112, a coded audio read-out means 113, and a coded video read-out means 115.

The image/voice input means 101 is implemented by a video camera or the like. This means 101 captures image and voice, and outputs analog audio information S150 and analog video information S160, separately. The audio capture means 102 receives the analog audio information S150 output from the input means 101, and outputs pro-audio information S151 comprising discrete digital data. The video capture means 106 receives the analog video information output from the input means 101, and outputs pro-video information S161 comprising discrete digital data. The pro-video information S161 is composed of plural pieces of still picture information per unit time, having a predefined resolution. The audio capture means 102 and the video capture means 106 are implemented by a video capture board in an ordinary personal computer system.

The audio coding means 103 receives the pro-audio information S151 output from the audio capture means 102, compresses the information by coding it excluding redundant information, and outputs coded audio information S152. The video coding means 107 receives the pro-video information S162 output from the video capture means 106, compresses the information by coding it excluding redundant information, and outputs coded video information S162. Further, the video coding means 107 generates video block rate information S203 (see FIG. 2) that shows the size and reproduction time of the coded video information S162, and outputs this information S203 together with the coded video information S162. In this first embodiment, the audio coding means 103 outputs the coded video information S152 at a fixed bit rate (information quantity per unit time), 192 Kbit/sec (Kbps), regardless of the input pro-audio information S151. In contrast with the audio coding means 103, the video coding means 107 outputs the coded video information S162 at a variable bit rate according to the input pro-video information S161.

The audio buffering means 104 contains an audio buffer, and temporarily stores the coded audio information S152 in the audio buffer. The video buffering means 108 contains a video buffer, and temporarily stores the coded video information S162 in the video buffer. The audio and video buffers are implemented by high-speed memory units, such as semiconductor memories. Further, it is desired that these buffers used for temporary storage have FIFO (First-In First-Out) structure so that they can perform FIFO processing. The FIFO structure is implemented according to an algorithm of a ring buffer or the like. However, it is not always necessary to use a specific method such as a ring buffer.

Figure 2:
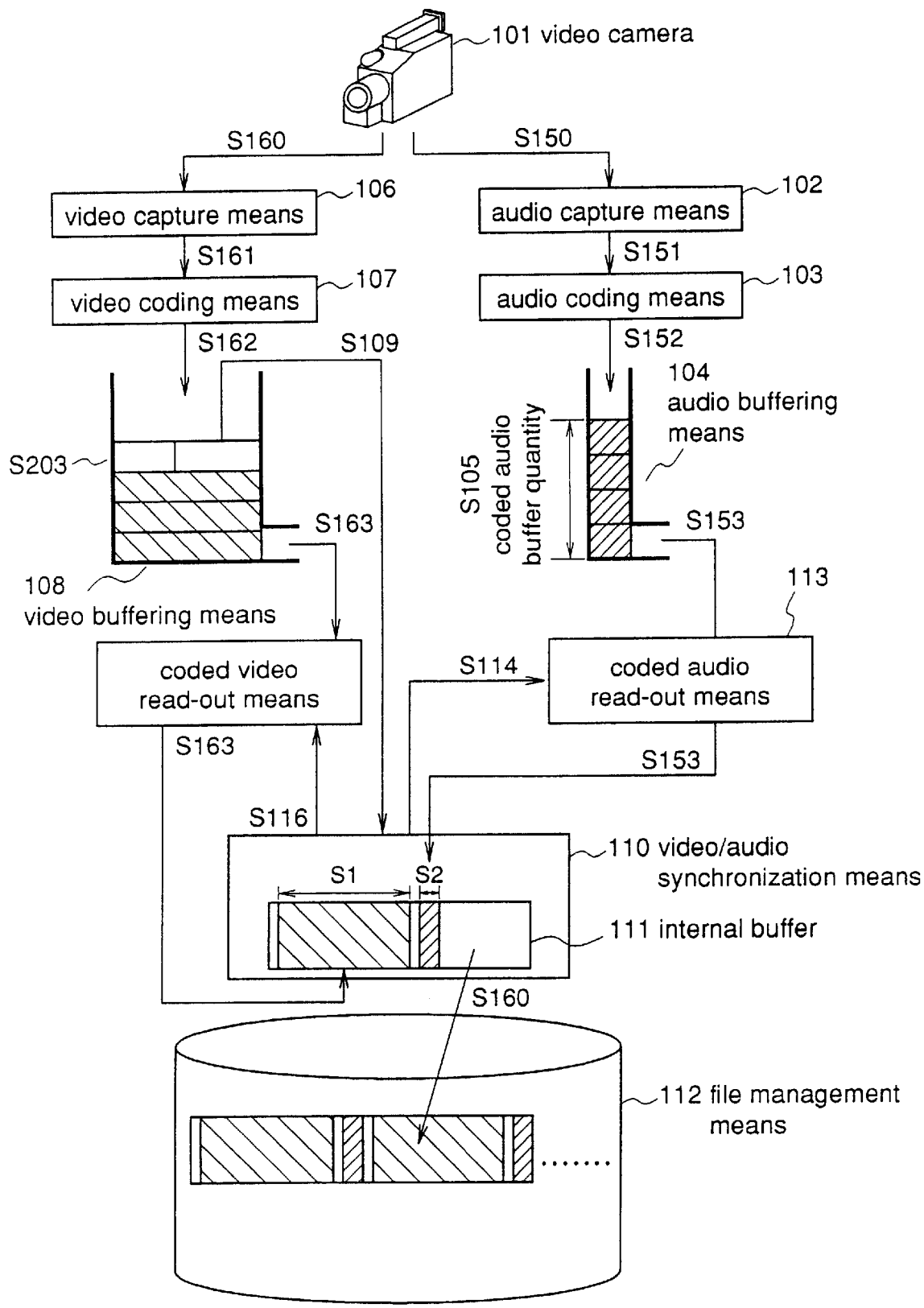
FIG. 2 is a diagram for explaining the operation of the apparatus shown in FIG. 1.

The audio buffering means 104 holds the quantity of the coded audio information stored in the audio buffer as a coded audio buffer quantity S105 (see FIG. 2). When the coded audio information is stored in the audio buffer or when it is read out or deleted from the audio buffer, the coded audio buffer quantity S105 is updated. The video buffering means 107 temporarily stores the video block rate information S203 output from the video coding means 107, together with the coded video information S162.

The coded audio read-out means 113 reads the coded audio information stored in the audio buffering means 104, according to audio time information S114 output from the video/audio synchronization means 110. The read-out means 113 outputs the read-out coded audio information S153 to the video/audio synchronization means 110. The coded video read-out means 115 reads the coded video information stored in the video buffering means 108, according to video time information S116 output from the video and audio synchronization means 110. The read-out means 115 outputs the read-out coded audio information S163 to the video/audio synchronization means 110. In this first embodiment, the audio coding means 103 outputs the coded audio information at the same bit rate (information quantity per unit time). The coded audio read-out means 113 reads the coded audio information S153 by a quantity equivalent to the audio time information 114 multiplied by 192 Kbit (audio time information 114×192 Kbit) from the audio buffering means 104. The coded video read-out means 115 reads the coded video information S163 by a quantity equivalent to a reproduction time identical to the video time information S116, from the video buffering means 108. The video block rate information generated by the video coding means 107 is used to decide the quantity equivalent to the reproduction time.

The video/audio synchronization means 110 gives sequence headers to the coded video information S163 and the coded audio information S152 output from the coded video read-out means 115 and the coded audio read-out means 113, respectively, and arranges these information S163 and S152 alternately. The synchronization means 110 has an internal buffer 111 for this work. A high-speed memory unit is used as the internal buffer 111, like the video and audio buffers. The file management means 112 serves as a file system in a general operating system, and manages a file in a storage unit for preservation (generally, hard disk). The file management means 112 stores information S171 output from the video/audio synchronization means 110 in the file in the storage unit.

Figure 3:
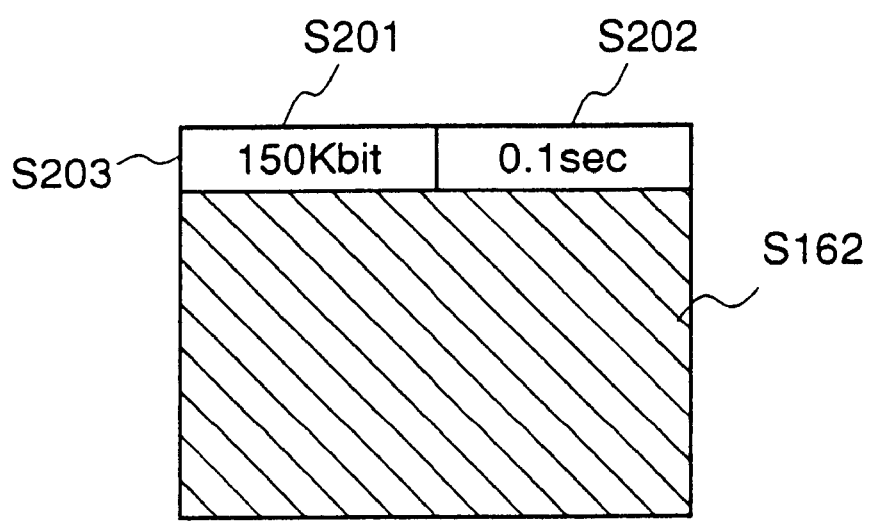
FIG. 3 is a diagram for explaining temporary storage in the apparatus shown in FIG. 1.

FIG. 2 is a diagram for explaining the operation of the apparatus shown in FIG. 1, with respect to the video/audio processing. FIG. 3 is a diagram for explaining temporary storage by the video buffering means 108. In FIG. 3, S162 denotes coded video information processed by the video coding means 107.

The video coding means 107 generates the video block rate information S203 as mentioned above, and outputs this information S203 and the coded video information S162 to the video buffering means 106. The video buffering means 108 stores these information S203 and S162 in the video buffer. The video block rate information S203 is composed of a coded video quantity S201 showing the size of coded video information, and coded video time information S202 showing a reproduction time when coded video information is reproduced. The coded video time information S202 is used as synchronous interval time information showing multiplexing unit (time interval) for video/audio multiplexing.

A description is now given of the operation of the video/audio coding and multiplexing apparatus according to this first embodiment, along FIG. 2, with reference to FIGS. 1 and 3.

First of all, in FIG. 2, the video camera 101 captures image and voice, and outputs analog audio information S150 and analog video information S160 separately. The audio capture means 102 receives the analog audio information S150, digitizes it, and outputs digital pro-audio information S151. The audio coding means 103 encodes the pro-audio information S151 and outputs coded audio information S152. Since 0.05 sec has elapsed, 9.6 Kbit of coded audio information is output. The audio buffering means 103 stores the coded audio information, updates the coded audio buffer quantity S105 to 9.6 Kbit, and holds this quantity.

On the other hand, the video capture means 106 receives the analog video information S160, digitizes it, and outputs digital pro-audio information S161. The video coding means 107 encodes the pro-video information S161 and outputs coded video information S162. Since 0.1 sec has elapsed, 150 Kbit of coded video information is output. On the basis of the result of the coding process, the video coding means 107 generates the video block rate information S203 which comprises a coded video quantity showing the size of the coded video information, and coded video time information showing a reproduction time when the coded video information is reproduced. The video block rate information S203 is output from the video coding means 107, together with the coded video information S162.

The video buffering means 108 stores the video block rate information S203 and the coded video information S162 in the video buffer. At this time, since the coded video time information S202 included in the video block rate information S203 will be used later for video/audio synchronization, it is stored as synchronous interval time information S109.

The video/audio synchronization means 110 captures the synchronous interval time information S109 possessed by the video buffering means 108, and outputs this value as audio time information S114 to the coded audio read-out means 113. Likewise, the video/audio synchronization means 110 outputs the video time information S116 based on the synchronous interval time information S109 to the coded video read-out means 115. In this case, both the audio time information S114 and the video time information S116 show "0.1 sec".

Receiving the audio time information S114 showing "0.1 sec", the coded audio read-out means 113 knows that 19.2 Kbit of coded audio information equivalent to 0.1 sec should be read out, and compares this quantity with the coded audio buffer quantity S105 possessed by the audio buffering means 104. Since the coded audio buffer quantity S105 is 9.6 Kbit it as mentioned above, that is, less than the quantity of information to be read out, so that the coded audio read-out means 113 does not read the coded audio information.

On the other hand, receiving the video time information S116 showing "0.1 sec", the coded video read-out means 115 knows that coded video information equivalent to 0.1 sec should be read out, and refers to the video block rate information S203 possessed by the video buffering means 108. Then, the coded video read-out means 115 knows that the coded video information stored in the video buffer in the video buffering means 108 is equivalent to 0.1 sec and its quantity is 150 Kbit, so that the read-out means 115 reads out the 150 Kbit of coded video information S163. Further, the read-out means 115 deletes the coded video information S162 corresponding to the read-out information, and the video block rate information S203, from the video buffer in the video buffering means 108.

The coded video read-out means 115 outputs the read-out coded video information S163 to the video/audio synchronization means 110, wherein the coded video information S163 is stored in the internal buffer 111.

In this stage, a video coding process is executed. The video coding means 107 encodes the pro-video information S161 and outputs coded video information S162. It is assumed that 0.2 sec has elapsed and 200 Kbit of coded video information is output. According to the result of the coding process, the video coding means 107 generates the video block rate information S203 which comprises a coded video quantity showing the size of coded video information, and coded video time information showing a reproduction time when the coded video information is reproduced. The video block rate information S203 is output from the video coding means 107, together with the coded video information S162. The video buffering means 108 stores the video block rate information S203 and the coded video information S162 in the video buffer. The coded video time information S202 possessed by the video block rate information S203 is stored as synchronous interval time information S109.

Meanwhile, an audio coding process is executed. The audio coding means 103 encodes the pro-audio information S151 and outputs coded audio information S152. It is assumed that 0.35 sec has elapsed and 67.2 Kbit of coded audio information is output. The audio buffering means 103 stores the coded audio information, updates the coded audio buffer quantity S105 to 76.8 Kbit, and holds this quantity.

Since the coded audio read-out means 113 receives the audio time information S114 showing "0.1 sec", 19.2 Kbit of coded audio information equivalent to 0.1 sec should be read out. At this time, the coded audio buffer quantity S105 possessed by the audio buffering means 104 is 76.8 Kbit, that is, exceeds the quantity of information to be read out. So, the coded audio read-out means 113 reads out 19.2 Kbit of coded audio information S153, and deletes the coded audio information S152 corresponding to the read-out information, from the audio buffer in the audio buffering means 104. In response to the deletion from the audio buffer, the audio buffering means 104 updates the coded audio buffer quantity S105 to 57.6 Kbit and hold this quantity.

The coded audio read-out means 113 outputs the read-out coded audio information S153 to the video/audio synchronization means 110. The video/audio synchronization means 110 stores the coded audio information S153 in the internal buffer 111. At this time, the video/audio synchronization means 110 generates video/audio coded and multiplexed information S170 by placing the coded audio information S153 by the side of the coded audio information which has previously been input. The video/audio coded and multiplexed information S170 is input to the file management means 112. The file management means 112 retains the video/audio coded and multiplexed information S170 as a file, or additionally stores it in a file. In the case of FIG. 2, the video/audio coded and multiplexed information S170 to be added in the file comprises coded video information having a quantity S1 corresponding to the synchronous interval time information S109 and coded audio information having a quantity S2 corresponding to the synchronous interval time information S109.

As described above, the video/audio coding and multiplexing apparatus according to the first embodiment of the invention is provided with the video coding means 107 for generating the coded video information S162 by coding the pro-video information S161, and generating the video block rate information S203 that shows the size and reproduction time of the coded video information S162, and outputting the information S203 together with the coded video information S162; the video buffering means 108 for temporarily storing the information S203 and the information S162; the audio buffering means 104 for temporarily storing the coded audio information; the video/audio synchronization means 110 using time information included in the video block rate information S203 as the synchronous interval time information S109 used for multiplexing, and outputting the video time information S116 and the audio time information S114; the coded video read-out means 115 for reading the coded video information by a quantity equivalent to the video time information S116; and the coded audio read-out means 113 for reading the coded audio information by a quantity equivalent to the audio time information S114. In this structure, coded video information and coded audio information are temporarily stored (accumulated) in the respective buffers, and the video information and the audio information are read out from the buffers when their quantities are enough to be output alternately. After rearranging the video information and the audio information, these are output as video/audio coded and multiplexed information. Therefore, even though the video coding process and the audio coding process are not always performed equally, it is possible to multiplex the video information and the audio information in the same reproduction time units. Further, since the video block rate information is temporarily stored together with the coded video information and multiplexing is performed using the video block rate information, even when the bit rate of coded video information is not fixed but variable, i.e., even when its quantity per unit time varies due to the pro-video information or other factors, accurate video/audio multiplexing can be performed.

While in this first embodiment the video/audio coded and multiplexed information is finally stored in a storage unit, it may be transmitted through a network to the outside. Also in this case, the same effects as mentioned above are obtained. Therefore, the present invention is applicable to rate control when data is transmitted through a network in which the transmission quantity changes dynamically.

Further, while in this first embodiment the coded video information is output at a variable bit rate while the coded audio information is output at a fixed bit rate, the present invention is not limited to this first embodiment. Even when the coded audio information is output at a variable bit rate, accurate video/audio multiplexing is achieved by outputting audio block rate information together with the coded audio information, as in the case of the coded video information. In this case, as synchronous interval time information, time information (coded audio time information) included in the audio block rate information may be employed.

Furthermore, while in this first embodiment the coded video time information included in the video block rate information is used as the synchronous interval time information, a predetermined value may be used as the synchronous interval time information. In this case, on the assumption that coded video time information whose value is close to the synchronous interval time information is used, coded video information is read out by a quantity equivalent to the coded video time information and used for multiplexing. For example, when the synchronous interval time information is 0.5 sec and there is a block having coded video time information of 0.3 sec and a block having coded video time information of 0.2 sec, coded video information equivalent to the 0.3 sec block and coded video information equivalent to the 0.2 sec block are read out at the same time, thereby providing video/audio coded and multiplexed information as described for the first embodiment of the invention.

Embodiment 2

In a video/audio coding and multiplexing apparatus according to a second embodiment of the invention, coded information accumulated in a buffer is taken out when its quantity reaches a predetermined value, thereby providing multiplexed information.

Figure 4:
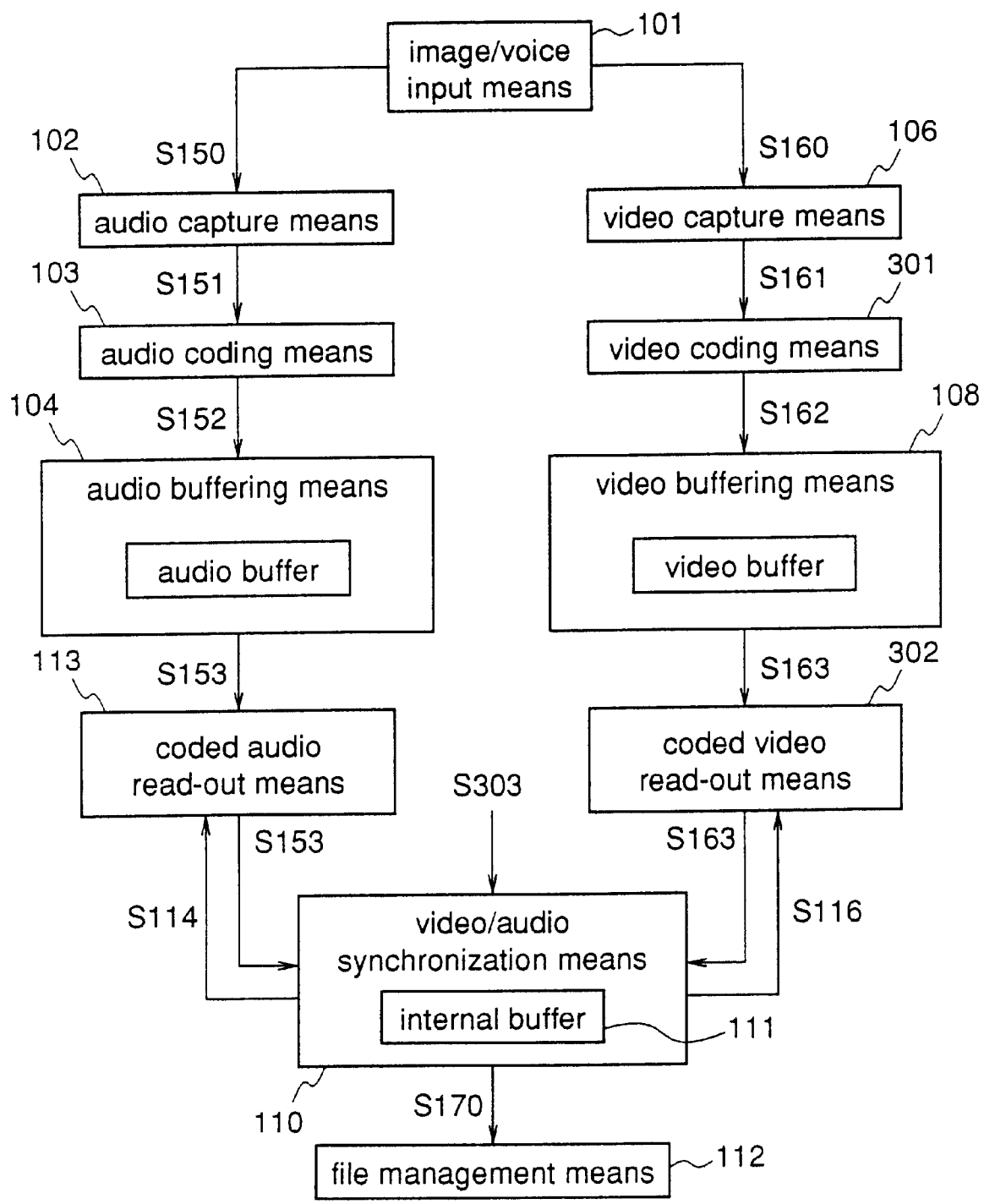
FIG. 4 is a block diagram illustrating a video/audio coding and multiplexing apparatus according to a second embodiment of the invention.

FIG. 4 is a block diagram illustrating a video/audio coding and multiplexing apparatus according to the second embodiment of the invention. With reference to FIG. 4, the apparatus comprises an image/voice input means 101, an audio capture means 102, an audio coding means 103, an audio buffering means 104, a video capture means 106, a video buffering means 108, a video/audio synchronization means 110, a file management means 112, a coded audio read-out means 113, a video coding means 301, and a coded video read-out means 302.

The video coding means 301 encodes pro-video information S161 to generate coded video information S162, like the video coding means 107 according to the first embodiment. Further, the video coding means 301 generates information relating to a quantity of the coded video information S162 per unit time (hereinafter referred to as coded video unit time quantity S401) which will be later described in more detail using FIGS. 5 and 6, and outputs this quantity S401 to the video buffering means 108. The video buffering means 108 stores the coded video information S162 and the coded video unit time quantity S401. The coded video read-out means 302 reads out the coded video information by a quantity equivalent to input video time information S114 and performs deletion as described in the first embodiment, but it employs the coded video unit time quantity S401 when investigating the quantity of coded video information to be read out. The video/audio synchronization means 110 outputs video time information S114 and audio time information S116, using synchronous interval time information S303 having a predetermined value. In this second embodiment, the synchronous interval time information S303 is set at 0.1 sec.

The image/voice input means 101, the audio capture means 102, the audio coding means 103, the audio buffering means 104, the video capture means 106, the file management means 112, and the coded audio read-out means 113 are identical to those described for the first embodiment and, therefore, do not require repeated description. Further, like the first embodiment, the coded audio information S152 is output from the audio coding means 103 at a fixed bit rate of 192 Kbps, and the coded video information S162 is output at a variable bit rate.

Figure 5:
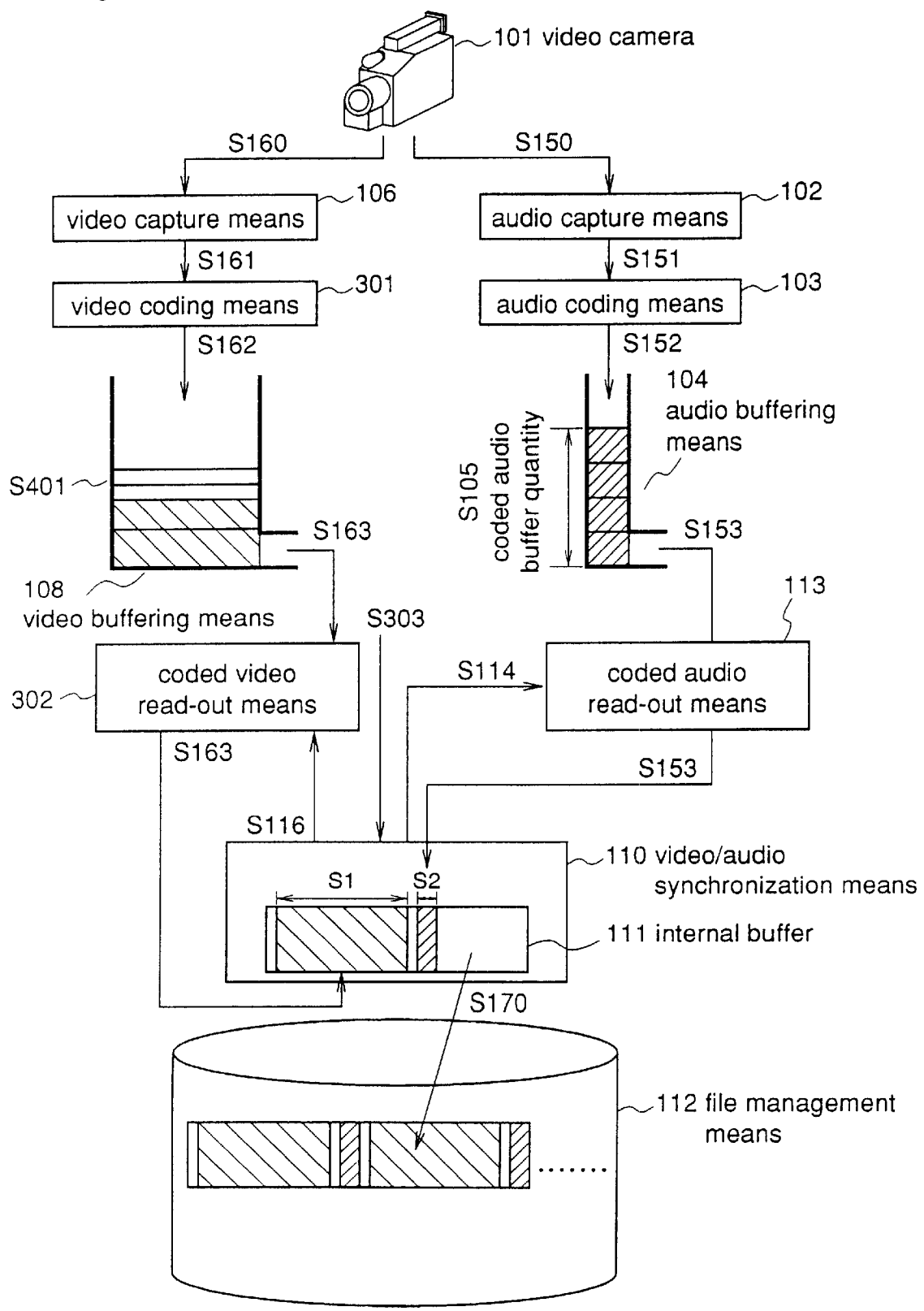
FIG. 5 is a diagram for explaining the operation of the apparatus shown in FIG. 4.
Figure 6:
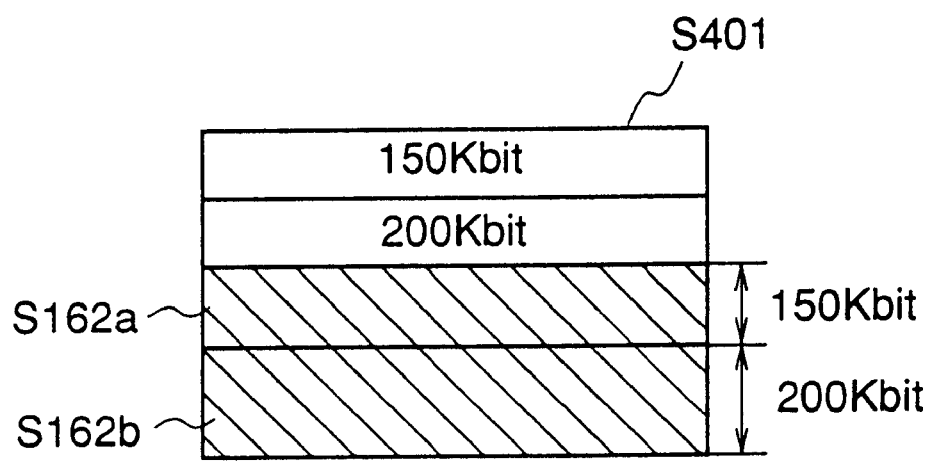
FIG. 6 is a diagram for explaining temporary storage in the apparatus shown in FIG. 4.

FIG. 5 is a diagram for explaining the operation of the video/audio coding and multiplexing apparatus shown in FIG. 4, with respect to video/audio processing. FIG. 6 is a diagram for explaining temporary storage by the video buffering means 108. In FIG. 6, S162a and S162b denote coded video information processed by the video coding means 301. The video coding means 301 generates the coded video unit time quantity S401 as described above, and outputs this quantity S401 to the video buffering means 108, together with the coded video information S162a and S162b. The video buffering means 108 stores the three pieces of information in a video buffer. In this second embodiment, as shown in FIG. 6, at least one coded video unit time quantities S401 is accumulated temporarily. In FIG. 6, two quantities "150 Kbit" and "200 Kbit" shown by S401 mean that the quantity of a portion S162a of the coded video information S162 corresponding to the first unit time (0.1 sec) is 150 Kbit, and that the quantity of a portion S162b of the information S162 corresponding to the next unit time (0.1 sec) is 200 Kbit, respectively. That is, the coded video unit time quantities S401 are generated as information showing the quantities of two pieces of coded video information S162a and S162b into which the coded video information S162 output from the video coding means 301 is divided so that each piece has a reproduction time equal to the unit time (0.1 sec).

Hereinafter, the video/audio processing operation of the apparatus according to this second embodiment will be described along FIG. 5, with reference to FIGS. 4 and 6.

With reference to FIG. 5, initially, the video camera 101 captures image and voice, and outputs analog audio information S150 and analog video information S160 separately. The audio capture means 102 receives the analog audio information S150, digitizes it, and outputs digital pro-audio information S151. The audio coding means 103 encodes the pro-audio information S151 and outputs coded audio information S152. It is assumed that 0.05 sec has elapsed and 9.6 Kbit of coded audio information is output. The audio buffering means 103 stores the coded audio information, updates the coded audio buffer quantity S105 to 9.6 Kbit, and retains this value.

Meanwhile, the video capture means 106 receives the analog video information S160, digitizes it, and outputs digital pro-video information S161. Here, it is assumed that video coding is not carried out due to execution of another program and the pro-video information S161 is continuously output for 0.2 sec.

When video coding is executed, the video coding means 301 encodes the pro-video information S161 equivalent to the elapsed time of 0.2 sec to generate coded video information S162, and outputs this to the video buffering means 108. Assuming that 150 Kbit of coded video information is output in the first 0.1 sec of the elapsed time of 0.2 sec and 100 Kbit of coded video information is output in the next 0.1 sec, the video coding means 301 generates coded video unit time quantities S401 showing "150 Kbit" and "200 Kbit" and outputs these quantities to the video buffering means 108.

The video buffering means 108 stores the coded video information S162 output from the video coding means 301 and the coded video unit time quantities S401 as shown in FIG. 6.

The video/audio synchronization means 110 employs the synchronous interval time information S303 having a predetermined value "0.1 sec", and outputs this value to the coded audio read-out means 113 as the audio time information S114, and to the coded video read-out means 115 as the video time information S116.

Receiving the audio time information S114 showing "0.1 sec", the coded audio read-out means 113 knows that 19.2 Kbit of coded audio information equivalent to 0.1 sec should be read out, and compares this quantity with the coded audio buffer quantity S105 stored in the audio buffering means 104. Since the coded audio buffer quantity S105 is 9.6 Kbit, i.e., less than the quantity to be read out, the coded audio read-out means 113 does not read the coded audio information.

Meanwhile, receiving the video time information S116 showing "0.1 sec", the coded video read-out means 115 knows that coded video information equivalent to 0.1 sec should be read out, and refers to the coded video unit time quantities S401 stored in the video buffering means 108. Then, the coded video read-out means 115 knows that the quantity of coded video information corresponding to the first 0.1 sec stored in the video buffer in the video buffering means 108 is 150 Kbit, and reads 150 Kbit of coded video information and outputs this as coded video information S163 to the video/audio synchronization means 110. Further, the coded video read-out means 11b deletes the coded video information S162a corresponding to the read-out quantity and the coded video unit time quantity S401 showing "150 Kbit" corresponding to S162a, from the video buffer in the video buffering means 108. The video/audio synchronization means 110 stores the coded video information S163 in the internal buffer 111.

Here, audio coding is executed. The audio coding means 103 encodes the pro-audio information S151 and outputs coded audio information S152. It is assumed that 0.15 sec has elapsed and 28.8 Kbit of coded audio information is output. The audio buffering means 103 stores the coded audio information, updates the coded audio buffer quantity S105 to 38.4 Kbit, and retains this quantity.

Since the coded audio read-out means 113 has received the audio time information S114 showing "0.1 sec", 19.2 Kbit of coded audio information, that is equivalent to 0.1 sec, should be read out. The coded audio buffer quantity S105 stored in the audio buffering means 104 is 38.4 Kbit, that is, it exceeds the quantity of information to be read out. So, the coded audio read-out means 113 reads out 19.2 Kbit of coded audio information S153, and deletes the coded audio information S152 corresponding to the read-out quantity, from the audio buffer in the audio buffering means 104. In response to the deletion of information from the audio buffer, the audio buffering means 104 updates the coded audio buffer quantity S105 to 19.2 Kbit and retains this quantity.

The coded audio read-out means 113 outputs the read-out coded audio information S153 to the video/audio synchronization means 110. The video/audio synchronization means 110 stores the coded audio information S153 in the internal buffer 111. At this time, the video/audio synchronization means 110 generates video/audio coded and multiplexed information S170 by placing the coded audio information S153 by the side of the coded video information which has previously been input. The video/audio coded and multiplexed information S170 is input to the file management means 112. The file management means 112 retains the video/audio coded and multiplexed information S170 as a file, or additionally stores it in a file. In the case shown in FIG. 5, the additionally stored information S170 comprises coded video information having a quantity S1 corresponding to the synchronous interval time information S303 and coded audio information having a quantity S2 corresponding to the synchronous interval time information S303.

The video/audio synchronization means 110 again outputs the audio time information S114 and the video time information S116, both showing the value of synchronous interval time information S303, "0.1 sec", to the coded audio read-out means 113 and the coded video read-out means 302, respectively.

Receiving the audio time information S114 showing "0.1 sec", the coded audio read-out means 113 reads 19.2 Kbit of coded audio information S153, and performs deletion from the audio buffer and updation of the coded audio buffer quantity S105, in the same manner as mentioned above.

When the coded audio information S153 is input to the video/audio synchronization means 110, video/audio coded and multiplexed information S170 is generated, and this information S170 is input to the file management means 112 and additionally stored in the file in the file management means 112.

As described above, the video/audio coding and multiplexing apparatus according to the second embodiment is provided with the video coding means 301 which generates coded video information S162 by coding pro-video information S161, generates coded video unit time quantity information S401 showing a quantity of coded video information S162 per unit time, and outputs this information S401 together with the coded video information S162; the video buffering means 108 for temporarily storing the information S401 and the information S162; the audio buffering means 104 for temporarily storing coded audio information; the video/audio synchronization means 110 which employs a predetermined value of synchronous interval time information S109 and outputs this values as video time information S116 and audio time information S114; the coded video read-out means 115 for reading the coded video information by a quantity equivalent to the video time information S116; and the coded audio read-out means 113 for reading the coded audio information by a quantity equivalent to the audio time information S114. By employing the coded video unit time quantity information S401 showing the quantity of coded video information corresponding to the unit time, audio and video multiplexing can be performed at intervals based on the unit time, independently of the quantity of coded video information output from the video coding means. Hence, like the first embodiment of the invention, it is possible to multiplex the video information and the audio information with the same reproduction time unit even though the video coding process and the audio coding process are not performed equally. In addition, even though the unit of coded information output at a time is increased, audio and video multiplexing can be performed with an arbitrary unit that has been set in advance. Accordingly, even when the interval of operation timings of the coding means is increased due to execution of another program or the like, for example, when the video coding means 301 (the audio coding means 103) operates every second, the video/audio synchronization means 110 can output coded and multiplexed video and audio information in which video information and audio information are alternately placed in units of 0.1 sec. Furthermore, in this second embodiment, using the coded video unit time quantity S401, a quantity of coded information equivalent to the unit time is investigated before multiplexing. So, even though the coded video information is output, not as a fixed bit rate, but at a variable bit rate, i.e., even though its quantity per unit time changes due to the pro-video information or other factors, accurate video and audio multiplexing can be performed.

While in this second embodiment the coded video information is output at a variable bit rate while the coded audio information is output at a fixed bit rate, the present invention is not limited to this second embodiment. Even when the coded audio information is output at a variable bit rate, accurate video and audio multiplexing is realized by outputting coded audio unit time quantity information together with the coded audio information, like in the case of the coded video information.

Furthermore, while in this second embodiment the synchronous interval time information and the coded video unit time quantity have the same unit time (0.1 sec), these may have different unit times. In this case, on the assumption that coded video time information having a value approximate to the synchronous interval time information is employed, the coded video information corresponding to the coded video time information is read out for multiplexing. For example, when the synchronous interval time information is 0.5 sec and the unit time of the coded video unit time quantity is 0.1 sec, the coded video information is read by a quantity five times as much as the coded video unit time quantity (5×0.1) at the same time, whereby video/audio coded and multiplexed information as provided by the second embodiment can be obtained.

Embodiment 3

A video/audio coding and multiplexing apparatus according to a third embodiment of the invention performs abandonment of coded information and insertion of dummy information, thereby to avoid information's overflowing a buffer and to secure synchronization in video/audio multiplexing.

Figure 7:
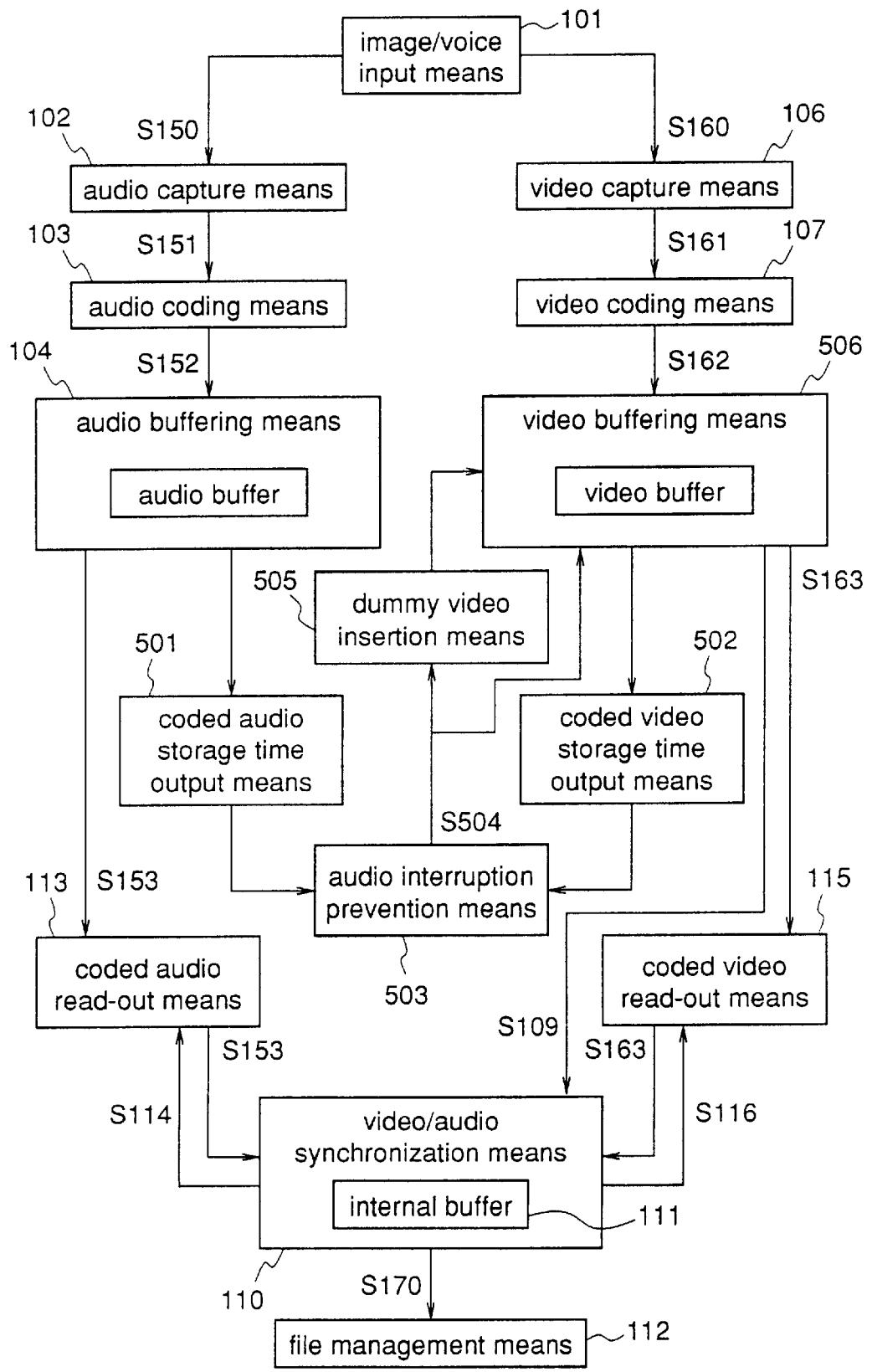
FIG. 7 is a block diagram illustrating a video/audio coding and multiplexing apparatus according to a third embodiment of the invention.

FIG. 7 is a block diagram illustrating an video/audio coding and multiplexing apparatus according to the third embodiment of the invention. With reference to FIG. 7, the apparatus comprises an image/voice input means 101, an audio capture means 102, an audio coding means 103, an audio buffering means 104, an video capture means 106, a video coding means 107, a video/audio synchronization means 110, a file management means 112, a coded audio read-out means 113, a coded video read-out means 115, coded audio storage time output means 501, a coded video storage time output means 502, an audio interruption prevention means 503, a dummy video insertion means 504, and a video buffering means 506. This structure is fundamentally identical to the structure according to the first embodiment except that the coded audio storage time output means 501, the coded video storage time output means 502, the audio interruption prevention means 503, and the dummy video insertion means 504 are added. Further, like the first embodiment, coded audio information S152 is output from the audio coding means 103 at a fixed bit rate of 192 Kbps, and coded video information S162 is output at a variable bit rate.

The coded audio storage time output means 501 obtains a reproduction time of pro-audio information corresponding to all the coded audio information stored in the audio buffer in the audio buffering means 104, and outputs the reproduction time. Since the coded audio information S152 is output at a fixed bit rate of 192 Kbps, the coded audio storage time output means 501 divides a coded audio buffer quantity S105 (refer to FIG. 8) showing a quantity of information stored in the audio buffer, by the value of the fixed bit rate, 192 Kbps.

The coded video storage time output means 502 obtains a reproduction time of pro-video information corresponding to all the coded video information stored in the video buffer in the video buffering means 108, and outputs the reproduction time. Also in this third embodiment, like the first embodiment, the video coding means 107 generates video block rate information S203 showing the size and reproduction time of the coded video information S162, and outputs this information together with the coded video information S162. So, the coded video storage time output means 502 obtains the total of plural pieces of coded video time information S202 included in the video block rate information S203, and outputs the total.

The audio interruption prevention means 503 monitors the quantity of coded audio information stored in the audio buffer in the audio buffering means 104 and, when the quantity attains a prescribed value, the means 503 generates a dummy video inserted period S504 and outputs this to the dummy video insertion means 505 and to the video buffering means 108. In this third embodiment, this value is 576 Kbit equivalent to three seconds of audio information. Further, when the audio interruption prevention means 503 calculates the dummy video inserted period S504, assuming that the coded audio storage time output from the coded audio storage time output means 501 is T1 and the coded video storage time output from the coded video storage time output means 502 is T2, T2 is subtracted from T1 to obtain T3 as the dummy video inserted period S504.

Receiving the dummy video inserted period S504, the dummy video insertion means 505 generates dummy video information which is coded video information, and outputs the information to the video buffering means 108. In addition, it also generates video block rate information to be added to the dummy video information. With respect to coded video time information S202 included in the video block rate information S203, it is generated using the dummy video inserted period S504 so that it has the same value as the dummy video inserted period S504. Further, in this third embodiment, the dummy video information is generated as coded video information having a reproduction time corresponding to the dummy video inserted period S504 and being a code showing "identical to the previous (the last) static image".

When the dummy video inserted period S504 is input to the video buffering means 506, the video buffering means 506 abandons the coded video information by a quantity equivalent to the dummy video inserted period, without storing it in the video buffer.

The image/voice input means 101, the audio capture means 102, the audio coding means 103, the audio buffering means 104, the video capture means 106, the file management means 112, the coded audio read-out means 113, and the coded video read-out means 115 are identical to those described for the first embodiment and, therefore do not require repeated description.

Figure 8:
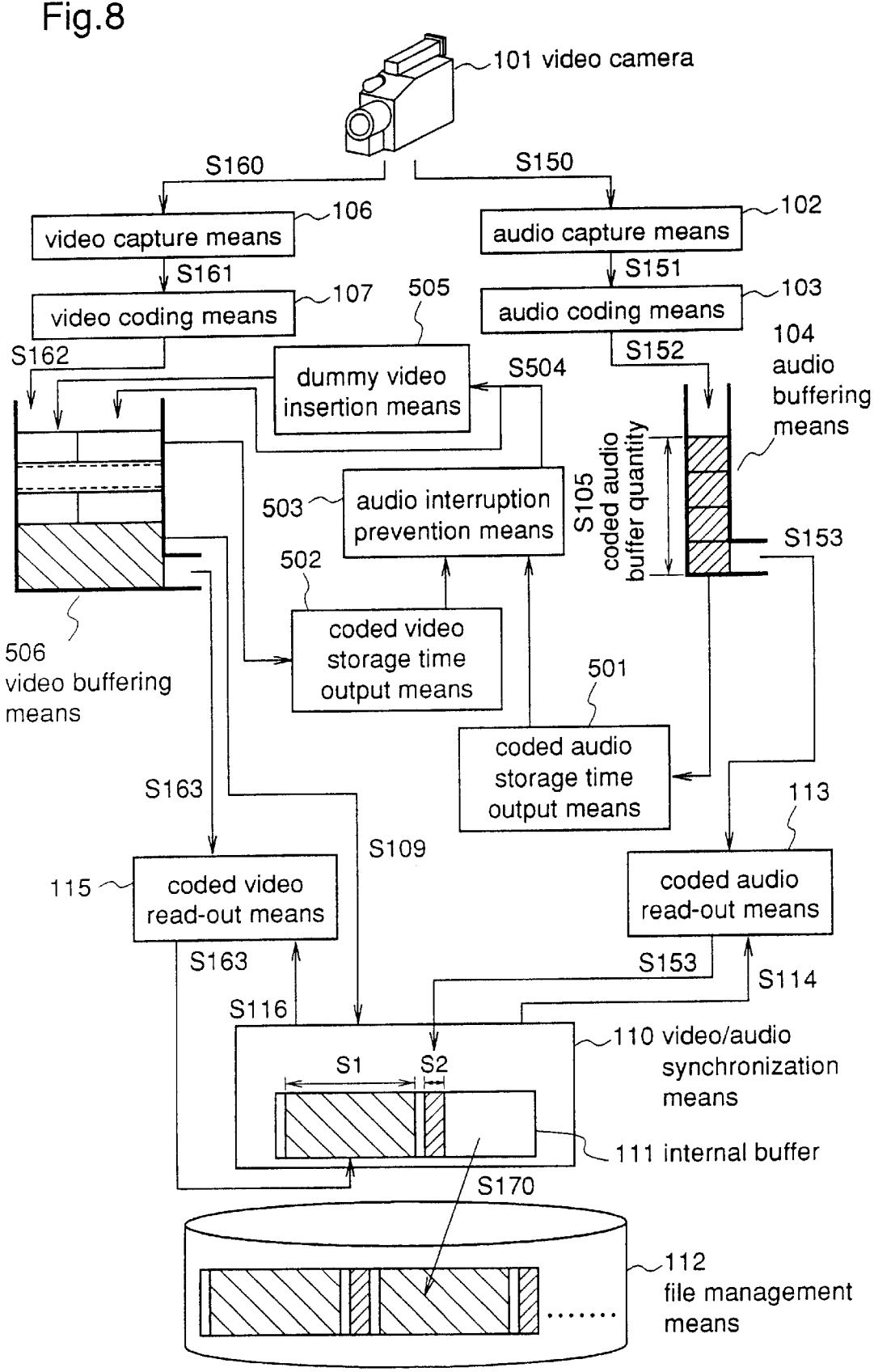
FIG. 8 is a diagram for explaining the operation of the apparatus shown in FIG. 7.

FIG. 8 is a diagram for explaining the operation of the video/audio coding and multiplexing apparatus shown in FIG. 7, with respect to video/audio processing. Hereinafter, the video/audio processing by the apparatus according to this third embodiment will be described along FIG. 8, with reference to FIG. 7.

With reference to FIG. 8, initially, the video camera 101 captures image and voice, and outputs analog audio information S150 and analog video information S160 separately. The audio capture means 102 receives the analog audio information S150, digitizes it, and outputs digital pro-audio information S151. The audio coding means 103 encodes the pro-audio information S151 and outputs coded audio information S152. It is assumed that 0.05 sec has elapsed and 9.6 Kbit of coded audio information is output. The audio buffering means 103 stores the coded audio information, updates the coded audio buffer quantity S105 to 9.6 Kbit, and retains this value.

Meanwhile, the video capture means 106 receives the analog video information S160, digitized it, and outputs digital pro-video information S161. The video coding means 107 encodes the pro-video information S161 and outputs coded video information S162. Here, it is assumed that 0.1 sec has elapsed and 150 Kbit of coded video information is output. On the basis of the result of the coding process, the video coding means 107 generates video block rate information S203 which comprises a coded video quantity showing the size of the coded video information, and coded video time information showing a reproduction time when the coded video information is reproduced, and outputs this information S203 together with the coded video information S162.

The video buffering means 506 stores the video block rate information S203 and the coded video information S162 in the video buffer. At this time, since the coded video time information S202 included in the video block rate information S203 will be used later for synchronization, it is stored as synchronous interval time information S109. The video-audio synchronization means 110 receives the synchronous interval time information S109 possessed by the video buffering means 506, and outputs this value as audio time information S114 to the coded audio read-out means 113. Likewise, the video/audio synchronization means 110 outputs video the time information S116 based on the synchronous interval time information S109 to the coded video read-out means 115. In this case, both the audio time information S114 and the video time information S116 show "0.1 sec".

Receiving the audio time information S114 shown "0.1 sec", the coded audio read-out means 113 knows that 19.2 Kbit of coded audio information equivalent to 0.1 sec should be read out, and compares this value with the coded audio buffer quantity S105 possessed by the audio buffering means 104. Since the coded audio buffer quantity S105 is 9.6 Kbit, that is, less than the quantity of information to be read out, the coded audio read-out means 113 does not read the coded audio information.

On the other hand, receiving the video time information S116 showing "0.1 sec", the coded video read-out means 115 knows that coded video information equivalent to 0.1 sec should be read out, and refers to the video block rate information S203 stored by the video buffering means 506. Then, the coded view read-out means 115 knows that the quantity of coded video information stored in the video buffer in the video buffering means 506 is equivalent to 0.1 sec and its value is 150 Kbit, and reads out 150 Kbit of coded video information S163. Further, the read-out means 115 deletes the coded video information S162 corresponding to the read-out information and the video block rate information S203, from the video buffer in the video buffering means 506.

The coded video read-out means 115 outputs the read-out coded video information S163 to the video/audio synchronization means 110, and the video/audio synchronization means 110 stores the coded video information S163 in the internal buffer 111.

Here, video coding is executed. The video coding means 107 encodes the pro-video information S161 and outputs coded video information S162. It is assumed that 0.2 sec has elapsed and 200 Kbit of coded video information is output. On the basis of the result of the coding process, the video coding means 107 generates video block rate information S203 which comprises a coded video quantity showing the size of coded video information, and coded video time information showing a reproduction time when the coded video information is reproduced. The video block rate information S203 is output from the video coding means 107, together with the coded video information S162. The video buffering means 506 stores the video block rate information S203 and the coded video information S162 in the video buffer. Coded video time information S202 included in this video block rate information S203 is also stored as synchronous interval time information S109. Here, it is assumed that audio coding is not carried out due to execution of another program and the pro-audio information S151 is continuously output for four seconds. When audio coding is executed, the audio coding means 103 encodes the pro-audio information S151 by a quantity equivalent to four seconds to generate 768 Kbit of coded audio information S152, and outputs this to the audio buffering means 104. The audio buffering means 104 stores the coded audio information S152 in the audio buffer, and updates the coded audio buffer quantity S105 to 777.6 Kbit.

Since the coded audio read-out means 113 has received the audio time information S114 showing "0.1 sec", 19.2 Kbit of coded audio information, that is equivalent to 0.1 sec, should be read out. When referring to the coded audio buffer quantity S105 stored by the audio buffering means 104, it is 777.6 Kbit as described above and exceeds the quantity of information to be read out. So, the coded audio read-out means 113 reads out 19.2 Kbit of coded audio information S153, and deletes the coded audio information S152 corresponding to the read-out information from the audio buffer in the audio buffering means 104. In response to the deletion of information from the audio buffer, the audio buffering means 104 updates the coded audio buffer quantity S105 to 758.4 Kbit and retains this quantity.

The coded audio read-out means 113 outputs the read-out coded audio information S153 to the video/audio synchronization means 110. The video/audio synchronization means 110 stores the coded audio information S153 in the internal buffer 111. At this time, the video/audio synchronization means 110 generates video/audio coded and multiplexed information S170 by placing the coded audio information S153 by the side of the coded video information which has previously been input. The video/audio coded and multiplexed information S170 is input to the file management means 112.

The coded audio buffer quantity S105 is 758.4 Kbit, and this value exceeds the above-mentioned prescribed value, 576 Kbit. The audio interruption prevention means 503 obtains the output T1 from the coded audio storage time output means 501 and the output T2 from the coded video storage time output means 502. The output T1 from the coded audio storage time output means 501 is 3.95 sec which is obtained by dividing the coded audio buffer quantity S105 by the fixed bit rate 192 Kbps. On the other hand, the output T2 from the coded video storage time output means 502 is 0.2 sec according to the coded video time information S202 included in the video block rate information S203. So, the audio interruption prevention means 503 obtains 3.75 sec as T3 (=T1−T2). Then, the audio interruption prevention means 503 outputs a dummy video inserted period S504 whose value is T3 (3.75 sec) to the dummy video insertion means 505 and to the video buffering means 506.

Receiving the dummy video inserted period S504, the dummy video insertion means 505 generates dummy video information having a reproduction time equivalent to the dummy video inserted period S504 and being a code showing "identical to the previous (the last) static image", and outputs this to the video buffering means 506. Further, the dummy video insertion means 505 generates video block rate information including coded video time information having the same value as the dummy video inserted period S504, and outputs this to the video buffering means 506 together with the dummy video information. In the video buffering means 506, the dummy video information and the corresponding video block rate information are stored in the video buffer.

Since the synchronous interval time information S109 obtained by the video/audio synchronization means 110 is based on the coded video time information showing "0.2 sec", the video/audio synchronization means 110 outputs audio time information S114 showing "0.2 sec" and video time information S116 showing "0.2 sec" to the coded audio read-out means 113 and the coded video read-out means 115, respectively. The coded audio read-out means 113 and the coded video read-out means 115 read out coded audio information S153 equivalent to 0.2 sec and coded video information S163 equivalent to 0.2 sec, respectively, and output them to the video/audio synchronization means 110. In the video/audio synchronization means 110, video/audio coded and multiplexed information S170 is generated. Further, deletion of information in the audio buffer and the video buffer and updation of the coded audio buffer quantity S105 are executed.

The synchronization interval time information S109 obtained next by the video/audio synchronization means 110 is based on the coded video time information according to the dummy video information. Therefore, the synchronous interval time information S109 showing "3.75 sec" corresponding to the dummy video information is obtained. The video/audio synchronization means 110 outputs audio time information S114 showing "3.75 sec" and video time information S116 showing "3.75 sec" to the coded audio read-out means 113 and the coded video read-out means 115, respectively. The coded audio read-out means 113 reads out coded audio information S153 equivalent to 3.75 sec according to the time information S114, and outputs it to the video/audio synchronization means 110. On the other hand, the coded video read-out means 115 reads out coded audio information S153 equivalent to 3.75 sec, i.e., the dummy video information stored, and outputs it to the video/audio synchronization means 110. In the video/audio synchronization means 110, video/audio coded and multiplexed information S170 is generated.

When the dummy video inserted period S504 is input to the Video buffering means 506, the video buffering means 506 abandons the coded video information S162 output from the video coding means 107, by a quantity equivalent to the dummy video inserted period S504, without storing it in the video buffer.

As described above, the video/audio coding and multiplexing apparatus according to the third embodiment of the invention includes, in addition to the structure according to the first embodiment, the coded audio storage time output means 501 for outputting a reproduction time of pro-audio information corresponding to all the coded audio information stored in the audio buffer; the coded video storage time output means 502 for outputting a reproduction time of pro-video information corresponding to all the coded video information stored in the video buffer; the audio interruption prevention means 503 for providing a dummy video inserting time and controlling processing of coded video information; and the dummy video insertion means 505 for generating dummy video information. When the dummy video inserted period is input to the video buffering means 506, the video buffering means 506 abandons the coded video information by a quantity equivalent to the dummy video inserted period. Therefore, when there is a possibility of coded audio information's overflowing the audio buffer in the audio buffering means 104 due to excessive storage, dummy video information is input to the video buffering means 506 so as to make the reproduction time of the coded video information equal to that of the coded audio information stored in the audio buffer, i.e., to make the quantity of the video information stored in the video buffer equal to the quantity of the audio information stored in the audio buffer with respect to the reproduction time, and then the video/audio synchronization means 110 reads the coded video and audio information. Therefore, although the image is stopped while reproducing the dummy video information, it is possible to prevent the coded audio information from overflowing the audio buffer, which overflow disables video/audio synchronization.

Furthermore, in the construction for avoiding the overflow according to this third embodiment, although there is a possibility of video or audio interruption, satisfactory video/image synchronization is secured regardless of the buffer size. More specifically, even when the buffer size is relatively small, video/audio coded and multiplexed information in which video information and audio information are synchronized with each other is obtained. This results is a reduction in required memory capacity. In addition, when the present invention is applied to a system that attaches importance to interactivity, such as visual telephone or television conference, since the buffer size is small, a delay in coding can be reduced, resulting in smooth communication.

Although in this third embodiment a code showing "identical to previous (the last) static image" is used as dummy video information, dummy video information is not restricted thereto, and other codes may be used. For example, it is possible to display a message that warns the user that audio interruption might occur due to increased system load, by reproducing dummy video information.

Further, in this third embodiment, after outputting the dummy video information, the video buffering means 506 abandons the coded video information by a quantity equivalent to the input dummy video inserted period S504, without storing it in the video buffer. However, other structures may be employed. For example, the video coding means 107 may receive the dummy video inserted period S504 and abandon the pro-video information by a quantity equivalent to the dummy video inserted period S504, without coding it. In this structure, the coded video information is not output for a period corresponding to the dummy video inserted period. In this case, the load is reduced by interrupting the coding process, and the computer resource for the interrupted process can be used for another processing.

Furthermore, in this third embodiment, overflow of coded audio information from the audio buffer is avoided because, generally, audio interruption has a greater influence on reproduction than video interruption. However, it is possible to construct the apparatus so that overflow of coded video information from the video buffer is avoided. In this case, when there is a possibility of coded video information's overflowing the video buffer, the video buffering means 506 outputs dummy video information equivalent to the reproduction time toward the audio buffering means 104. The dummy audio information may be a code showing "no voice" or a message warning the user that video interruption might occur. Furthermore, it is possible to construct the apparatus to avoid both the video overflow and the audio overflow.

Furthermore, the third embodiment is directed to avoiding overflow of coded audio information from the audio buffer in the apparatus according to the first embodiment in which video/audio coded and multiplexed information is generated using video block rate information. However, this third embodiment may be applied to the apparatus according to the second embodiment in which coded video unit time quantity information is used for generating video/audio coded and multiplexed information. It is also possible to avoid the video overflow, and both of the video overflow and the audio overflow, in the apparatus according to the second embodiment.

Moreover, although in this third embodiment the coded audio information is output at a fixed bit rate, it is possible to construct the apparatus so that the coded audio information is output at a variable bit rate, by using audio block rate information or coded audio unit time information.

Embodiment 4

In a video/audio coding and multiplexing apparatus according to a fourth embodiment of the invention, overflow of information from a buffer is avoided and synchronization in video/audio multiplexing is realized by insertion of dummy information, in an inter-frame coding process.

Figure 9:
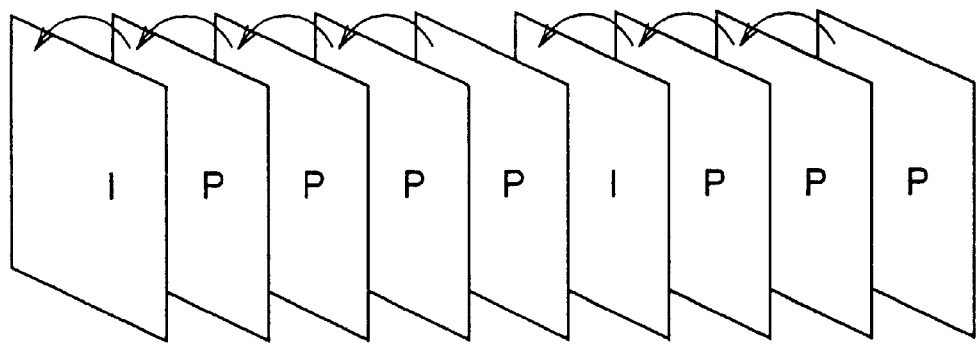
FIG. 9 is a diagram for explaining the reference relation in predictive coding.
Figure 10:
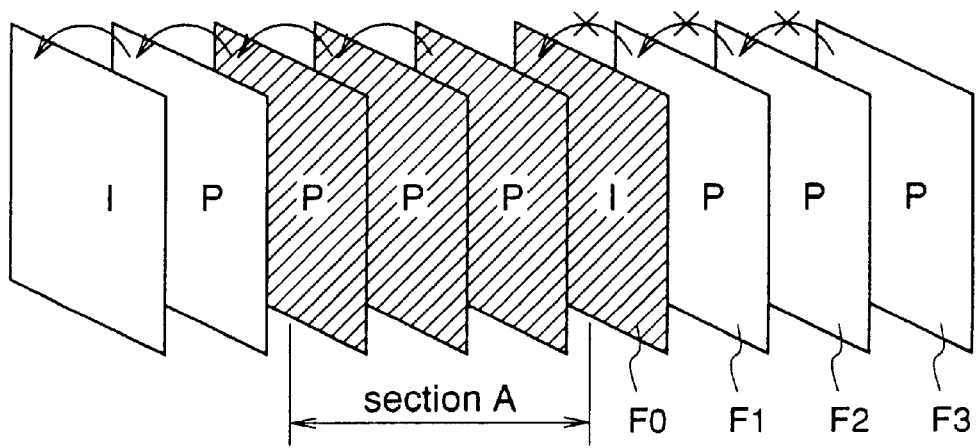
FIG. 10 is a diagram for explaining problems in executing predictive coding in the third embodiment.

FIGS. 9 and 10 are diagrams for explaining problems caused by insertion of dummy video information in an inter-frame coding process. Generally, coded video information is information coded in a compressive coding process standardized by MPEG (Motion Picture Expert Group) or the like, and the video/audio coding and multiplexing apparatuses according to the first to third embodiments can provide coded and multiplexed information fitted to the standard.

When an image is a target of compressive coding, digitized image, i.e., pro-video information being video data comprising a sequence of static images (frame images) is subjected to compressive coding. There are two kinds of compressive coding methods: "intra-frame coding" in which a static image corresponding to one frame is compressed, excluding redundancy, on the basis of the spatial correlation (intra-frame correlation), and "inter-frame coding" in which static images in temporally adjacent (continuous) frames are compressed, excluding redundancy, on the basis of the temporal correlation (inter-frame correlation).

Although the image coding apparatus according to the prior art basically performs the intra-frame coding, when it performs the inter-frame coding also, highly compressed coded data can be obtained. In order to perform the inter-frame coding, a prediction image is generated by decoding (inverse coding) or motion estimation and compensation, and a difference between the prediction image and a target image to be coded is obtained. So, these processes will increase the processing burden of the apparatus. There are three ways to generate a prediction image for the inter-frame coding: "forward prediction" on the basis of previously processed data, "backward prediction" on the basis of data to be processed next, and "bidirectional prediction" performing both the forward prediction and the backward prediction. In FIGS. 9 and 10, the intra-frame coding is shown by "I", the forward predictive coding is shown by "P", and the bidirectional predictive coding (including the backward predictive coding) is shown by "B".

FIG. 9 shows a case where the intra-frame coding and the forward predictive coding are combined. In the forward prediction coding, utilizing temporal redundancy of a time-varying image, only a difference from coded information of a previous statis image is used as coded information for a target image being processed. In FIG. 9, "I" is given to a frame image which has been processed by the intra-frame coding. So, this frame image is independently coded video information that can be decoded independently of coded information of other frame images. "P" is given to a frame image which has been processed by the forward predictive coding using an adjacent frame image processed previously. With respect to the frame image with "P", according to the reference relation shown by arrows, only a difference from coded information of an adjacent frame image processed previously is coded, so that the coded information of the previous frame image is needed when the frame image with "P" is decoded. Hereinafter, the frame image with "P" is regarded as difference coded video information.

As shown in FIG. 9, in coded information obtained by the combination of the intra-frame coding and the forward prediction coding, some pieces of independently coded information and plural pieces of difference coded information are arranged.

FIG. 10 is a diagram for explaining problems when insertion of dummy video information according to the third embodiment is applied as it is to the above-mentioned processing. It is assumed that, when the video/audio coding and multiplexing apparatus according to the third embodiment is expected to output coded video information as shown in FIG. 9, there is a possibility of coded audio information's overflowing the audio buffer, and section A shown in FIG. 10 is replaced with dummy images. In this case, since coded information shown by F0 becomes a dummy, coded information shown by F1 has no coded information to refer to for a difference, so that it cannot be decoded. When F1 cannot be decoded, F2, which refers to F1, cannot be decoded and, therefore, F3 cannot be decoded, too. Consequently, when this coded video information is decoded, decoding is stopped at this portion.

Figure 11:
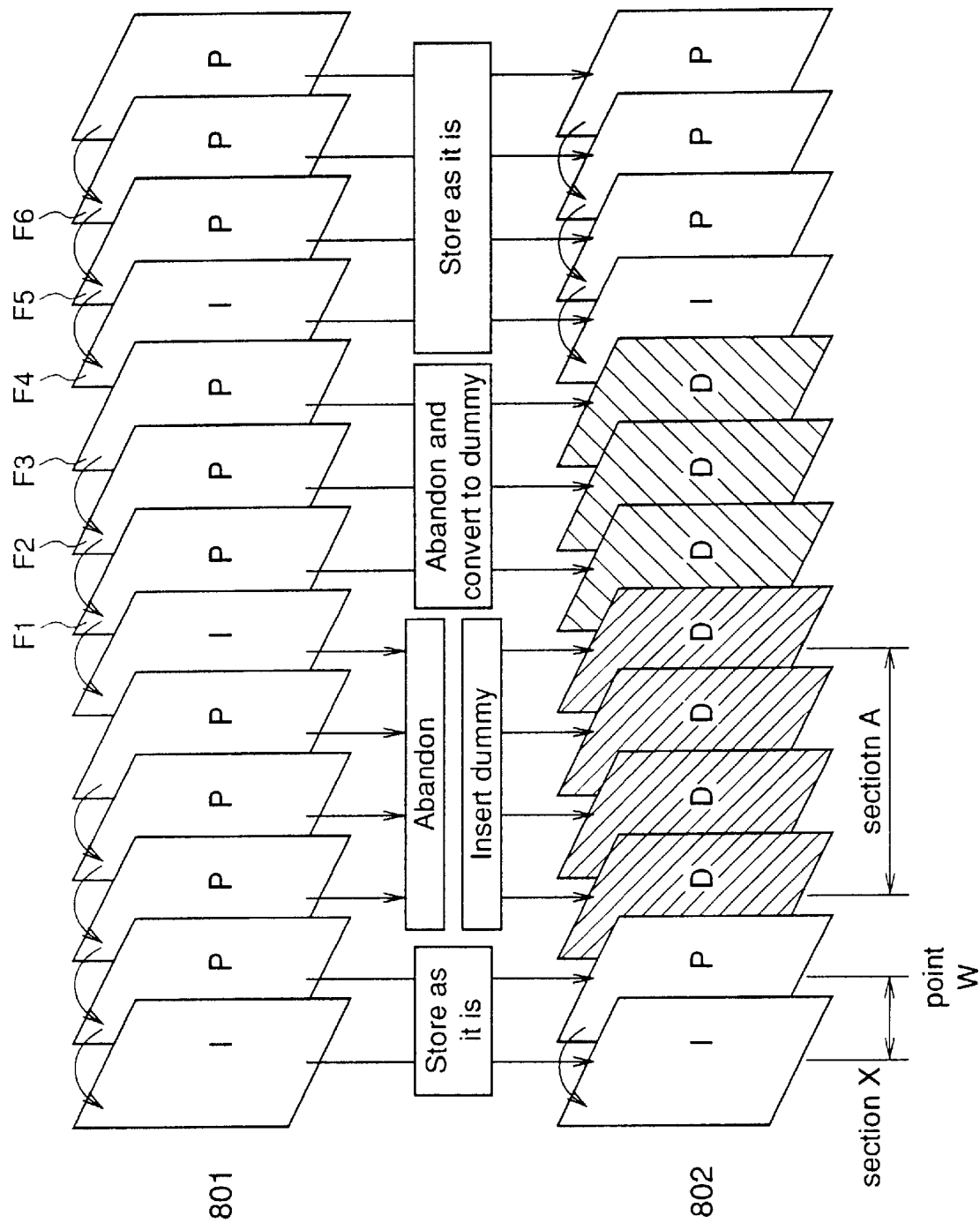
FIG. 11 is a diagram for explaining process steps executed by a video/audio coding and multiplexing apparatus according to a fourth embodiment of the invention.

A video/audio coding and multiplexing apparatus according to this fourth embodiment is directed to solving the above-mentioned problem. The apparatus according to this fourth embodiment is identical in structure to the apparatus according to the third embodiment shown in FIG. 7, but the operation of the video buffering means 506 receiving a dummy video inserted period S504 is different from that described for the third embodiment. FIG. 11 is a diagram for explaining the operation of the video buffering means 506 according to the fourth embodiment.

In FIG. 11, reference numeral 801 shows the structure of coded video information input to the video buffering means 506, and reference numeral 802 shows the structure of coded video information actually stored in the video buffer included in the video buffering means 506. Characters I and P have the same meanings as described with respect to FIGS. 9 and 10. Character D denotes coded dummy video information inserted. This dummy video information is a code showing "identical to the previous (the last) static image", and this is independently coded information which can be decoded independently.

The operation of the apparatus according to this fourth embodiment in video/audio processing is identical to that already described for the third embodiment except the operation of the video buffering means 506 receiving a dummy video inserted period S504. So, only the operation of the video buffering means 506 will be described hereinafter.

With reference to FIG. 11, until the processing reaches a point W, coded video information corresponding to section X has been input, and the input coded video information is stored in the video buffer by the video buffering means 506. As in the third embodiment coded video information corresponding to section A and included in the coded video information 801 is abandoned by the video buffering means 506, without being stored in the video buffer.

After the abandonment, in contrast with the third embodiment, the video buffering means 506 executes decision and processing as follows. For coded video information input after the abandonment, it is decided whether this coded video information is difference coded video information (P code) which requires the previous (the last) coded-information when decoded or independently coded video information (I code) which can be decoded independently of other coded-information. When it is a P code, the video buffering means 506 abandons it without storing it in the video buffer, and stores the dummy video information instead. When it is an I code, the video buffering means 506 stores the I code as it is and, thereafter, no such decision is performed.

In FIG. 11, the video buffering means 506 performs the above-mentioned decision to coded video information F1 which is input after section A has been processed. Since the information F1 is a P code, the buffering means 506 abandons it and stores dummy video information (D code) showing "identical to the previous (the last) static image". That is, the P code is converted to the D code. Coded video information F2 and coded video information F3 are processed in the same manner as above, and D codes are stored.

Subsequently, coded video information F4 is input and subjected to the decision. Since F4 is an I code, it is stored. Coded video information F5 and subsequent coded video information are stored as they are without being subjected to the decision.

In the third embodiment of the invention, the video buffering means 506 simply abandons the coded video information S162 in section A corresponding to the dummy video inserted period S504 as shown in FIG. 10, so that the problem occur in the decoding process as described with respect to FIG. 10. In this fourth embodiment, however, the coded video information 802 stored in the video buffer in the video buffering means 506 is used as video/audio coding and multiplexing information and, in the coded video information 802, a P code having no I code to refer to is converted to a D code, thereby to avoid the problem of the third embodiment. That is, in this fourth embodiment, although the image might be stopped for a longer while as compared with the third embodiment, it hasn't become as bad as that decoding is stopped.

As described above, according to the fourth embodiment of the invention, in the same structure as that according to the third embodiment, the video buffering means 506 decides whether the coded video information input after insertion of the dummy video information is independently coded video information or difference coded video information. When it is difference coded video information that requires reference information, the buffering means 506 converts it to dummy video information and stores the dummy information in the video buffer. Therefore, it is possible to avoid reproduction trouble in decoding, with no contradiction in the reference relation of coded video information. Accordingly, the effect of the third embodiment, i.e., to avoid overflow of information from a buffer, can be realized in a wider range of coding process.

Further, in this fourth embodiment, since the reference relation in the coded video information S162 output from the video coding means 107 is checked by the video buffering means 506, the video coding means 107 can continue the ordinary coding operation whether the dummy video information is inserted or not. As described for the third embodiment, the performance of apparatus can be improved by outputting the dummy video inserted period to the video coding means to stop coding. In this case, however, the video coding means must interpret the dummy video inserted period and perform a process corresponding to the dummy video inserted period. In this fourth embodiment, however, it is possible to avoid overflow of information from the buffer, without considering insertion of dummy video information, using the video coding means performing ordinary coding, without adversely affecting the reference relation of coded video information. Even when the video coding means 107 is implemented by software module or hardware available on the market, whose internal operation cannot be altered from the outside, the same effects as mentioned above are obtained.

While in this fourth embodiment difference coded information which cannot be used as a reference is replaced with a dummy code, any other information may be used as long as it is independently coded information that requires no information to refer to. For example, independently coded information having, as a reproduced frame, an image showing that overflow of audio information might occur may be used with the same effects as mentioned above.

Embodiment 5

In a video/audio coding and multiplexing apparatus according to a fifth embodiment of the invention, overflow of information from a buffer is avoided and synchronization in video/audio multiplexing is realized by insertion of dummy information, in an inter-frame coding process.

Figure 12:
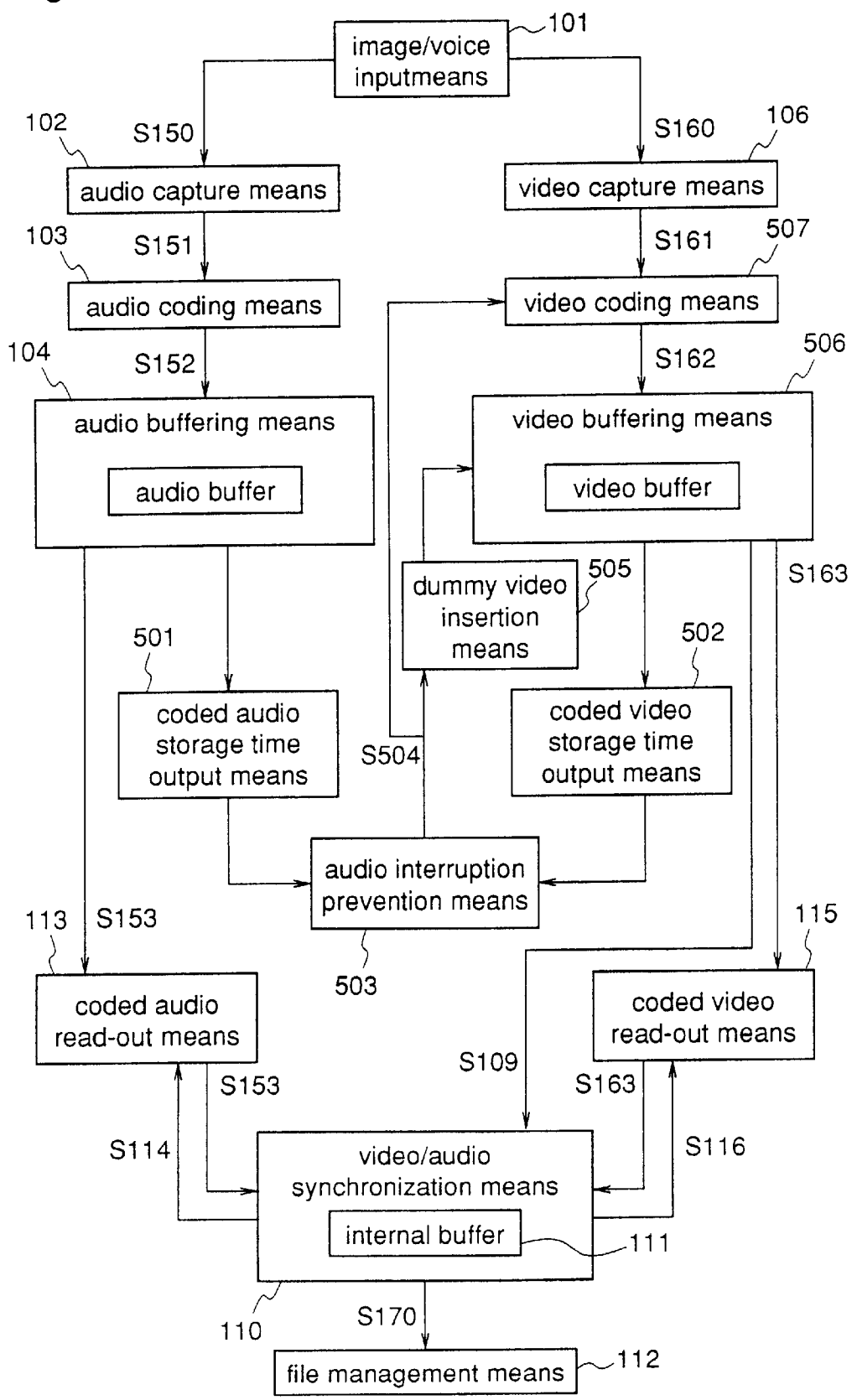
FIG. 12 is a block diagram illustrating a video/audio coding and multiplexing apparatus according to a fifth embodiment of the invention.

FIG. 12 is a block diagram illustrating a video/audio coding and multiplexing apparatus according to the fifth embodiment of the invention. In FIG. 12, an audio interruption prevention means 503 has the same function as that of the third embodiment shown in FIG. 7, but a dummy video inserted period S504 output from the audio interruption prevention means 503 is input to the video coding means 507 in this fifth embodiment whereas it is input to the video buffering means 506 in the third embodiment.

Receiving the dummy video inserted period S504, the video coding means 507 does not execute coding of input pro-video information S161 by a quantity equivalent to the dummy video inserted period S504, but abandons the pro-video information. So, the video coding means 507 does not output coded video information S162 equivalent to the dummy video inserted period S504. Further, the video coding means 507 executes inter-frame coding and forward predictive coding, for each frame of pro-video information, according to an expected coding pattern.

Except the above-mentioned features, the video/audio coding and multiplexing apparatus according to this fifth embodiment is identical to the apparatus according to the third embodiment.

Figure 13:
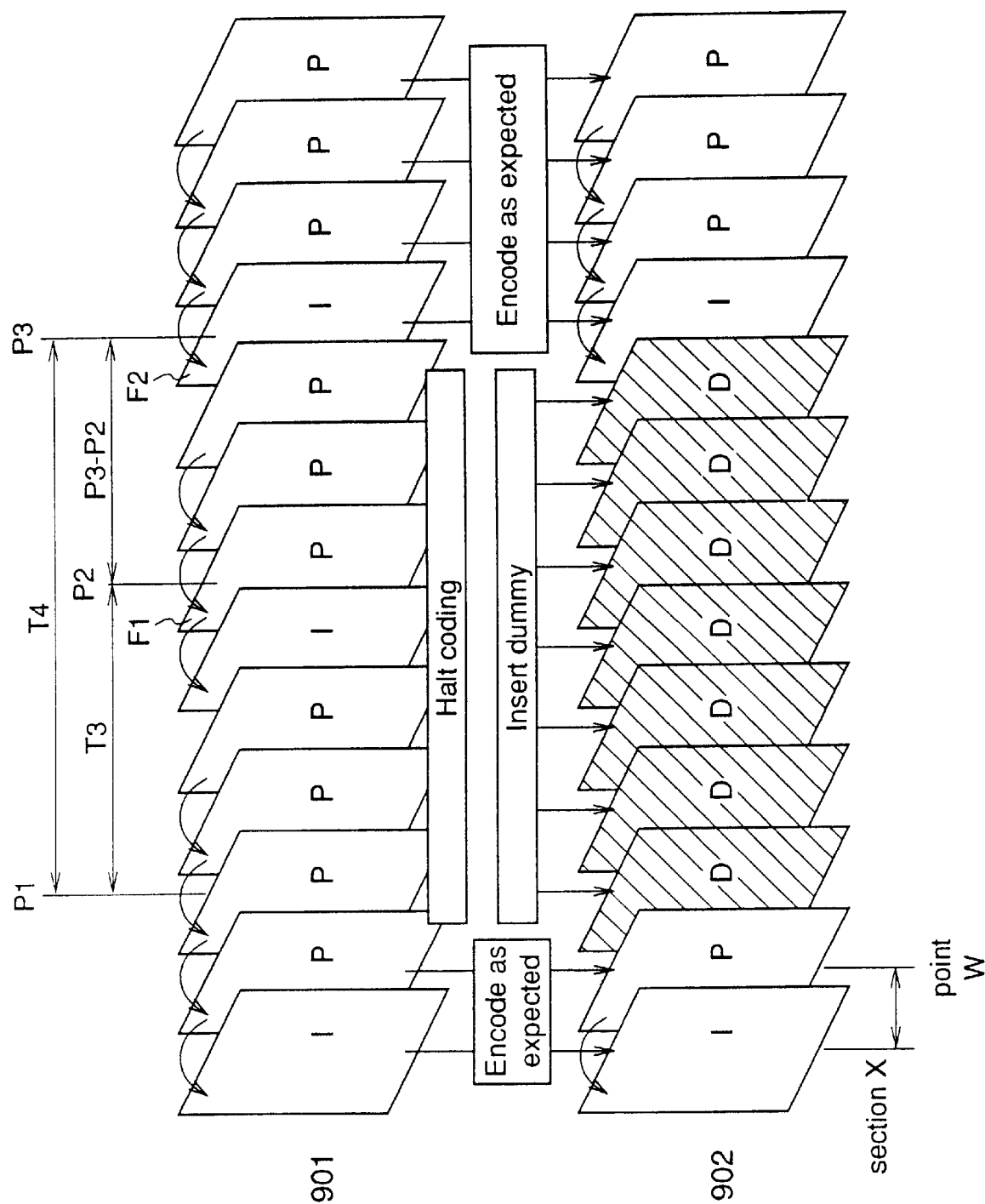
FIG. 13 is a diagram for explaining process steps executed by the apparatus shown in FIG. 12.

FIG. 13 is a diagram for explaining how the audio interruption prevention means 503 and the video coding means 507 operate. In FIG. 13, reference numeral 901 designates a coding pattern in a coding process which has been expected to be executed by the video coding means 507. Reference numeral 902 designates coded video information which has been output from the video coding means 507 to the video buffering means 506 and stored in the video buffer. In the figure, I, P, and D have the same meanings as described for the fourth embodiment.

Hereinafter, the operation of the apparatus according to this fifth embodiment, with respect to the video/audio processing, will be described with reference to FIGS. 12 and 13.

In the ordinary operation, i.e., when there is no possibility of coded audio information's overflowing the audio buffer, the process steps from the image/voice input by the input means (video camera) 101 to the storage of video/audio coded and multiplexed information S107 by the file management means 112 are executed in the same manner as described for the third embodiment. In this case, the video coding means 507 performs coding according to the expected pattern, until the point W shown in FIG. 13.

It is assumed that, at the point W, the quantity of information stored in the audio buffer in the audio buffering means 104 exceeds a prescribed value. Then, the audio interruption prevention means 503 obtains T3, in the same manner as described for the third embodiment. In the third embodiment, this T3 is used as dummy video inserted period S504. In this fifth embodiment, however, not the original dummy inserted period T3, but a dummy video inserted period S504 obtained by the audio interruption prevention means 503 as follows is employed.

Initially, the audio interruption prevention means 503 specifies video information to be reproduced at a point of time after the lapse of the original dummy inserted period T3 from the start of inputting dummy video information, and decides whether the specified video information can be decoded or not. This decision is executed by detecting which will be obtained for the video information by coding, I code or P code, according to the expected coding pattern. When the video information is decodable, the decision process is ended. When it is not decodable, the decision process is repeated for the subsequent video information until the first decodable video information is detected. When it is detected, its reproduction timing is obtained. Thereafter, the audio interpretation prevention means 503 outputs a period from the starting point of inputting dummy video information to a point shown by the reproduction timing, as the dummy video inserted period S504.

To be specific, in FIG. 13, timing P1, which is the reproduction timing of video information at the point W, is obtained first. Then, the original dummy inserted period T3 is added to the timing P1 to obtain timing P2 (corresponding to dummy video inserted period elapsed time), and video information F1 corresponding to the timing P2 is specified, followed by the decision mentioned above. As shown in FIG. 13, for the video information F1, forward prediction coding to obtain a P code is expected and, when F1 is coded as a P code, i.e., difference video information, it requires F0 as a reference for decoding. However, F0 is video information having a reproduction timing between the timing P1 and the timing P2, and coding is not expected for F0. So, the result of decision is that F1 is decodable.

The audio interruption prevention means 503 performs the decision process for the subsequent video information to be coded, specifies F2 as decodable video information, and obtains P3 as a reproduction timing of F2. Then, the audio interpretation prevention means 503 obtains a period P3-P2 by calculation, and adds this period to the period T3, resulting in a period T4. This period T4 is used as a period from the start of inputting dummy video information to a point of time shown by the reproduction timing of the coded video information F2, i.e., as the dummy video inserted period S504.

The audio interruption prevention means 503 outputs the dummy video inserted period S504 to the dummy video insertion means 505 and to the video coding means 507. Receiving the dummy video inserted period S504, the video coding means 507 halts coding of video information by a quantity equivalent to the dummy video inserted period S504. Meanwhile, the dummy video insertion means 505 performs the same operation as described for the third embodiment.

In FIG. 13, video coding is not carried out for the period T4 from the point W, and dummy video information equivalent to this period T4 is stored in the video buffer. Thereafter, the video information F2 and subsequent video information are coded as expected, in the same manner as that for the section X.

As described above, according to the fifth embodiment of the invention, in the same structure as the third embodiment, the audio interruption prevention means 503 obtains a dummy video inserted period S504 corrected by executing a decision whether a failure of reference relation exists or not, and outputs it to the dummy video insertion means 505 and the video coding means 507. The video coding means 507 halts coding of video information by a quantity equivalent to the dummy video inserted period S504. Therefore, it is possible to avoid reproduction trouble in decoding, with no contradiction in the reference relation of coded video information. Accordingly, the effect of the third embodiment, i.e., to avoid overflow of information from a buffer, can be realized in a wider range of coding process.

Furthermore, since the video coding means halts its operation during the dummy video inserted period, the computer resource for the video coding can be used for another process, for example, audio coding, whereby the progress of this process is stimulated.

Also in this fifth embodiment, like the fourth embodiment, the video coding means performs coding without regard to insertion of dummy video information. Hence, the apparatus according to the fifth embodiment can be implemented using a video encoded available on the market, whose internal operation cannot be altered from the outside.

In this fifth embodiment, the video coding means 507 is described as if it halts the operation by itself when receiving the dummy video inserted period S504. However, in fact, a routing for calling a video coding module that performs the coding operation halts the cell during the dummy video insertion period.

Embodiment 6

In a video/audio coding and multiplexing apparatus according to a sixth embodiment of the invention, coded video information and coded audio information are multiplexed in a buffer.

Figure 14:
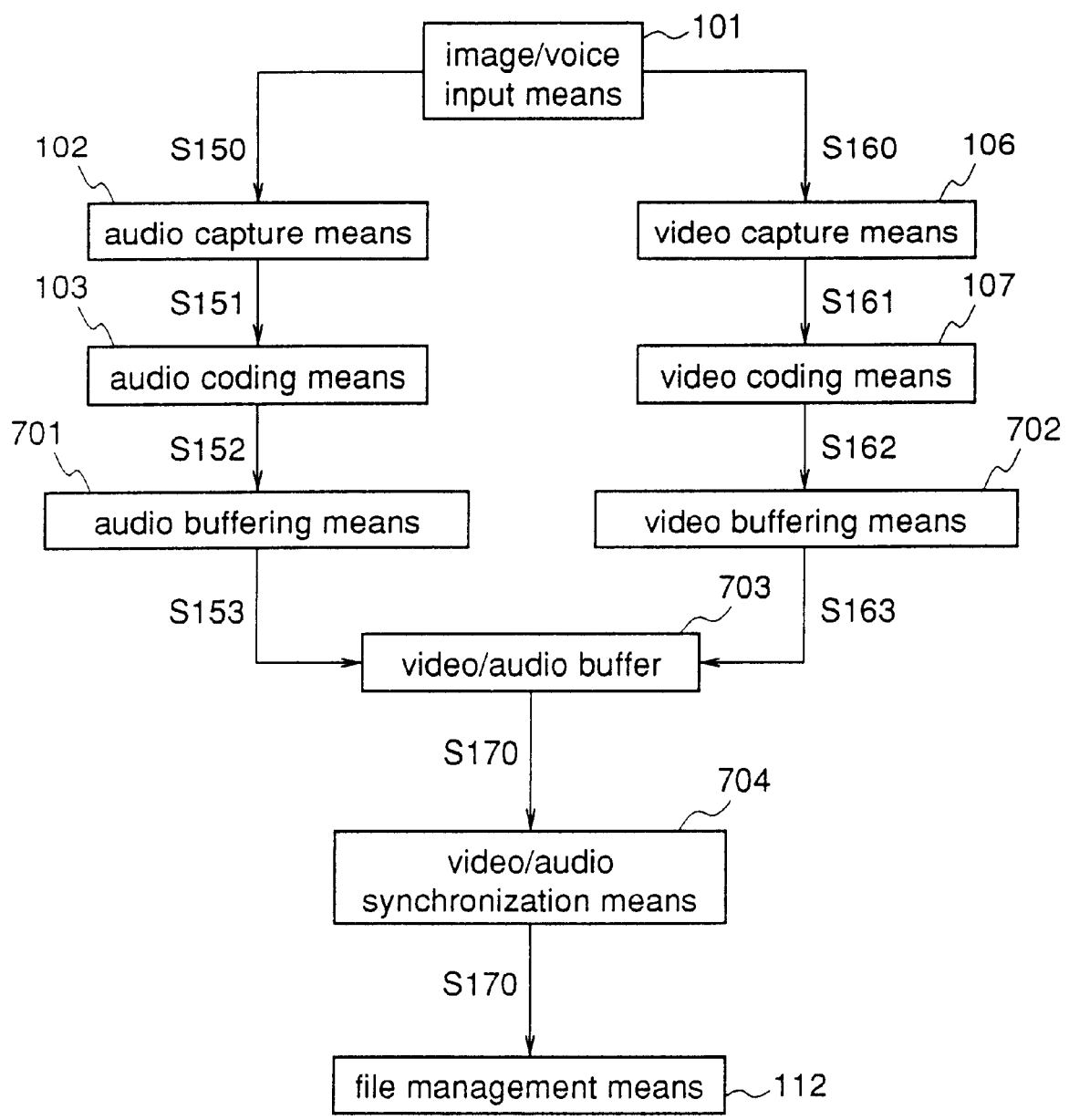
FIG. 14 is a block diagram illustrating a video/audio coding and multiplexing apparatus according to a sixth embodiment of the invention.

FIG. 14 is a block diagram illustrating a video/audio coding and multiplexing apparatus according to this sixth embodiment. This apparatus comprises an image/voice input means 101, and audio capture means 102, an audio coding means 103, a video capture means 106, a video coding means 107, a file management means 112, an audio buffering means 701, a video buffering means 702, a video/audio buffer 703, and a video/audio synchronization means 704.

The audio buffering means 701 temporarily stores coded audio information output from the audio coding means 103. This audio buffering means 701 is different from the audio buffering means 104 according to the first embodiment in that is does not have an internal buffer and stores the coded audio information in the video/audio buffer 703 described later. The video buffering means 702 temporarily stores coded video information output from the video coding means 107. This video buffering means 702 is different from the video buffering means 108 according to the first embodiment in that it does not have an internal buffer and stores the coded video information in the video/audio buffer 703. The video/audio buffer 703 is implemented by a high-speed memory unit such as a semiconductor memory, wherein the coded audio information and the coded video information are stored temporarily. The video/audio synchronization means 704 reads out, from the video/audio buffer 704, a portion where the coded video information and the coded audio information are stored closely, and outputs this portion.

The image/voice input means 101, the audio capture means 102, the audio coding means 103, the video capture means 106, the video coding means 107, and the file management means 112 are identical to those described for the first embodiment and, therefore, do not require repeated description.

Figure 15:
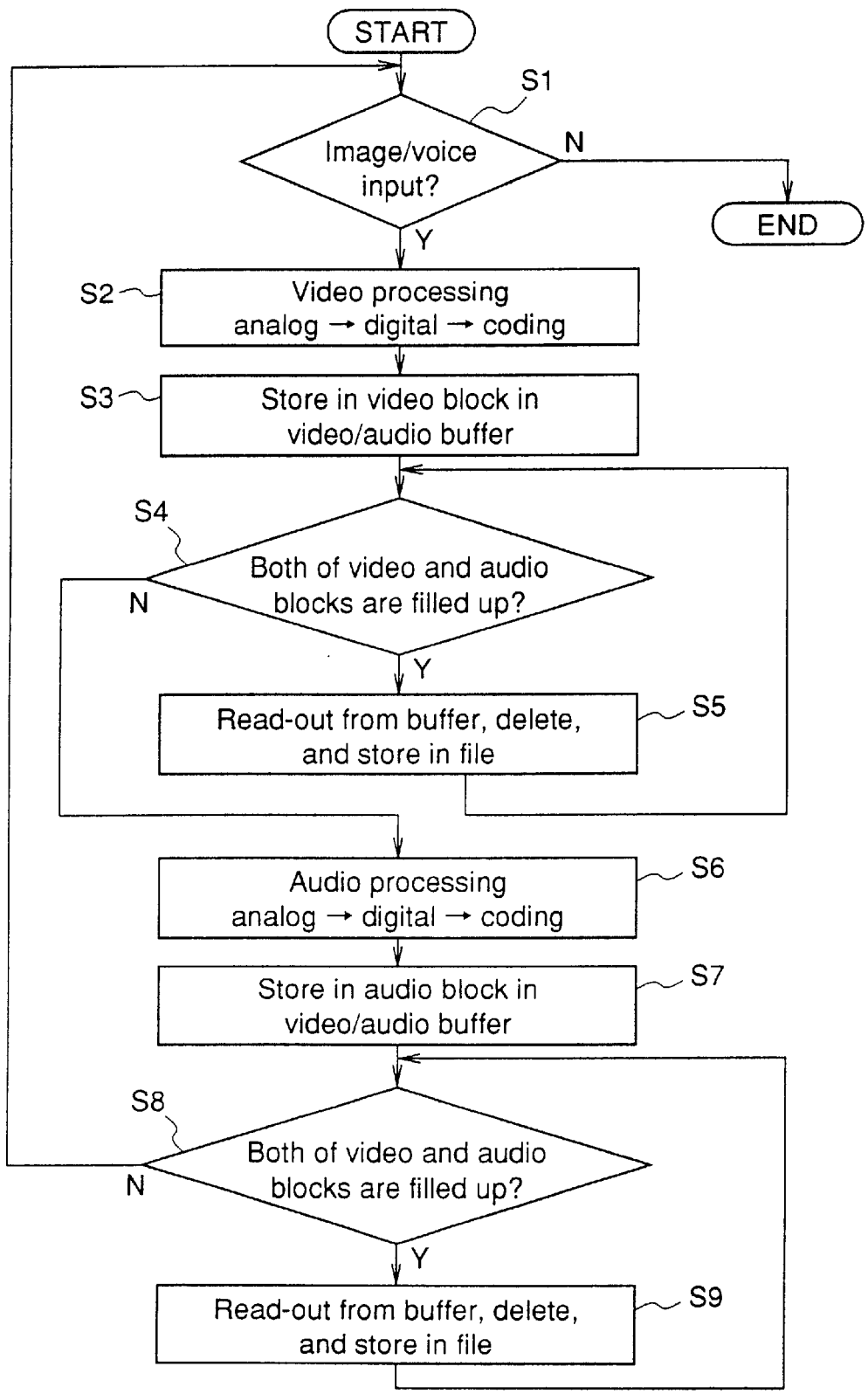
FIG. 15 is a flowchart for explaining process steps executed by the apparatus shown in FIG. 14.
Figure 16:
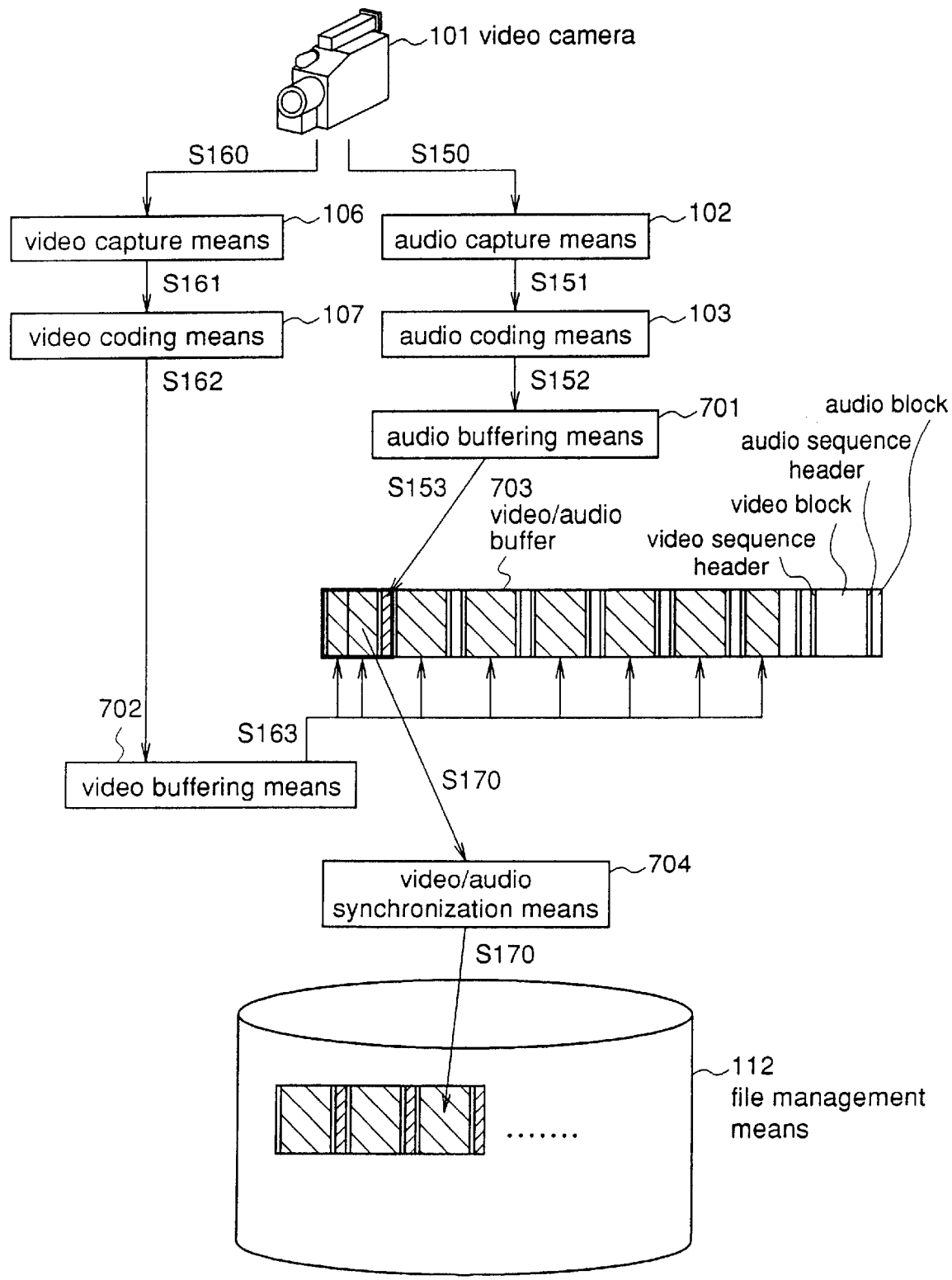
FIG. 16 is a diagram for explaining the operation of the apparatus shown in FIG. 14.

FIG. 15 is a flowchart showing a coding and multiplexing process performed by the apparatus according to this sixth embodiment, and FIG. 16 is a diagram for explaining the flow of information in the apparatus. As shown in FIG. 16, in the video/audio buffer 703, blocks for storing coded audio information (hereinafter referred to as audio memory blocks) and blocks for storing coded video information (hereinafter referred to as video memory blocks) are alternately arranged in advance of units of reproduction time Tm corresponding to the synchronous interval time information according to the first embodiment (i.e., S1 and S2). In this sixth embodiment, the reproduction time Tm is 0.1 sec, the bit rate (quantity per unit time) of coded video information is 1500Kbit/sec, and the bit rate of coded audio information is 192Kbit/sec. Therefore, S1 and S2 are 150Kbit and 19.2Kbit, respectively. Further, a video sequence header and an audio sequence header are previously written in places before the video memory block and the audio memory block, respectively.

When the audio buffering means 701 stores coded audio information in the video/audio buffer 703, if there is an empty audio memory block sandwiched by video memory blocks in which data are stored, the audio buffering means 701 stores data in such an audio memory block form the head of the block. When there is no such an audio memory block, the buffering means 701 stores data in an empty audio memory block from the head of the block. The video buffering means 702 stores data in similar manner.

The video/audio buffer 703 is desired to have an FIFO (First-In First-Out) structure, and this FIFO structure is realized according to the algorithm of ring buffer or the like. More specifically, in the video/audio buffer 703, the coded audio information (the coded video information) is successively stored from the head toward the back end and, simultaneously, from the head block in which the storage has been completed, stored information is successively read out from the head to the back end so that the block from which information has been read out become an empty block. In this way, read-out and write-in are executed. When the storage of information reaches the back end of the buffer 703, it returns to the empty head block from which information has already been read out. However, such a specific method is not always necessary.

Hereinafter, the operation of the video/audio coding and multiplexing apparatus so constructed will be described according to the flowchart of FIG. 15, with reference to FIGS. 14 and 16.

When image and voice are captured by the video camera 101 (see FIG. 16) in step 1, subsequent steps (2~9) are executed. In step 2, the video camera 101 outputs analog audio information S150 and analog video information S160, separately. Receiving the analog video information S160, the video capture means 106 digitizes it and outputs pro-video information S161. The video coding means 107 encodes the pro-video information S161 and outputs coded video information S162. It is assumed that 100Kbit of coded video information equivalent to 0.066 sec and two pieces of static image frames is output.

In step 3, the video buffering means 702 stores the 100Kbit coded video information S162 in the video memory block in the video/audio buffer 703. Since the size of the video memory block is S1, i.e., 150Kbit, this coded video information S162 is stored in a part of the first video memory block.

In step 4, it is decided by the video/audio synchronization means 704 whether or not there is a portion in the video/audio buffer 703 where both the video memory block and the audio memory block are filled up with information. Since there is no block filled with information, the control proceeds to step 6.

In step 6, the audio capture means 102 receives the analog audio information S150 output from the video camera 101, digitizes it, and outputs pro-audio information S151. The audio coding means 103 encodes the pro-audio information S151 and outputs coded audio information S152. Since 0.1 sec has elapsed, 19.2Kbit of coded audio information S152 is output.

Subsequently, in step 7, the audio buffering means 701 stores the 19.2Kbit coded audio information S152 in the audio memory block in the video/audio buffer 703. Since this quantity is equal to S2, i.e., the size of the audio memory block, this information S152 fills up the first audio memory block.

Here, CPU processing time is spared for another process and, thereafter, in step 8, it is decided whether or not there is a portion in the video/audio buffer 703 where both the video memory block and the audio memory block are filled up with information. Since no video memory block is filled up, step 2 is executed. When the control switches to the video coding step 107 in step 2, 1 sec has elapsed from the previous step 3. So, the video coding means 107 outputs 1500Kbit of coded video information S162 equivalent to 1 sec.

In step 3, the video buffering means 702 stores the 1500Kbit coded video information S163 in the video memory block in the video/audio buffer 703. This coded video information S163 fills up the first video memory block and then the residual information is distributed to plural video memory blocks from the second block forward.

In step 4, since both of the first video memory block and the first audio memory block are filled up with information, step 5 is executed. In step 5, the video/audio synchronization means 704 reads out the first video memory block and the first audio memory block with their sequence headers, and outputs video/audio coded and multiplexed information S170 to the file management means 112. In the video/audio buffer 703, the blocks from which information has read out become empty. The file management means 112 additionally stores the video/audio coded and multiplexed information S170 in the file.

In the next step 4, since no audio memory block is filled up, further read-out from the buffer is not executed, i.e., step 5 is not executed, and the control proceeds to step 6.

In step 6, since 1.2 sec has elapsed from the previous step 7, the audio coding means 103 encodes 230.4Kbit of coded audio information S152 equivalent to 1.2 sec. In step 7, the audio buffering means 701 stores the 230.4Kbit coded audio information S152 in the audio memory block in the video/audio buffer 703. This informaiton is distributed to plural audio memory blocks from the second block forward.

In step 8, since second to tenth video memory blocks and second to tenth audio memory blocks are filled up with information, step 9 is executed. In step 9, the video/audio synchronization means 704 reads out the second to tenth video and audio memory blocks together with their sequence headers successively, and outputs video/audio coded and multiplexed information S170. The file management means 112 adds the video/audio coded and multiplexed information S170 in the file.

The above-mentioned process steps are repeated as long as image/voice input is detected in step S1.

As described above, according to the sixth embodiment of the invention, when coded video information and coded audio information are temporarily stored in a buffer by the video buffering means 702 and the audio buffering means 701, respectively, employed is the video/audio buffer 703 in which video memory blocks for video information and audio memory blocks for audio information are alternately arranged in predetermined units. Therefore, when both of the video information and the audio information reach the quantities enough to be output as video/audio coded and multiplexed information S170, video/audio rearrangement has already been completed in the video/audio buffer 703, so that the video/audio synchronization means 704 can read and output the content of the buffer 703 as it is. In this structure, synchronization is completed when coded information is stored in the memory blocks. So, in contrast with the first embodiment, it is not necessary to store and manage block rate information. Further, since a buffer for video/audio rearrangement is dispensed with, the number of memories required is decreased.

In this sixth embodiment, the algorithm adopted for the flowchart shown in FIG. 15 is carried out as follows: video coding→decision of buffer quantity→audio coding→decision of buffer quantity. However, this is merely an example. As an alternative algorithm, it is possible to perform decision of buffer quantity after performing video coding and audio coding in arbitrary order. Alternatively, without fixing such a procedure, the respective process steps, i.e., video coding, audio coding, decision of buffer quantity, read-out and storage, may be carried out in parallel, as individual operations.

Furthermore, although in this sixth embodiment both of video information and audio information are output at fixed bit rates, these information may be output at variable bit rates. In this case, for example, in the video buffering means, the output bit rate of coded audio information when it is temporarily stored is stored. When coded video information is stored in the video/audio buffer, on the basis of the stored bit rate, the size of a region required for the temporary storage of the coded audio information is obtained, and the coded video information is stored leaving a space equivalent to the size of the region.

However, when both of the video information and audio information are output at fixed bit rates, the effect of rapid video/audio synchronization becomes conspicuous by adopting the structure according to this sixth embodiment in which memory blocks having fixed sizes and positions are arranged in advance and coded information is stored in these blocks.

Embodiment 7

In a video/audio coding and multiplexing apparatus according to a seventh embodiment of the invention, the quantities of coded video information and coded audio information temporarily stored in buffers are suppressed, and the coded video/audio information is finally stored in a storage unit.

Figure 17:
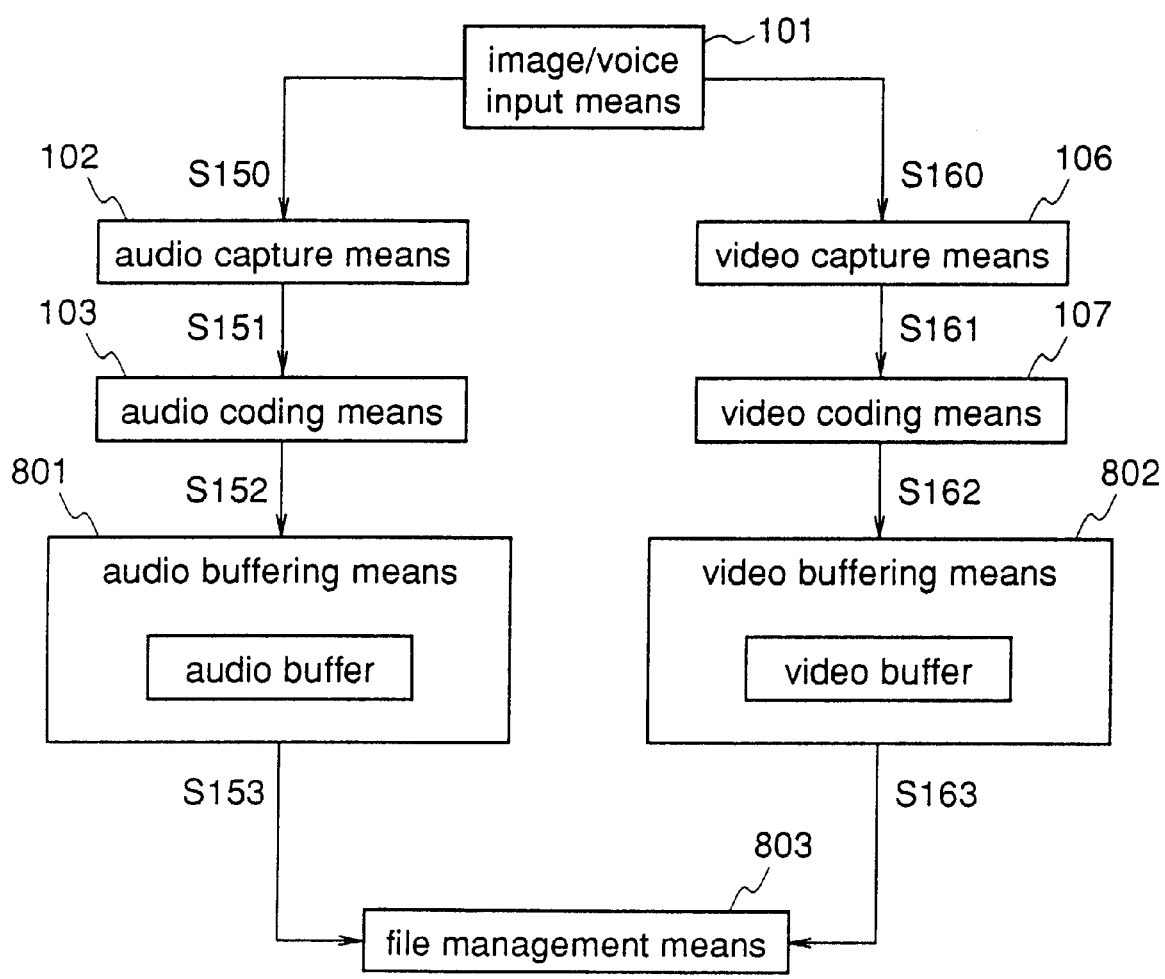
FIG. 17 is a block diagram illustrating a video/audio coding and multiplexing apparatus according to a seventh embodiment of the invention.

FIG. 17 is a block diagram illustrating a video/audio coding and multiplexing apparatus according to the seventh embodiment of the invention. This apparatus comprises and image/voice input means 101, and audio capture means 102, an audio coding means 103, a video capture means 106, a video coding means 107, and audio buffering means 801, a video buffering means 802, and a file management means 803. This apparatus is different from the apparatus according to the sixth embodiment only in that the video/audio buffer 703 and a video/audio synchronization means 704 (refer to FIG. 14) are not included.

The audio buffering means 801 contains an audio buffer. When the audio buffer is filled up, the audio buffering means 801 outputs the content of the buffer to the file management means 803 wherein it is written in a storage unit. Likewise, the video buffering means 802 contains a video buffer. When the video buffer is filled up, the video buffering means 802 outputs the content of the buffer to the file management means 803 wherein it is written in the storage unit. The size of the audio buffer in the audio buffering means 801 and the size of the video buffer in the video buffering means 802 are equivalent to the smallest unit of writing which is specified for the storage unit managed by the file management means 803. The file management means 803 stores the coded information output from the audio buffering means 801 and the video buffering means 802 with designated storage locations, in the storage unit.

The image/voice input means 101, the audio capture means 102, the audio coding means 103, the video capture means 106, and the video coding means 107 are identical to those described for the first embodiment and, therefore, do not require repeated description.

Figure 18:
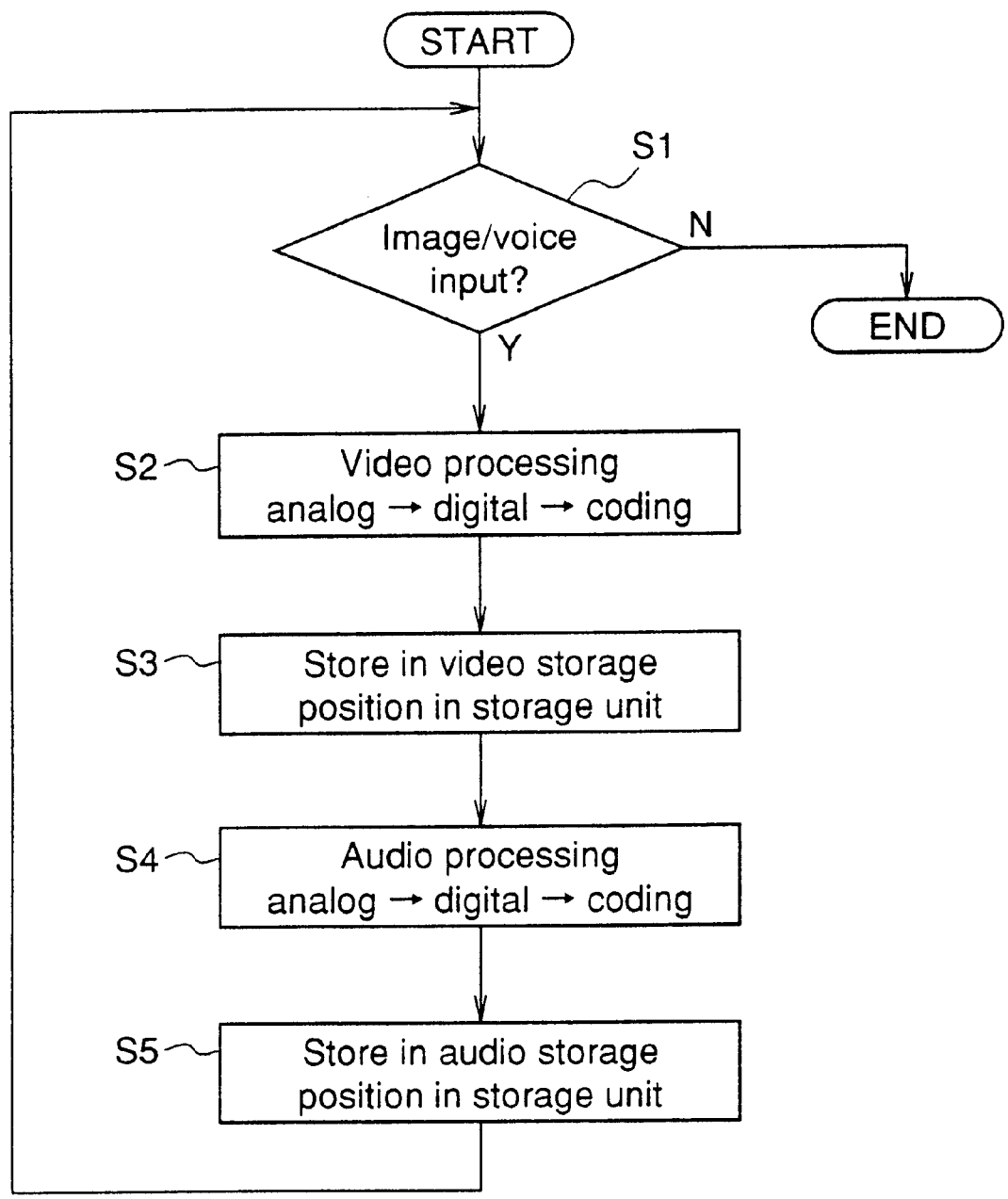
FIG. 18 is a flowchart for explaining process steps executed by the apparatus shown in FIG. 17.
Figure 19:
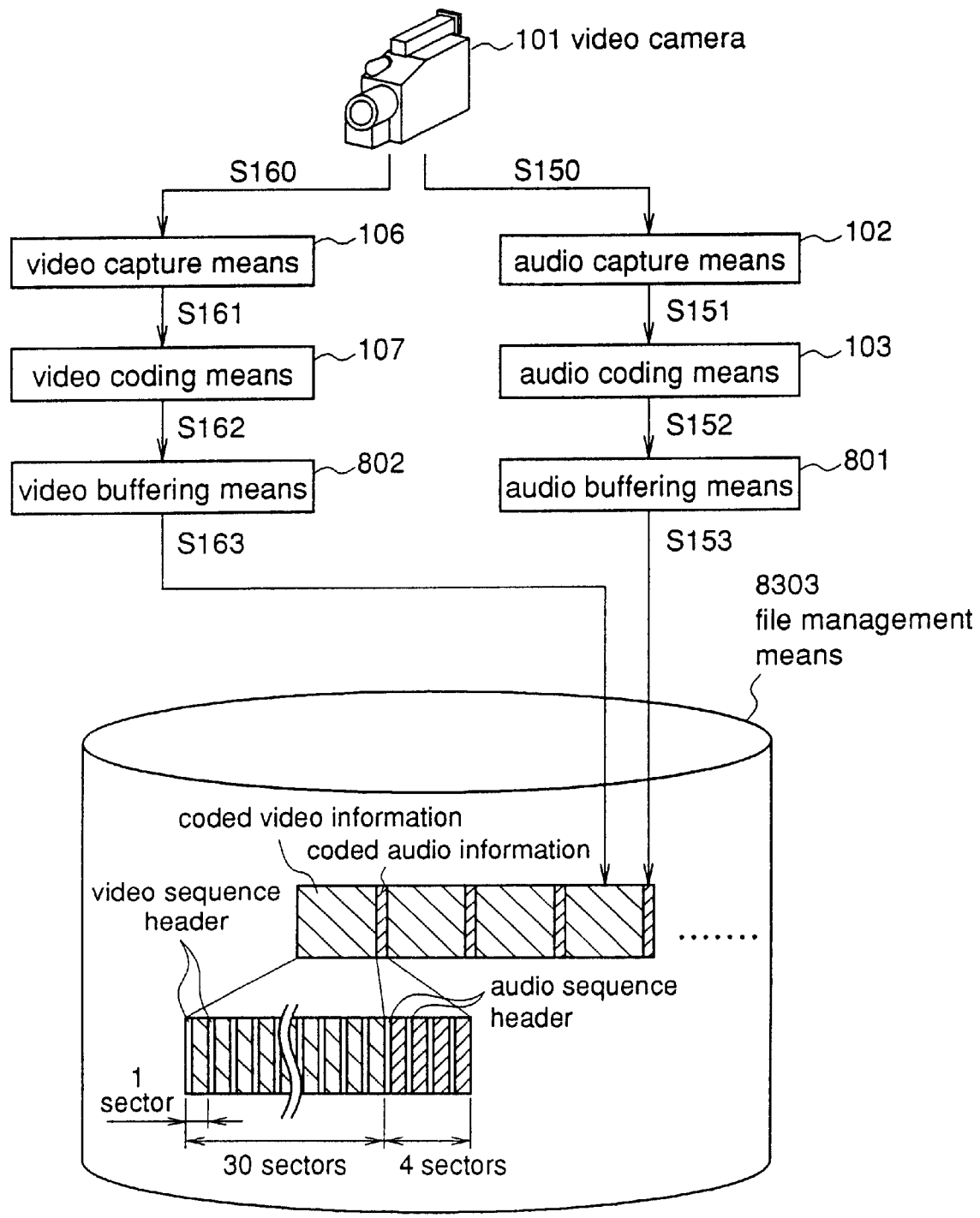
FIG. 19 is a diagram for explaining the operation of the apparatus shown in FIG. 17.

FIG. 18 is a flowchart showing a coding and multiplexing process performed by the apparatus according to this seventh embodiment, and FIG. 19 is a diagram for explaining the flow of information in the apparatus. As shown in FIG. 19,, when the audio buffering means 801 and the video buffering means 802 write information in the storage unit, these means designate storage locations so one of video information and the audio information is stored leaving a space for the other information in units of reproduction time Tm (i.e., S1 and S2 as information quantity), whereby the video information and the audio information are located alternately.

When an ordinary hard disk is used as the storage unit, the smallest unit of writing is the sector size. So, the audio buffering means 801 (the video buffering means 802) has an internal buffer as large as the sector size, and performs write specification in sector units. In this seventh embodiment, the sector size is 5008 bits (626 bytes), the bit rate of coded video information is 1500Kbit/sec, the bit rate of coded audio information is 200Kbit/sec, and the reproduction time Tm is 0.1 sec. In addition, an 8-bit sequence header showing "audio" or "video" is added to the head of each sector. Therefore, the quantity of coded video information corresponding to the reproduction time Tm is 150Kbit, and this is equivalent to thirty sectors. The quantity of coded audio information corresponding to the reproduction time Tm is 20Kbit and this is equivalent to four sectors. The file management means 803 writes information in the storage unit, in sector units, according to the instructions of the audio buffering means 801 and the video buffering means 802.

Hereinafter, the operation of the video/audio coding and multiplexing apparatus so constructed will be described according to the flowchart of FIG. 18, with reference to FIGS. 17 and 19.

When image and voice are captured by the video camera 101 in step 1, subsequent steps (2~9) are executed. In step 2, the video camera 101 outputs analog audio information S150 and analog video information S160, separately. Receiving the analog video information S160, the video capture means 106 digitizes it and outputs pro-video information S161. THe video coding means 107 encodes the pro-video information S161 and outputs coded video information S162. It is assumed that 100Kbit of coded video information equivalent to 0.066 sec and two pieces of static image frames is output.

In step 3, the video buffering means 802 outputs the 100Kbit coded video information S163 to the file management means 803, together with an instruction to write the information S163 with a sequence header in the storage unit. In the file management means 803, the coded video information S163 is stored over twenty sectors from a position in the storage unit.

In step 4, the audio capture means 102 receives the analog audio information S150 output from the video camera 101, digitizes it, and outputs pro-audio information S151. The audio coding means 103 encodes the pro-audio information S151 and outputs coded audio information S152. Since 0.1 sec has elapsed, 20Kbit of coded audio information S152 is output.

In step 5, the audio buffering means 801 outputs the 20Kbit coded audio information S153 to the file management means 803, together with an instruction to write the information S153 with a sequence header in the storage unit. In the file management means 803, the coded audio information S153 is stored over four sectors from a sector which is 30 sectors apart from the head of information written in step 3.

Here, CPU processing time is spared for another process and, thereafter, in step 1, it is decided that the processing is not ended, followed by step 2. In step 2, when the control switches to the video coding means 107, 1 sec has elapsed from the previous step 3. So, the video coding means 107 outputs 1500Kbit of coded video information equivalent to 1 sec.

In step 3, the video buffering means 802 outputs the 1500Kbit coded video information S163 to the file management means 803 so that the information is stored in the storage unit. The coded video information S163 is stored over 300 sectors subsequent to the sectors in which coded video information has been written in the previous step 3. At this time, the video buffering means 802 instructs the file management means 803 to store the coded video information S163 in every 30 sectors, leaving 4 sectors for audio information.

When the control proceeds to step 4, i.e., the audio coding means 103, 1.2 sec has elapsed from the previous step 5, so that the audio coding means 103 outputs 240 Kbit of coded audio information S152 equivalent to 1.2 sec. In step 5, the audio buffering means 801 outputs the 240Kbit coded audio information S153 to the file management means 803 so that it is stored in the storage unit. The coded audio information S153 is stored over 48 sectors from a sector which is 30 sectors apart from the last sector in which audio information has been written in the previous step 5. At this time, the audio buffering means 801 instructs the file management means 803 to store the coded audio information S153 in every four sectors, leaving 30 sectors for video information. The above-mentioned process steps are repeated until it is decided in step 1 that there is no image/video input, i.e., the processing is ended.

As described above, the video/audio coding and multiplexing apparatus according to this seventh embodiment is provided with the audio buffering means 801 and the video buffering means 802, each having an internal buffer of small capacity, so that the quantities of coded audio information and coded video information temporarily stored in these buffers are reduced. The coded audio information and video information restored in a storage unit managed by the file management means 112. When the video buffering means 802 (audio buffering means 801) outputs the coded video (audio) information to the file management means 803, it instructs the management means to store the video (audio) information leaving spaces for the audio (video) information, and the file management means 803 stores the information in the storage unit according to the instruction. Therefore, in addition to the effects of thefirst and second embodiments, the size of a buffer that temporarily stores information is reduced, and copying of coded information is executed only a single time, resulting in rapid processing.

This seventh embodiment is described on the assumption that the storage unit in which the video/audio information is finally stored is an ordinary hard disk. However, when a demountable memory card or the like is used as the storage unit, the size of the buffer can be further reduced because it is not necessary to consider the sector size.

Furthermore, like the sixth embodiment, the procedure of the video/audio processing according to this seventh embodiment is not restricted to that of the flowchart shown in FIG. 18.

Embodiment 8

A video/audio coding and multiplexing apparatus according to an eighth embodiment of the invention is directed to solving problems which might occur when the apparatus according to the sixth embodiment is implemented using a ring buffer.

Figure 20:
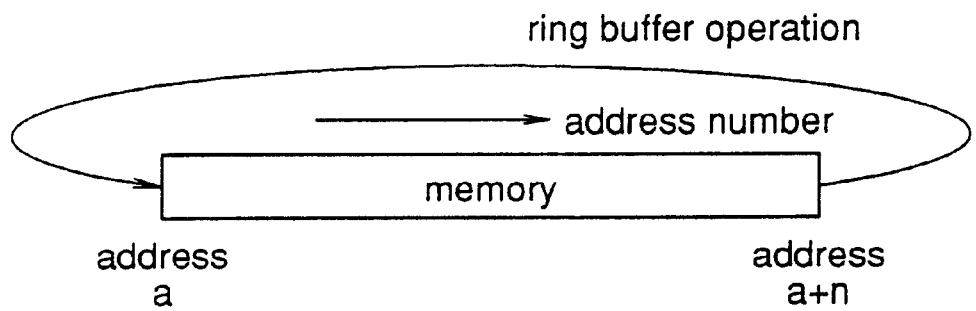
FIGS. 20(a) and 20(b) are diagrams for explaining a ring buffer method.
Figure 20:
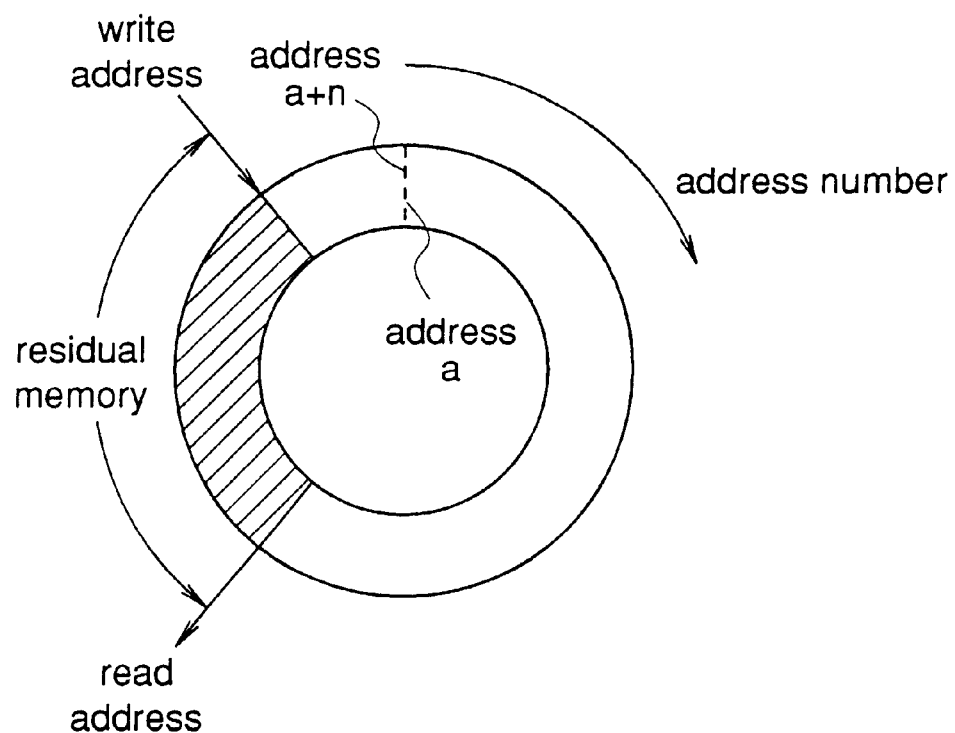

As described for the sixth embodiment, for the temporary storage in the video/audio coding and multiplexing apparatus, a high-speed memory unit, such as a semiconductor memory, is employed, and it is desired to realize and FIFO structure sufficiently in a limited capacity, so that the memory is used according to a method of ring buffer. FIGS. 20(a) and 20(b) are diagrams for explaining the ring buffer method. As described above, a memory of limited capacity is used as a buffer for the temporary storage, and the memory is managed by addresses showing the memory areas. As shown in the figures, a memory having addresses from "a" to "a+n" is used as a buffer. For the memory areas in the memory, write-in and read-out are carried out in the direction of increasing the address number. In addition, by considering that an address next to the address "a+n" is the address "a", the memory can be used endlessly. In this way, an FIFO structure is realized by using the limited capacity efficiently.

Figure 21:
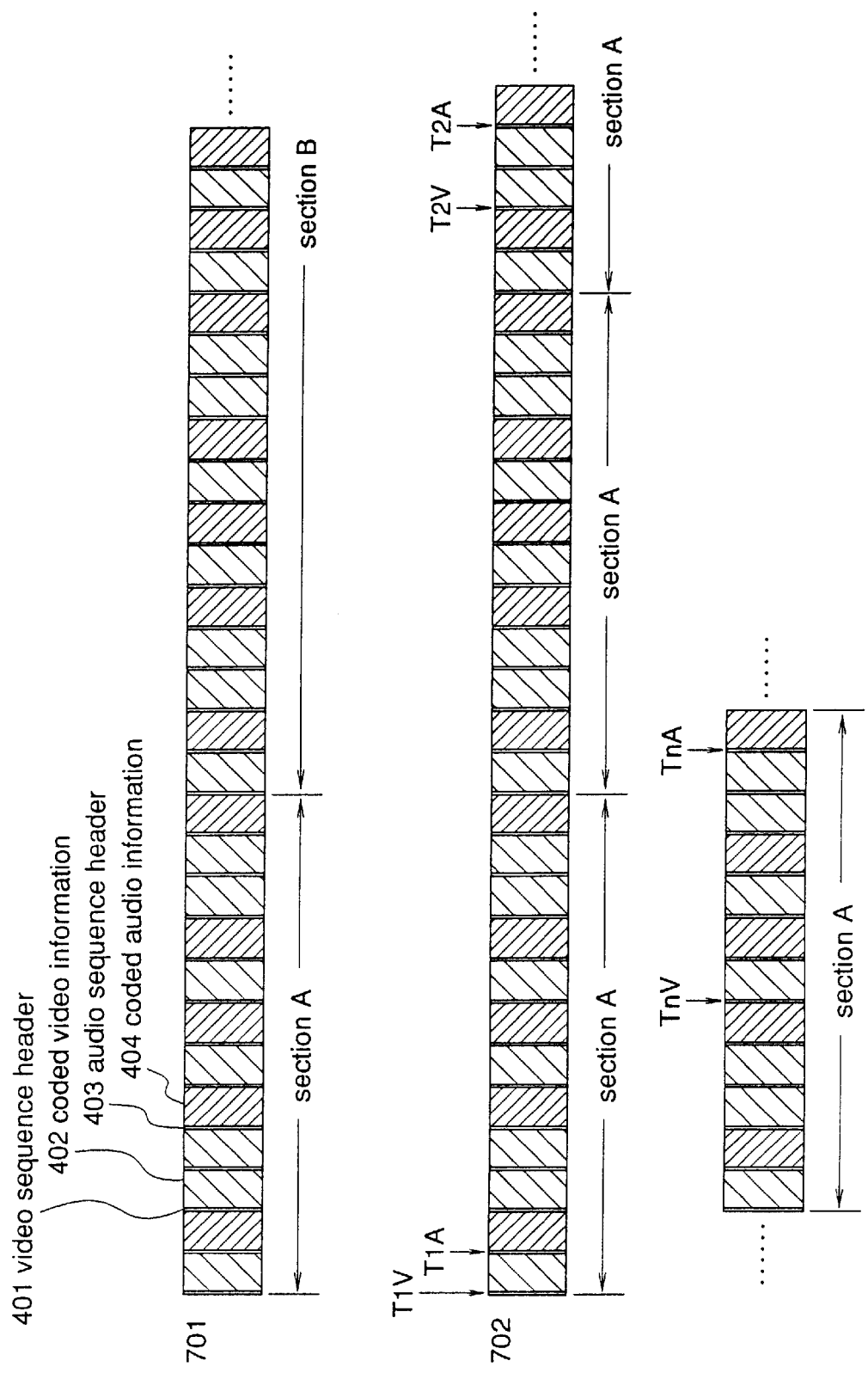
FIG. 21 is a diagram for explaining problems when the ring buffer method is employed for the sixth embodiment of the invention.

FIG. 21 is a diagram for explaining problems which might occur when the video/audio buffer 703 of the video/audio coding and multiplexing apparatus according to the sixth embodiment is implemented by a memory managed by the ring buffer method.

In FIG. 21, reference numeral 701 shows the arrangement of audio memory blocks and video memory blocks in the video/audio buffer. To facilitate the description, the following assumptions are given. The bit rate of coded audio information is 384Kbps, and the bit rate of coded video information is 524Kbps. Restricted by the system executing reproduction of coded and multiplexed information, the audio memory blocks and the video memory blocks are crested in the same size, and a difference between the audio bit rate and the video bit rate is absorbed by the number of the video and audio memory blocks. That is, since the ratio of the video bit rate and the audio bit rate is 524:384 (≈1.36:1), video/audio multiplexed information in which one audio memory block is provided for one or two video memory block(s) is generated.

The structure of this multiplexed video/audio information is shown by 701 in FIG. 21. Although the video/audio buffer is shown as if it has a limitless size, the available memory is limited actually. So, as shown by 702 in FIG. 21, a portion of the structure 701 (section A) is taken out, and this is repeatedly used as a ring buffer. Since the section A is taken out and repeatedly used as a ring buffer though the arrangement of audio memory blocks and video memory blocks in a section B in the structure 701 must be realized in fact, there is a possibility that disarrangement might occur in the block structure, i.e., positional error in video and audio memory blocks might occur. More specifically, in the structure 702, since the ratio of the video bit rate and the audio bit rate in the memory used as a ring buffer is 1.4:1 while it is 1.36:1 in the original structure 701, the number of video memory blocks in the structure 702 is a little larger than that in the original structure 701, resulting in the positional error. This positional error is shown by T1V, T1A, T2V, T2A . . . TnV, TnA in the structure 702. TnV and TnA show the position of video information and the position of audio information to be reproduced at time Tn, respectively. THe positional error between TnV and TnA increases while repeatedly using the ring buffer.

When such video/audio coded and multiplexed information is reproduced, a buffer in a reproduction apparatus cannot absorb the positional error between TnV and TnA, and the apparatus fials to synchronize image and voice.

In order to solve this problem, the structure of video and audio memory blocks in the video/audio buffer is calculated at every reuse of the ring buffer so as to replace the positions of video and audio memory blocks with correct ones. However, when such calculations are performed, the effect of the apparatus according to the sixth embodiment, that is, high-speed multiplexing by calculating block positions in advance and storing coded information in the predetermined block positions, is deteriorated because of an increase in process burden due to so many calculations.

Of course, there is no such problem if the accurate ratio of the video bit rate and the audio bit rate is realized. However, it is difficult to realize the ratio accurately, and the performance of the apparatus will be sacrificed. For example, as described above, there is a case where all of the video and audio memory blocks must be the same in size, being restricted by the reproduction processing system. Further, some computer systems request that video and audio memory blocks are aligned with boundaries efficient for processing (e.g. word boundaries, or units of multiple of sectors in hard disk). It is difficult to realize the accurate ratio of video bit rate and audio bit rate, adaptively to the above-mentioned restrictions, in the limited memory space.

A video/audio coding and multiplexing apparatus according to this eighth embodiment can prevent the above-mentioned problem relating to the positional error in video and audio memory blocks, by performing a correction process.

Figure 22:
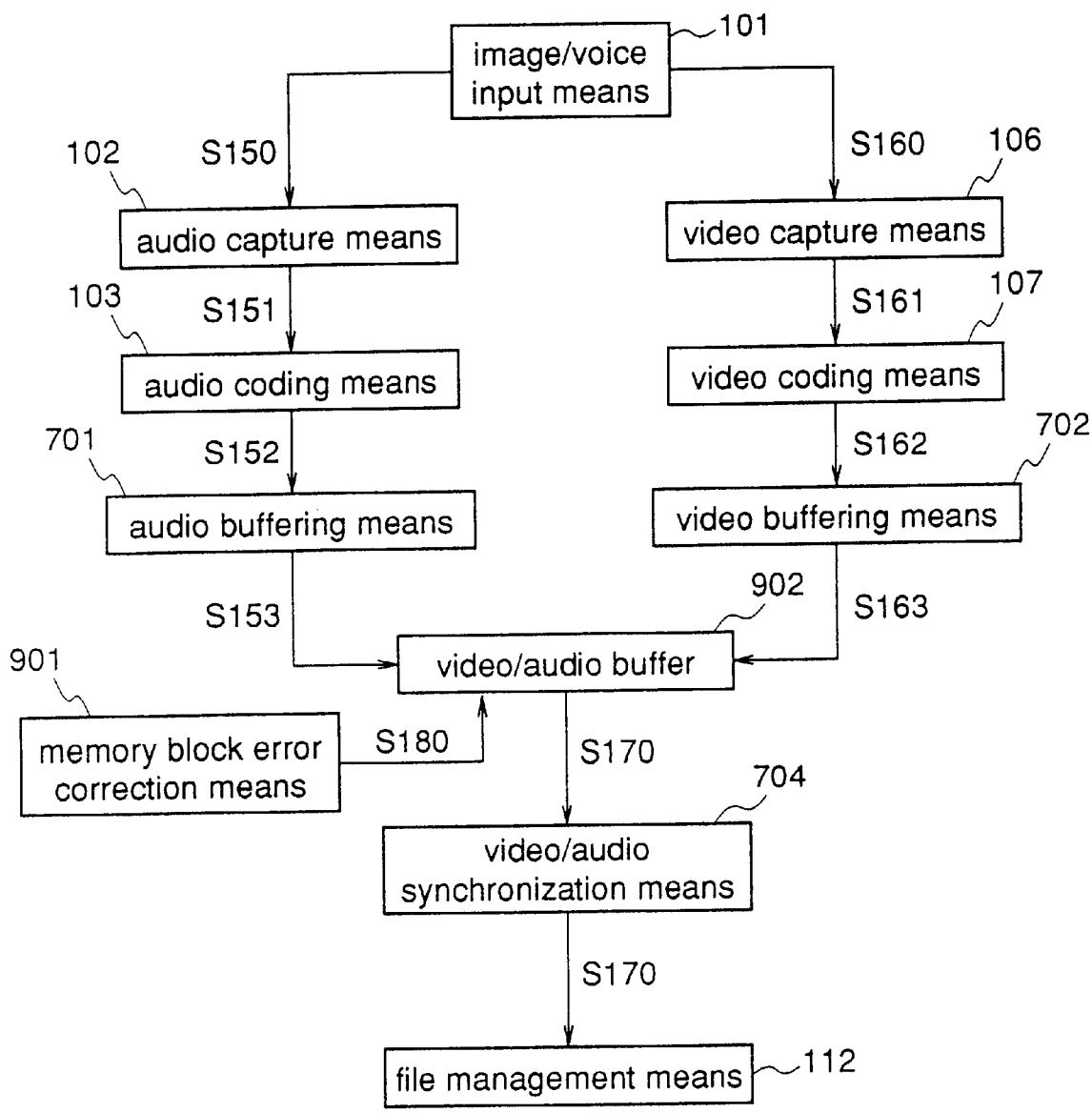
FIG. 22 is a block diagram illustrating a video/audio coding and multiplexing apparatus according to an eighth embodiment of the invention.

FIG. 22 is a block diagram showing the structure of the apparatus according to this eighth embodiment. As shown in FIG. 22, in this eighth embodiment, a memory block error correction means 901 is added to the same structure as the apparatus according to the sixth embodiment. The memory block error correction means 901 operates intermittently at time intervals, and performs an error detection process and an error correction process. In the error detection process, the memory block error correction means 901 detects an audio memory block in which coded audio information to be reproduced at a reproduction time is stored and a video memory block in which coded video information to be reproduced at the reproduction time is stored, and obtains a difference in locations between the audio memory block and the video memory block in the video/audio buffer 902, as a memory block error. In the error correction process, it inserts dummy data by a quantity equivalent to the detected error, in the video memory block or the audio memory block. The dummy data used in the correction process has no meaning for a decoder that decodes and reproduces the video/audio coded and multiplexed information. In the video/audio buffer 902, ring buffer operation is executed.

The image/voice input means 101, the audio capture means 102, the audio coding means 103, the video capture means 106, the video coding means 107, and the file management means 112 are identical to those described for the first embodiment and the audio buffering means 701 and the video buffering means 702 are identical to those already described for the sixth embodiment and, therefore, these means do not require repeated description.

Figure 23:
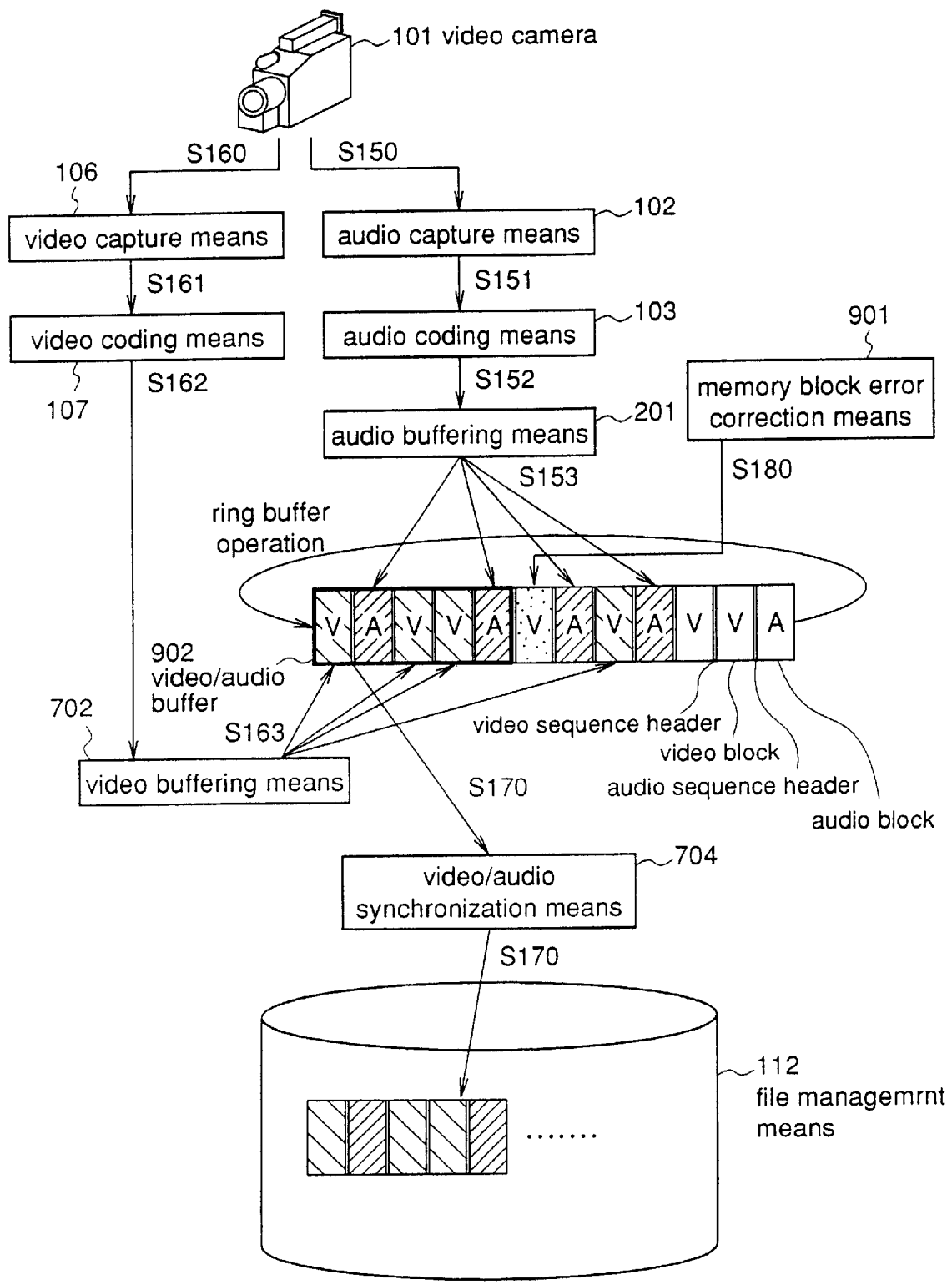
FIG. 23 is a diagram for explaining the operation of the apparatus shown in FIG. 22.

FIG. 23 is a diagram for explaining the operation of the apparatus shown in FIG. 22, with respect to the video/audio processing. In the video/audio buffer 902, audio memory blocks and video memory blocks are alternately arranged in advance in units of reproduction time Tm corresponding to the synchronous interval time information according to the first embodiment (i.e., S1 and S2). In this eight embodiment, the bit rate of coded audio information is 384 Kbps, and the bit rate of coded video information is 524 Kbps. Restricted by the system executing reproduction of coded and multiplexed information, all of the audio memory blocks and the video memory blocks are created in the same size, and S1 and S2 are set so that a difference between the audio bit rate and the video bit rate is absorbed by the number of the video and audio memory blocks. That is, since the ratio of the video bit rate to the audio bit rate is 524:384 (≈1.36:1), video/audio multiplexed information in which one audio memory block is provided for one or two video memory block(s) is generated.

Since the video/audio buffer 902 performs ring buffer operation with the capacity restricted as mentioned above, the number of blocks does not accurately correspond to the ratio of bit rates, i.e., the ratio is not 1.36:1 but 1.4:1. So, due to repetition of the ring buffer operation, a positional error occurs between a video memory block and an audio memory block which are to be reproduced at the same time, that is, the video memory block is located behind the audio memory block. In order to solve this problem, the memory block error correction means 901 functions at set time intervals, and inserts dummy data in the video memory block so that the video memory block catches up with the audio memory block, whereby video/audio synchronization is maintained.

Like the sixth embodiment of the invention, a video sequence header and an audio sequence header are previously written in places before each video memory block and each audio memory block, respectively. When the audio buffering means 701 stores coded audio information in the video/audio buffer 902, if there is an empty audio memory block sandwiched by video memory blocks in which data are stored, the audio buffering means 701 stores data in such an audio memory block from the head of the block. When there is no such an audio memory block, the buffering means 701 stores data in an empty audio memory block from the head of the block. The video buffering means 702 stores data in similar manner. Further, blocks from which data have been read by the video/audio synchronization means 704 become empty blocks.

Hereinafter, the operation of the apparatus so constricted will be described along FIG. 23 with reference to FIG. 22.

With reference to FIG. 23, initially, the video camera 101 captures image and voice, and outputs analog audio information S150 and analog video information S160 separately. The video capture means 106 receives the analog video information S160, digitizes it, and outputs digital pro-video information S161. The video coding means 107 encodes the pro-video information S161 and outputs coded video information S162. The video buffering means 702 stores the coded video information S162 over plural video memory blocks in the video/audio buffer 703 from the head video block. The video buffering means 702 regards the video blocks filled up with information as being in the "data stored" state.

On the other hand, the audio capture means 102 receives the analog audio information S150 output from the video camera 101, digitizes it, and outputs pro-audio information S151. The audio coding means 103 encodes the pro-audio information S151 and outputs coded audio information S152. The audio buffering means 701 stores the coded audio information S152 over plural audio memory blocks in the video/audio buffer 703 from the head audio block. The audio buffering means 701 regards the audio blocks filled up with information as being in the "data stored" state.

The video/audio synchronization means 704 reads out a portion where video memory blocks and audio memory blocks in the "data stored" state are continuous from the video/audio buffer 902, and outputs this portion as video/audio coded and multiplexed information S170 to the file management means 112. The video/audio synchronization means 110 regards the blocks from which information has been read out as being in the "data storable" state.

The process steps from the image/voice input by the video camera 101 to the output of the coded audio information S152 by the audio coding means 103 and the output of the coded video information S162 by the video coding means 107 are performed in the same manner as described for the sixth embodiment. The audio buffering means 701 and the video buffering means 702 store coded information in blocks in the "data storable" state in the video/audio buffer 902. Since the ring buffer operation is performed as mentioned above, storage of coded information is carried out from the head of the video/audio buffer toward its back end and, when the back end is reached, it returns to the head of the buffer. Likewise, read-out of information by the video/audio synchronization means 704 is performed from the head of the buffer toward the back end and, when the back end is reached, it returns to the head. Blocks from which information has been read out are regarded as being in the "data storable" state. In this way, the ring buffer operation is maintained.

In this eighth embodiment, when a set time has elapsed, the memory block error correction means 901 functions. The memory block error correction means 901 calculates a reproduction time of coded video information which has been stored last in the video/audio buffer 902, on the basis of frame information possessed by the coded video information, and obtains reproduction time T1. Next, the correction means 901 obtains an audio memory block in which coded audio information having the same reproduction time as T1 is stored, on the basis of the bit rate of coded audio information. Finally, the correction means 901 execute a correction process when a memory block error, which is a difference between the position of video memory block in which information has been stored last (last video memory block) and the position of the audio memory block obtained, is larger than one block. In the correction process, dummy data S180 is stored in a video memory block subsequent to the last video memory block, and this block is regarded as being in the "data stored" state.

While the image/voice input continues, the above-mentioned operation is repeated, and obtained video/audio coded and multiplexed information is stored in a file by the file management means 112.

As described above, according to the eighth embodiment of the invention, the memory block error correction means 901 is added to the apparatus according to the sixth embodiment. In this apparatus, coded information is stored in buffers which are arranged alternately in predetermined units, and the memory block error correction means 901 periodically checks positions of coded video information and coded audio information having the same reproduction time. When the correction means 901 detects a positional error, it corrects the error by inserting dummy data. Therefore, like the sixth embodiment of the invention, it is possible to generate synchronous video/audio multiplexed information rapidly with less memory. Further, it is possible to avoid a synchronization error due to ring buffer operation, using a buffer with efficient memory management by the ring buffer method, without increasing the process burden to calculations.

In this eighth embodiment, the memory block error correction means 901 detects the reproduction time of coded video information which has been stored last and then detects the position of coded audio information having the same reproduction time. However, the error detection procedure is not restricted to this manner. For example, after detecting the reproduction time of coded audio information, the position of coded video information having the same reproduction time may be detected.

Further, in this eighth embodiment, when the reproduction time of coded video information is detected, frame information included in the video information is used and, when the reproduction time of coded video information is detected, a predetermined bit rate is used. However, the reproduction time of coded video information may be detected using a predetermined bit rate, and the reproduction time of coded audio information may be detected using additional information, such as time stamp.

When additional information, such as time stamp, is used for detection of reproduction time, even though the video coding means 107 (audio coding means 103) cannot keep the predetermined bit rate and outputs coded information including a bit rate error, the reproduction time is detected by the additional information. Therefore, in the same structure as described for this eighth embodiment, a secondary effect is provided, that is, a bit rate error is detected as a memory block error and corrected.

Further, in this eighth embodiment, when the memory block error correction means 901, operating periodically, detects a memory block error which is larger than one memory block, it corrects the error immediately. However, the memory block error correction means 901 may be provided with a threshold, and it corrects a memory block error only when the error exceeds the threshold. Also in this case, the above-mentioned purpose is achieved by setting a threshold that does not cause overflow of information from a buffer in a decoder. In addition, video/audio decoded information can be corrected at one time, not at many points in the information.

Furthermore, in the eighth embodiment of the invention, the memory block error correction means 901 detects a memory block error from the reproduction time of coded information stored. However, the memory block error correction means 901 is not restricted thereto. For example, since an error potentially possessed by the memory unit is previously known (in the eighth embodiment, a difference between the original (desired) bit rate ratio 1.36:1 and the actual bit rate ratio 1.4:1), this previously known error may be corrected by appropriately inserting dummy data, without detecting the memory block error each time. In this case, although the secondary effect mentioned above, that is, correction of bit rate error, is not achieved, the structure of the memory block error correction means can be simplified.

Embodiment 9

A video/audio coding and multiplexing apparatus according to a ninth embodiment of the invention is directed to solving problems which might occur when the apparatus according to the sixth embodiment is implemented using a ring buffer.

Figure 24:
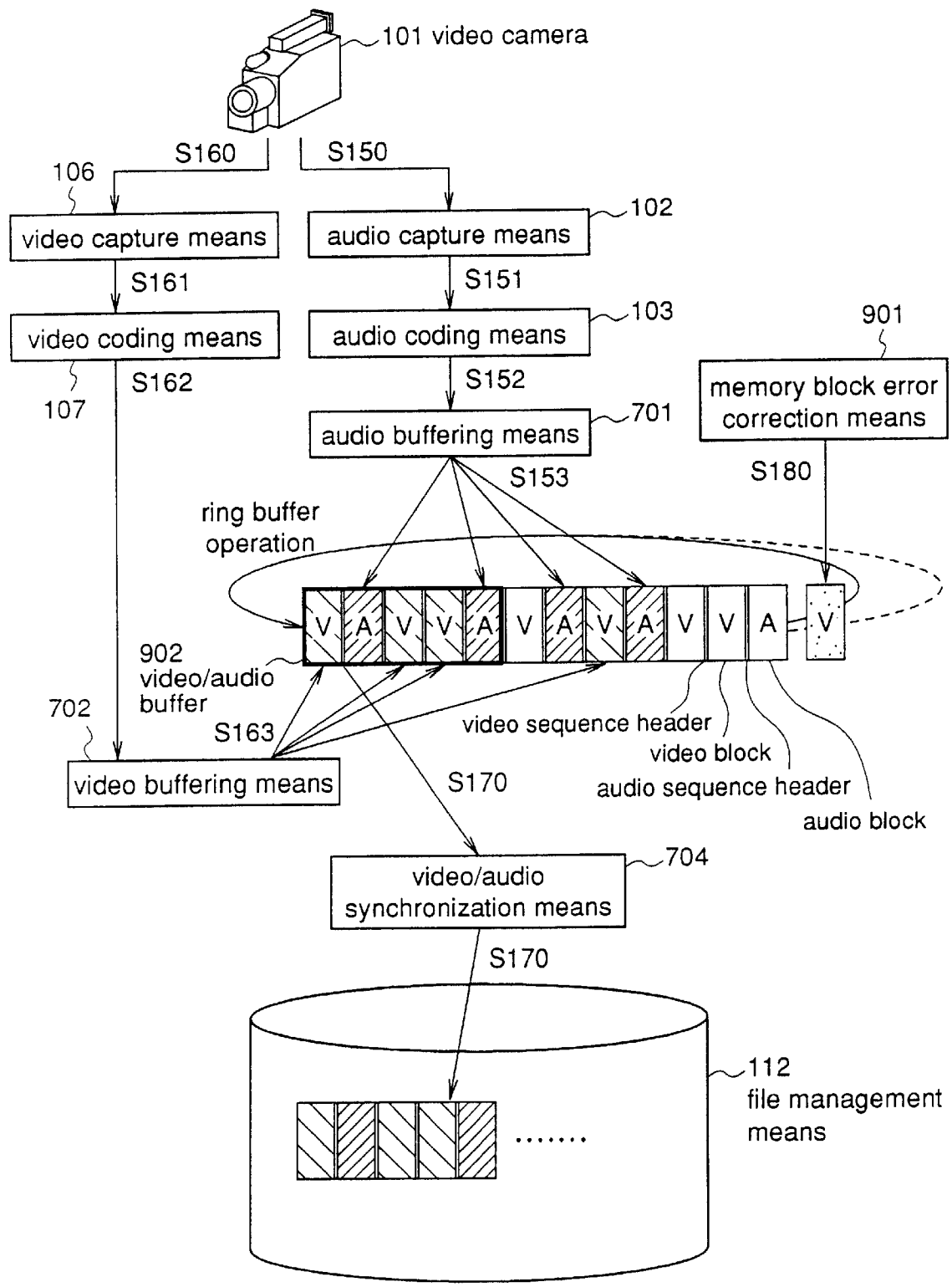
FIG. 24 is a diagram for explaining the operation of a video/audio coding and multiplexing apparatus according to a ninth embodiment of the invention.

The video/audio coding and multiplexed apparatus according to this ninth embodiment is identical to the apparatus according to the eighth embodiment shown in FIG. 22 except the function of the memory block error correction means 901. FIG. 24 is a diagram for explaining the operation of the apparatus according to this ninth embodiment, with respect to the video/audio processing. In the figure, the memory block error correction means 901 operates intermittently at time intervals, and performs an error detection process and an error correction process. In the error detection process, the memory block error correction means 901 detects an audio memory block in which coded audio information to be reproduced at a reproduction time is stored and a video memory block in which coded video information to be reproduced at the reproduction time is stored, and obtains a difference in locations between the audio memory block and the video memory block in the video/audio buffer 902, as a memory block error. In the error correction process, the correction means 901 adds video memory blocks or audio memory blocks, as error correcting blocks equivalent to the detected error, in the memory unit used as the video/audio buffer 902 and, after the added blocks are used, the correction means 901 deletes these blocks.

The operation of the video/audio coding and multiplexing apparatus so constructed is identical to that according to the eighth embodiment except the operation of the memory block error correction means 901. So, only the operation of the memory block error correction means 901 will be described hereinafter.

Also in this ninth embodiment, after a set time has elapsed, the memory block error correction means 901 functions. Then, error detection is carried out in the same manner as mentioned for the eighth embodiment, and execution of correction is decided according to the size of the detected error.

In this ninth embodiment, the error correction process is as follows. The memory block error correction means 901 adds an error correcting block S180 to the back end of the video/audio buffer 902. At this time, the error correcting block S180 is in its "data storable" state. Then, the memory block error correction means 901 monitors accumulation of information in the error correcting block S180.

It is assumed that the ring buffer operation to the video/audio buffer 902 continues and accumulation and read-out of information in the error correcting block S180 are being executed. The memory block error correction means 901 knows that the state of the error correcting block S180 has changed from "data storable" to "data stored", and again to "data storable". So, the memory block error correction means 901 deletes the error correcting block S180.

While the image/voice input continues, the above-mentioned operation is repeated, and obtained video/audio coded and multiplexed information is stored in a file by the file management means 112.

As described above, according to the ninth embodiment of the invention, the memory block error correction means 901 is added to the apparatus according to the sixth embodiment. In this apparatus, coded information is stored in buffers which are arranged alternately in predetermined units, and the memory block error correction means 901 periodically checks positions of coded video information and coded audio information having the same reproduction time. When the correction means 901 detects a positional error, it corrects the error by temporarily adding memory blocks for error correction. Therefore, like the sixth embodiment of the invention, it is possible to generate synchronous video/audio multiplexed information rapidly with less memory. Further, it is possible to avoid a synchronization error due to ring buffer operation, using a buffer with efficient memory management by the ring buffer method, without increasing the process burden due to calculations.

While in this ninth embodiment the memory block error correction means 901 adds the error correcting block S180 at the end of the video/audio buffer 902, the error correcting block S180 may be added at the head of the buffer 902 with the same effects as mentioned above.

Further, also in this ninth embodiment, as described for the eighth embodiment, other methods may be used to detect a reproduction time of coded information. Further, a memory block error may be corrected when a threshold is exceeded. Furthermore, an error which has previously been known may be corrected instead of detecting a memory block error for each time.

Furthermore, in the eighth and ninth embodiments of the invention, coded audio information and coded video information are stored block by block. However, these embodiments can be applied to a case where a block is filled halfway with information as described for the sixth embodiment. In this case, when error correction is executed, for the block filled halfway with information, its content is copied to move the location of the block.

The video/audio coding and multiplexing apparatuses according to the sixth to eighth embodiments can be modified to avoid overflow of information from a buffer as described for the third to fifth embodiments. For example, in an apparatus according to any of the sixth to eighth embodiments, a coded audio storage time output means and a coded video storage time output means according to the third embodiment are added to monitor the video/audio buffer by these means and, further, an audio interruption prevention means and a dummy video insertion means are added, whereby overflow of information from an audio buffer can be avoided.

Embodiment 10

In a video/audio coding and multiplexing apparatus according to a tenth embodiment of the invention, the quantity of a buffer employed is decided according to the performance of the apparatus.

Figure 25:
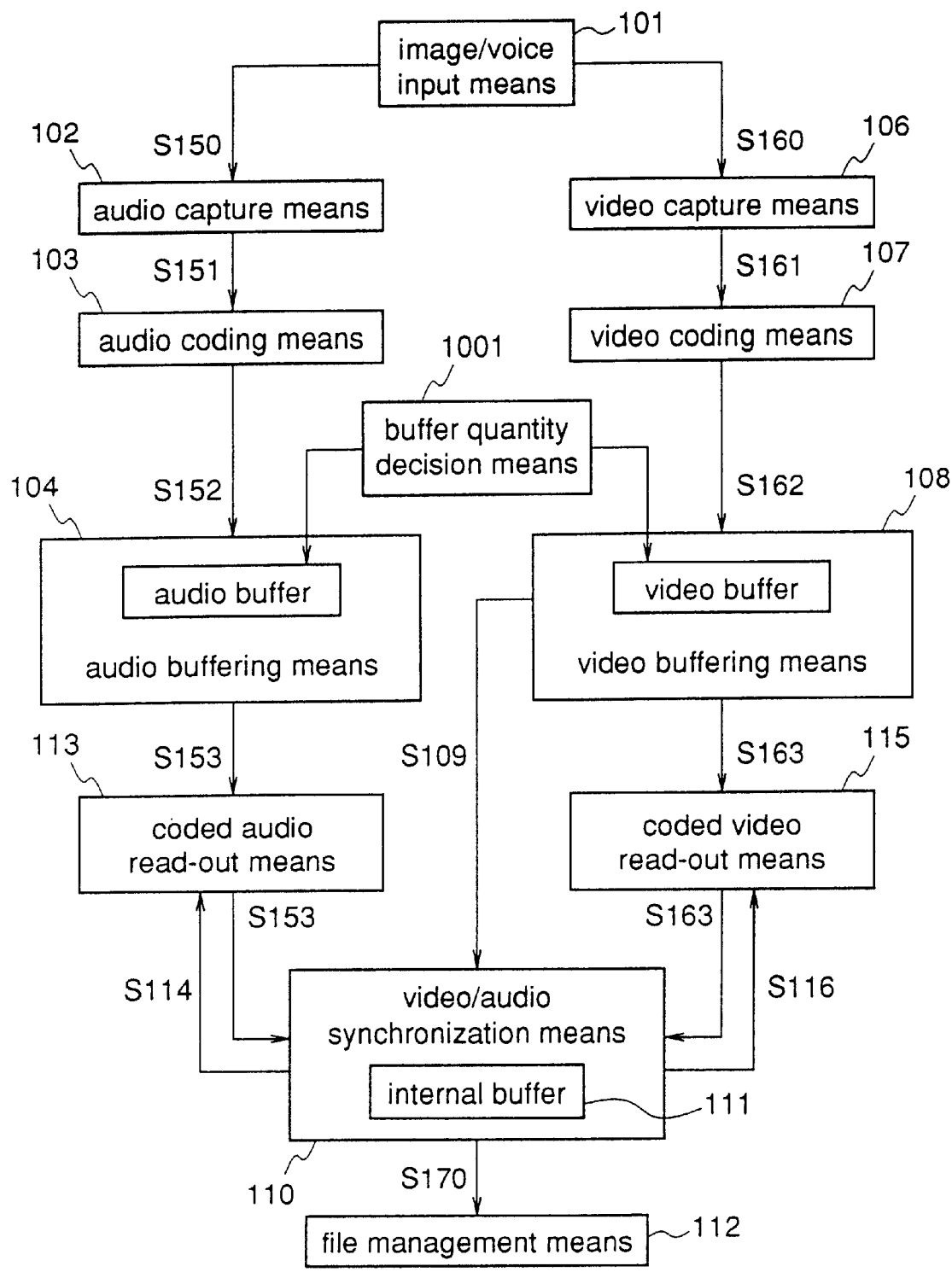
FIG. 25 is a block diagram illustrating a video/audio coding and multiplexing apparatus according to a tenth embodiment of the invention.
Figure 26:
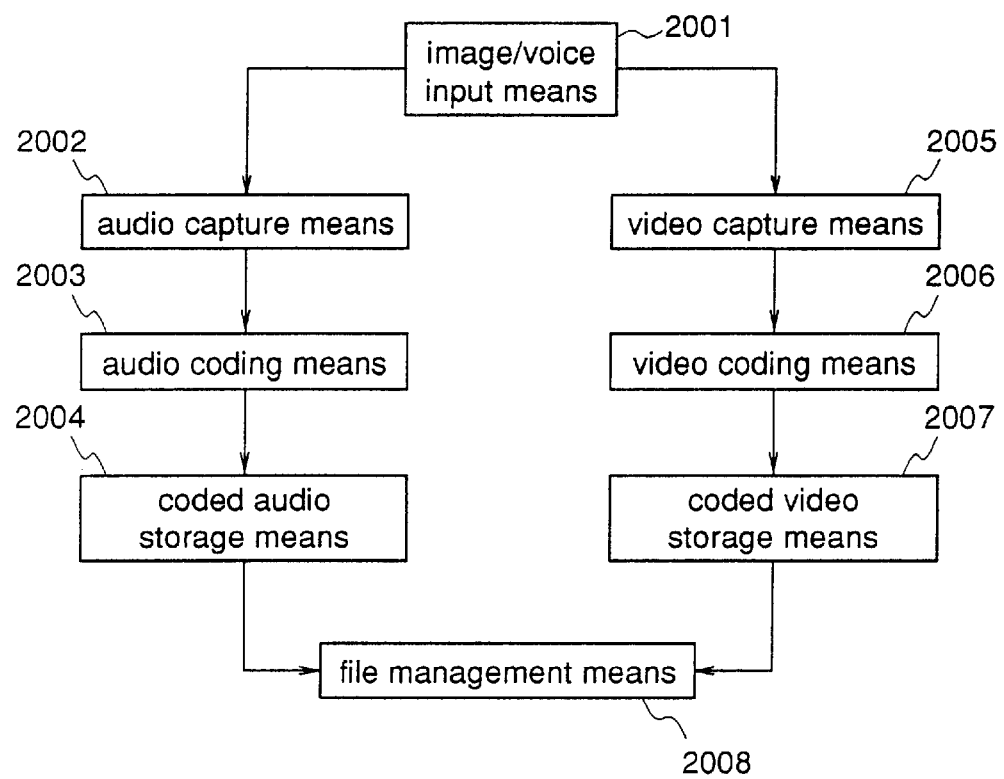
FIG. 26 is a block diagram illustrating a video/audio coding and multiplexing apparatus according to the prior art.
Figure 27:
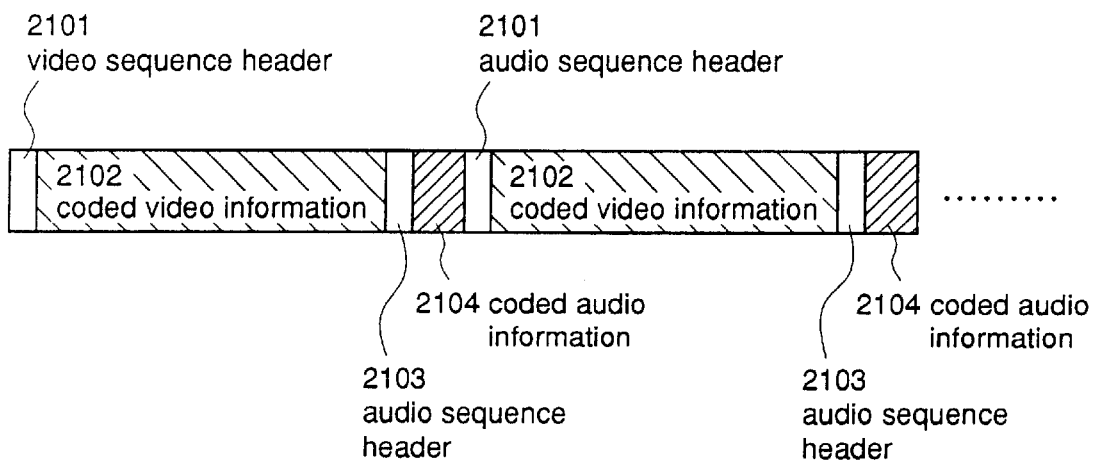
FIG. 27 is a diagram for explaining video/audio coded and multiplexed information.
Figure 28:
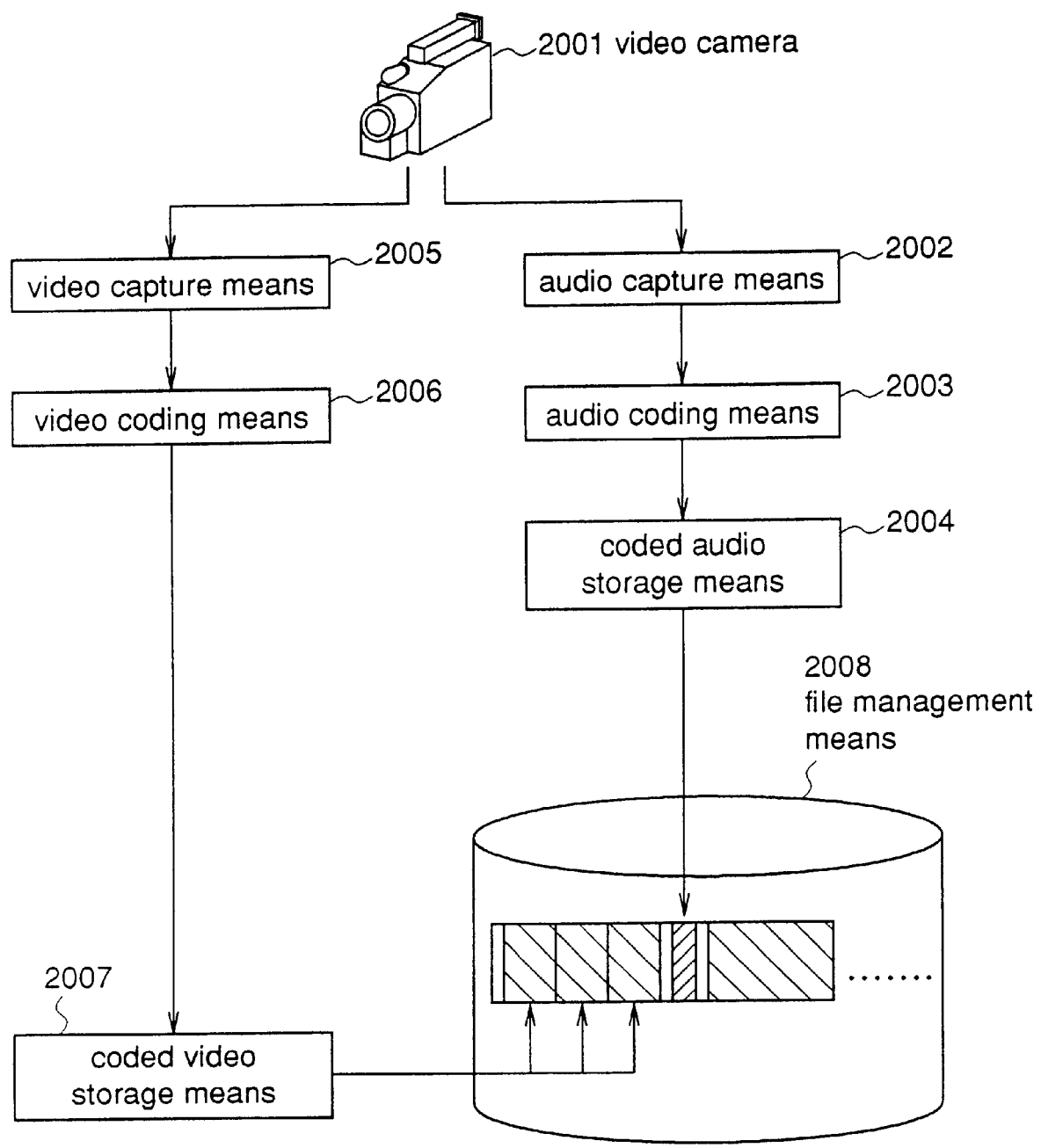
FIG. 28 is a diagram for explaining the operation of the apparatus shown in FIG. 26.
Figure 29:
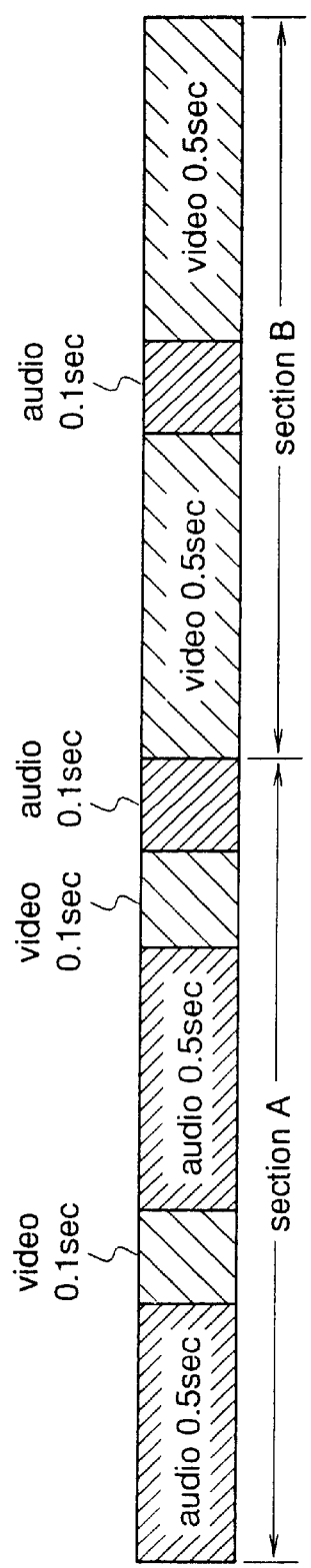
FIG. 29 is a diagram for explaining a problem of the apparatus shown in FIG. 26.
Figure 30:
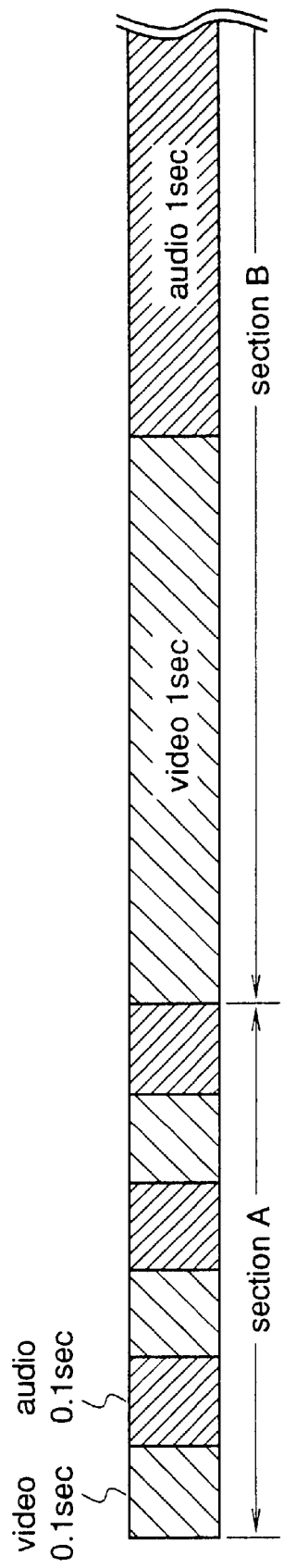
FIG. 30 is a diagram for explaining another problem of the apparatus shown in FIG. 26.

FIG. 25 is a block diagram illustrating a video/audio coding and multiplexing apparatus according to the tenth embodiment of the invention. In the figure, a buffer quantity decision means 1001 evaluates the performance of the operating computer system, and decides the quantities of buffers used by the video buffering means 108 and the audio buffering means 104 according to the result of the judgement. In the apparatus shown in FIG. 25, after a large buffer is provisionally obtained, video/audio coding and synchronization are performed on trial, and a maximum quantity of the buffer employed is regarded as an optimum buffer quantity. The audio buffering means 104 (the video buffering means 108) has a function for storing a maximum coded audio buffer quantity (a maximum coded video buffer quantity), and monitors the quantity of coded audio information S152 (coded video information S162) stored in the internal audio buffer (internal video buffer), and updates the maximum coded audio buffer quantity (the maximum coded video buffer quantity).

The image/voice input means 101, the audio capture means 102, the audio coding means 103, the video capture means 106, the video coding means 107, the video/audio synchronization means 110, the file management means 112, the coded audio read-out means 113, and the coded video-read-out means 115 are identical to those described for the first embodiment and, therefore, do not require repeated description. Further, the bit rates of coded video information and coded audio information are the same as those mentioned for the first embodiment.

A description is given of the operation of the apparatus so constructed. Before processing, the buffer quantity decision means 1001 provisionally decides sufficiently large quantities of the video buffer and the audio buffer used by the video buffering means 108 and the audio buffering means 104, respectively, and requests the operating system to secure memory areas for the decided buffer quantities. Thereafter, test coding for deciding optimum buffer quantities is executed.

The process steps from the image/voice input by the video camera 101 to the storage of video/audio coded and multiplexed information in a file by the file management means 112 are carried out in the same manner as mentioned for the first embodiment. During the process steps, the audio buffering means 104 and the video buffering means 108 monitor the quantities of coded audio information S152 and coded video information S162 stored in the internal audio buffer and the internal video buffer, store a maximum coded audio buffer quantity and a maximum coded video buffer quantity, and update the quantities, respectively.

For a prescribed period of time, the above-mentioned process steps are repeated. During the process steps, maximum values of stored coded video information and coded audio information are stored as a maximum coded video buffer quantity and a maximum coded audio buffer quantity, respectively. When the prescribed period has elapsed, the coding process is interrupted. The buffer quantity decision means 1001 captures the maximum coded video buffer quantity and the maximum coded audio buffer quantity at this time from the video buffering means 108 and the audio buffering means 104, respectively, and decides, as optimum buffer quantities, quantities obtained by adding predetermined quantities as margins to the maximum video and audio buffer quantities, and corrects the sizes of video and audio buffers which has provisionally obtained.

When the optimum buffer sizes are obtained, the coding process is resumed. The subsequent coding and multiplexing process steps are identical to those already described for the first embodiment.

As described above, according to the tenth embodiment of the invention, the buffer quantity decision means 1001 provisionally decides the quantities of video and audio buffers, and performs test coding using the buffers. At this time, the maximum quantities of buffers used actually are stored, and optimum video and audio buffer quantities are decided using the maximum quantities. With respect to the quantities of coded information stored in the video buffer and the audio buffer, when the time interval between the video coding process and the audio coding process increases or when the coding processes are one-sided, one of the quantities in the video buffer and the audio buffer is larger than the other. When the video and audio coding processes are performed equally and frequently, the quantities of coded information stored in the video and audio buffers are small, so that the sizes of these buffers can be reduced. However, when video and audio coding processes are delayed due to increment of load on the operating system, the video and audio buffers must be large in size for synchronization. To increase the buffer size provides a margin for synchronization, but it is uneconomical for the whole system to secure a memory area for the margin, resulting in a reduction in performance. So, in this tenth embodiment, video (audio) coding is performed on trail using a sufficiently large buffer, and the size of a buffer that is actually required for synchronization in the system is decided, and the buffer size is corrected using the decided buffer size. Therefore, coding is performed using a buffer having an optimum size.

In this tenth embodiment, to obtain an optimum buffer size, a sufficiently large buffer is provided first, and test coding is performed using the buffer to decide an optimum buffer size, and then an unnecessary portion of the buffer is abandoned. However, the present invention is not restricted to this method. In contrast with the above method, test coding may be performed using a small buffer. In this case, when information overflows the buffer, the test coding is interrupted to increase the buffer size a little, and then it is resumed using the increased buffer. This process is repeated until no information overflows the buffer, thereby to obtain an optimum buffer size.

In this tenth embodiment, when the test coding is performed, image and voice are input from the video camera. However, for the test coding, digital pro-audio information and digital pro video information for the test coding may be stored in advance and directly input to the audio coding means and the video coding means, respectively.

Further, although in this tenth embodiment an optimum buffer quantity (size) is obtained by test coding, the present invention is not restricted to this method. Alternately for example, a buffer size can be decided by predicting the ability of operating environment on the basis of the type of operating CPU or the type of operating system, or the number and kinds of processes operated synchronously. Further, it is possible to ask the user about the ability of operating environment.

Furthermore, the buffer size decided by the test coding may be updated. More specifically, test coding may be performed periodically, or at every booting of system, to update the buffer size. In this case, the buffer size can be set adaptively to change in system environment.

Further, although in this tenth embodiment separated video buffer and audio buffer are used, a buffer common to video information and audio information may be used like the sixth embodiment of the invention. Also in this case, the same effects as mentioned above are obtained.

In the first to tenth embodiments of the invention, analog video/audio information is input through the video camera, and digital pro-video information and digital pro-audio information are output from the video capture means and the audio capture means, respectively. However, when a peripheral equipment capable of digital input, such as a digital camera, is used, or when digitized image and voice are supplied from a recoding unit of a communication path, the digital video and audio information can be processed as pro-video and pro-audio information in the coding step. Also in this case, the above-mentioned effects relating to video/audio coding and multiplexing are obtained.

Furthermore, in any of the aforementioned embodiments, video/audio coded and multiplexed information is not only recorded and utilized in the video/audio coding and multiplexing apparatus, but can be recorded and utilized in another apparatus through a communication path or a recording medium.

Furthermore, a video/audio coding and multiplexing apparatus according to any of the aforementioned embodiment is implemented by recording, in a recoding medium, a program for performing the video/audio coding and multiplexing process according to the embodiment, and executing the program in a computer system, such as a personal computer or a work station. Any recording medium can be employed as long as it can contain the program, for example, floppy disk, CD-ROM, optical disk, magnetic tape.

What is claimed is:

1. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time; and coded multimedia information synchronization step in which the coded multimedia information stored in the memory unit is read out, and multimedia data coded and multiplexed information is generated, wherein the multimedia data coding step comprises:

video coding step in which pro-video information comprising plural pieces of digitized still picture information is coded to generate coded video information having a reproduction time Tv and a quantity Vv; and audio coding step in which digitized pro-audio information is coded to generate coded audio information having a reproduction time Ta and a quantity Va;

the multimedia buffering step comprises:

video buffering step in which reproduction time information defined on the basis of the reproduction time Tv, and the coded video information equivalent to the coded multimedia unit quantity are temporarily stored in the memory unit for temporary storage in the following manner: when there is a space between two blocks of coded audio information which have already been stored, the reproduction time information and the coded video information are stored in this space and, when there is no such a space, they are stored in a place subsequent to a block of coded audio information which has previously been stored, leaving a space equivalent to the unit quantity Va of coded audio information; and audio buffering step in which reproduction time information defined on the basis of the reproduction time Ta, and the coded audio information equivalent to the coded multimedia unit quantity are temporarily stored in the memory unit for temporary storage in the following manner: when there is a space between two blocks of coded video information which have already been stored, the reproduction time information and the coded audio information are stored in this space and, when there is no such a space, they are stored in a place subsequent to a block of coded video information which has previously been stored, leaving a space equivalent to the unit quantity Vv of coded video information; and in the coded multimedia information synchronization step, from the memory unit, a portion where the coded video information and the coded audio information are stored leaving no space between them is read out.

2. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time;

coded multimedia information synchronization step in which the coded multimedia information stored in the memory unit is read out, and multimedia data coded and multiplexed information is generated;

storage position error correction step of performing a storage position error detection process and a storage position error correction process, at prescribed time intervals;

wherein said storage position error detection process is to detect a difference between an audio storage position where coded audio information to be reproduced at a reproduction time is stored and a video storage position where coded video information to be reproduced at the reproduction time is store is stored, as a storage position error, in the memory unit temporary storage, and said storage position error correction process is to correct the storage position error detected in the error detection process.

3. The method of claim 2 wherein the storage position error correction process is performed by storing prescribed coded multimedia information in the memory unit for temporary storage.

4. The method of claim 1 wherein the storage position error correction process is performed by setting an additional storage position that temporarily extends the memory unit for temporary storage.

5. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data, and block rate information is generated on the basis of the reproduction time T and the quantity V;

coded multimedia information buffering step in which the coded multimedia information and the block rate information are temporarily stored in a memory unit for temporary storage;

coded multimedia information read-out step in which the coded multimedia information stored in the memory unit is read out by a quantity equivalent to synchronous interval time information which is obtained by using the block rate information and shows a time interval in the time division multiplexing;

coded multimedia information synchronization step in which multimedia data coded and multiplexed information is generated by performing multiplexing to the read-out coded multimedia information;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step;

in the coded multimedia information buffering step, when the dummy information insertion period is input, the coded multimedia information generated in the multimedia data coding step is abandoned by a quantity equivalent to the dummy information insertion period, without being stored in the memory unit for temporary storage.

6. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time;

coded multimedia information synchronization step in which the coded multimedia information stored in the memory unit is read out, and multimedia data coded and multiplexed information is generated;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step;

in the coded multimedia information buffering step, when the dummy information insertion period is input, the coded multimedia information generated in the multimedia data coding step is abandoned by a quantity equivalent to the dummy information insertion period, without being stored in the memory unit for temporary storage.

7. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data, and block rate information is generated on the basis of the reproduction time T and the quantity V;

coded multimedia information buffering step in which the coded multimedia information and the block rate information are temporarily stored in a memory unit for temporary storage;

coded multimedia information read-out step in which the coded multimedia information stored in the memory unit is read out by a quantity equivalent to synchronous interval time information which is obtained by using the block rate information and shows a time interval in the time division multiplexing;

coded multimedia information synchronization step in which multimedia data coded and multiplexed information is generated by performing multiplexing to the read-out coded multimedia information;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step;

in the multimedia data coding step, when the dummy information insertion period is input, digital multimedia data is abandoned, without being coded, by a quantity equivalent to the dummy information insertion period.

8. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time;

coded multimedia information synchronization step in which the coded multimedia information stored in the memory unit is read out, and multimedia data coded and multiplexed information is generated;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step;

in the multimedia data coding step, when the dummy information insertion period is input, digital multimedia data is abandoned, without being coded, by a quantity equivalent to the dummy information insertion period.

9. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data, and block rate information is generated on the basis of the reproduction time T and the quantity V;

coded multimedia information buffering step in which the coded multimedia information and the block rate information are temporarily stored in a memory unit for temporary storage;

coded multimedia information read-out step in which the coded multimedia information stored in the memory unit is read out by a quantity equivalent to synchronous interval time information which is obtained by using the block rate information and shows a time interval in the time division multiplexing;

coded multimedia information synchronization step in which multimedia data coded and multiplexed information is generated by performing multiplexing to the read-out coded multimedia information;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step;

in the multimedia data coding step, the digital multimedia data is subjected to a coding process for generating independently coded information which can be decoded independently, and different coded information which can be decoded with reference to another coded multimedia information, thereby to generate coded multimedia information comprising the independently coded information and the difference coded information;

in the coded multimedia information buffering step, when the dummy information insertion period is input, the coded multimedia information generated in the multimedia data coding step is abandoned by a quantity equivalent to the dummy information insertion period, without being stored in the memory unit for temporary storage, and thereafter, subsequent different coded information is converted to independently coded information and stored temporarily.

10. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time;

coded multimedia information synchronization step in which the coded multimedia information stored in the memory unit is read out, and multimedia data coded and multiplexed information is generated;

interruption prevention step in which, when the quantity of the coded multimedia information temporarily stored in the coded multimedia information buffering step exceeds a prescribed value, a dummy information insertion period is calculated on the basis of the quantity of the coded multimedia information stored, and the dummy information insertion period is output to the coded multimedia information buffering step and to a dummy information insertion step described later; and dummy information insertion step in which, when the dummy information insertion period is input, coded multimedia information equivalent to the dummy information insertion period is generated and output so that it is temporarily stored in the coded multimedia information buffering step;

in the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information;

in the coded multimedia information buffering step, when the dummy information insertion period is input, the coded multimedia information generated in the multimedia data coding step is abandoned by a quantity equivalent to the dummy information insertion period, without being stored in the memory unit for temporary storage, and thereafter, subsequent different coded information is converted to independently coded information and stored temporarily.

11. A multimedia data coding and multiplexing method for generating multimedia data coded and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data, and block rate information is generated on the basis of the reproduction time T and the quantity V;

coded multimedia information buffering step in which the coded multimedia information and the block rate information are temporarily stored in a memory unit for temporary storage;

coded multimedia information read-out step in which the coded multimedia information stored in the memory unit is read out by a quantity equivalent to synchronous interval time information which is obtained by using the block rate information and shows a time interval in the time division multiplexing;

coded multimedia information synchronization step in which multimedia data coded and multiplexed information is generated by performing multiplexing to the read-out coded multimedia information; wherein in the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information;

and the method further comprising:

interruption prevention step in which, when the quantity of the coded multimedia information temporarily stored in the coded multimedia information buffering step exceeds a prescribed value, a dummy information insertion period is calculated on the basis of the quantity of the coded multimedia information stored and, thereafter, an insertion correcting period is calculated, which period is equivalent to a process for coding digital multimedia data which follows digital multimedia data uncoded and abandoned in the multimedia data coding step and is to be difference coded information and, thereafter the dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step; and in the multimedia data coding step, when the dummy information insertion period is abandoned, without being coded, by a quantity equivalent to the dummy information insertion time.

12. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage sot that it is divided in unit quantities using a coded multimedia information unit quantity that shows a quantity of coded multimedia data equivalent to a set reproduction time; and coded multimedia information synchronization step in which the coded multimedia information stored in the memory unit is read out, and multimedia data coded and multiplexed information is generated; wherein in the multimedia data coding step, the digital multimedia data is subjected to a coding process for generating independently coded information which can be decoded independently, and difference coded information which can be decoded with reference to another coded multimedia information, thereby to generate coded multimedia information comprising the independently coded information and the difference coded information;

and the method further comprising:

interruption prevention step in which, when the quantity of the coded multimedia information temporarily stored in the coded multimedia information buffering step exceeds a prescribed value, a dummy information insertion period is calculated on the basis of the quantity of the coded multimedia information stored and, thereafter, an insertion correcting period is calculated, which period is equivalent to a process for coding digital multimedia data which follows digital multimedia data uncoded and abandoned in the multimedia data coding step and is to be difference coded information and, thereafter the dummy information insertion period is corrected by adding the insertion correcting period, and the corrected dummy information insertion period is output to the multimedia data coding step and to a dummy information insertion step described later; and dummy information insertion step in which, when the dummy information insertion period is input, coded multimedia information equivalent to the dummy information insertion period is output so that it is temporarily stored in the coded multimedia information buffering step; and in the multimedia data coding step, when the dummy information insertion period is input, digital multimedia data is abandoned, without being coded, by a quantity equivalent to the dummy information insertion time.

13. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data, and block rate information is generated on the basis of the reproduction time T and the quantity V;

coded multimedia information buffering step in which the coded multimedia information and the block rate information are temporarily stored in a memory unit for temporary storage;

coded multimedia information read-out step in which the coded multimedia information stored in the memory unit is read out by a quantity equivalent to synchronous interval time information which is obtained by using the block rate information and shows a time interval i the time division multiplexing;

coded multimedia information synchronization step in which multimedia data coded and multiplexed information is generated by performing multiplexing to the rad-out coded multimedia information; and buffer quantity decision step in which the performance of an apparatus executing the coding and multiplexing process is evaluated and, according to the result of this evaluation, the quantity of the memory unit for temporary storage used by the coded multimedia information buffering means is decided.

14. A multimedia data coding and multiplexing method for generating multimedia data coded and multiplexed information in which digital multimedia data comprising digitized video data and digitized audio data is coded and subjected to time division multiplexing, said method comprising:

multimedia data coding step in which coded multimedia information having a reproduction time T and a quantity V is generated by coding the digital multimedia data;

coded multimedia information buffering step in which the coded multimedia information is temporarily stored in a memory unit for temporary storage so that it is divided in unit quantities using a coded multimedia information unit quantity that shows a quantity of coded multimedia data equivalent to a set reproduction time;

coded multimedia information synchronization step in which the coded multimedia information stored in the memory unit is read out, and multimedia data coded and multiplexed information is generated; and buffer quantity decision step in which the performance of an apparatus executing the coding and multiplexing process is evaluated and, according to the result of this evaluation, the quantity of the memory unit for temporary storage used by the coded multimedia information buffering means is decided.

* * * * *

UNITED STATES PATENT AND TRADEMARK OFFICE
CERTIFICATE OF CORRECTION

PATENT NO. : 6,212,208 B1
DATED : April 3, 2001
INVENTOR(S) : Aki Yoneda and Takao Matsumoto It is certified that error appears in the above-identified patent and that said Letters Patent is hereby corrected as shown below:

Column 22,
Line 31, change "updation" to -- update --.

Column 27,
Line 46, change "updation" to -- update --.

Column 30,
Line 22, change "statis" to -- static --.

Column 37,
Line 23, change " informaiton" to -- information --.

Column 39,
Line 34, change "THe" to -- The --.

Column 40,
Line 42, change "thefirst" to -- the first --.

Column 41,
Line 55, change "THe" to -- The --;
Line 61, change "fials" to -- fails --.

UNITED STATES PATENT AND TRADEMARK OFFICE
CERTIFICATE OF CORRECTION

PATENT NO. : 6,212,208 B1
DATED : April 3, 2001
INVENTOR(S) : Aki Yoneda and Takao Matsumoto It is certified that error appears in the above-identified patent and that said Letters Patent is hereby corrected as shown below:

Column 51, claim 2,
Line 17, delete "is store".

Column 51, claim 4,
Line 26, change "1" to -- 2 --.

Column 56, claim 12,
Line 56, change "sot" to -- so --.

Signed and Sealed this

Eighth Day of January, 2002

Attest:

*Attesting Officer*

JAMES E. ROGAN
*Director of the United States Patent and Trademark Office*